United States Patent
Kanayama et al.

(10) Patent No.: US 10,175,660 B2
(45) Date of Patent: Jan. 8, 2019

(54) POWER ELECTRONICS DEVICE, CONTROL METHOD, AND NON-TRANSITORY COMPUTER READABLE MEDIUM

(71) Applicant: KABUSHIKI KAISHA TOSHIBA, Tokyo (JP)

(72) Inventors: Fumiaki Kanayama, Kanagawa (JP); Yusuke Doi, Kanagawa (JP); Yasuyuki Nishibayashi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 701 days.

(21) Appl. No.: 14/925,027

(22) Filed: Oct. 28, 2015

(65) Prior Publication Data

US 2016/0124400 A1 May 5, 2016

(30) Foreign Application Priority Data

Oct. 30, 2014 (JP) .................................. 2014-221962

(51) Int. Cl.
- *H01H 35/00* (2006.01)
- *H01H 83/00* (2006.01)
- *G05B 13/02* (2006.01)

(52) U.S. Cl.
CPC .................................. *G05B 13/02* (2013.01)

(58) Field of Classification Search
CPC ... B01J 19/0006; B01J 19/004; G01N 21/359; G01N 33/2829; G03C 1/015

(Continued)

(56) References Cited

U.S. PATENT DOCUMENTS

| 7,456,523 B2 | 11/2008 | Kobayashi |
| 9,385,528 B2 | 7/2016 | Nishibayashi et al. |

(Continued)

FOREIGN PATENT DOCUMENTS

| JP | H02-219334 | 8/1990 |
| JP | 2003-348851 | 12/2003 |

(Continued)

OTHER PUBLICATIONS

English-language machine translation of JP H02-219334.
English-language machine translation of JP 2006-090175.

*Primary Examiner* — Quan Tra
(74) *Attorney, Agent, or Firm* — Nixon & Vanderhye, P.C.

(57) ABSTRACT

According to one embodiment, a control device in a power electronics device includes a controller, a configuration determiner and a manager. The controller performs control associated with power conversion, in accordance with a first logical configuration of control between the power electronics device and other power electronics device. The configuration determiner performs determination processing of a second logical configuration when a change condition of the first logical configuration is satisfied. The manager instructs the controller to perform the control in accordance with the second logical configuration, the manager performing management such that the controller performs the control in accordance with previously given control information for a period after the change condition of the first logical configuration is satisfied and until the manager instructs the controller to perform the control associated with the power conversion in accordance with the second logical configuration.

30 Claims, 40 Drawing Sheets

(58) Field of Classification Search
USPC .......................................... 307/116; 700/286
See application file for complete search history.

(56) References Cited

U.S. PATENT DOCUMENTS

| | | | |
|---|---|---|---|
| 9,935,459 B2* | 4/2018 | Kogo | H02J 3/46 |
| 2012/0330469 A1* | 12/2012 | Kinugasa | H02J 3/14 |
| | | | 700/286 |
| 2013/0331997 A1* | 12/2013 | Ahn | H02J 3/14 |
| | | | 700/286 |
| 2014/0288718 A1 | 9/2014 | Nishibayashi et al. | |

FOREIGN PATENT DOCUMENTS

| | | |
|---|---|---|
| JP | 2005-278257 | 10/2005 |
| JP | 2006-090175 | 4/2006 |
| JP | 2014-060855 | 4/2014 |
| JP | 2014-207847 | 10/2014 |

\* cited by examiner

| INFORMATION TYPE | REMARK |
|---|---|
| DEVICE IDENTIFICATION NUMBER | INDIVIDUAL IDENTIFICATION NUMBER (PRODUCTION SERIAL NUMBER, ETC.) |
| POWER CONVERSION TYPE | AC/AC, AC/DC, DC/DC, ETC. |
| CONTROL DEVICE TYPE | CENTRAL CONTROL DEVICE, TERMINAL DEVICE, ETC. |
| CONNECTED DEVICE TYPE | ENERGY STORAGE DEVICE, LOAD DEVICE, POWER RELAY DEVICE, ETC. |
| INPUT/OUTPUT RATED VALUE | RATED VOLTAGE, RATED CURRENT, RATED POWER, ETC. |
| COMMUNICATION CONNECTION | DEVICES RESIDING IN SAME COMMUNICATION BROADCAST DOMAIN |
| POWER CONNECTION | DEVICE GROUP RESIDING ON SAME BUS |
| FAILURE INFORMATION | PRESENCE/ABSENCE AND TYPE OF FAILURE |
| DEVICE TEMPERATURE LEVEL | LOW, MEDIUM, HIGH TEMPERATURES, AND EXTREMELY HIGH TEMPERATURES, ETC. |
| OPERATION DURATION | WITHIN 10 MINUTES, 1 HOUR, 12 HOURS, 1 DAY, ETC. |
| RANDOM NUMBER, HASH VALUE | EXPECTED TO BE UNIQUE |

FIG. 4

| INFORMATION TYPE | | REMARK |
|---|---|---|
| GROUP IDENTIFICATION NUMBER | | 1 |
| MASTER | | DEVICE 110a |
| SLAVE | | DEVICE 110b, DEVICE 110c |
| INDEPENDENT | | DEVICE 110d |

FIG. 6

|   | I | II | III | IV |
|---|---|---|---|---|
| A | Master | Rank 1 | Control Master | Master of B |
| B | Slave | Rank 2 | Sync Master | Slave of A<br>Master of C,D |
| C | Slave | Rank 3 | IP network Master (Router) | Slave of B |
| D | Slave | Rank 4 | Slave | Slave of B |

FIG. 7

| SEQUENCE NUMBER : 0 | |
|---|---|
| ID | MASTER/SLAVE |
| 1 | |
| 2 | |
| 3 | |
| 4 | |

(A)

| SEQUENCE NUMBER : 1 | |
|---|---|
| ID | MASTER/SLAVE |
| 1 | |
| 2 | |
| 3 | S:4 |
| 4 | M:3 |

(B)

| SEQUENCE NUMBER : 2 | |
|---|---|
| ID | MASTER/SLAVE |
| 1 | |
| 2 | M:3 |
| 3 | S:2,4 |
| 4 | M:3 |

(C)

| SEQUENCE NUMBER : 3 | |
|---|---|
| ID | MASTER/SLAVE |
| 1 | S:3,4 |
| 2 | M:3 |
| 3 | M:1 S:2 |
| 4 | M:1 |

(D)

| SEQUENCE NUMBER : 4 | |
|---|---|
| ID | MASTER/SLAVE |
| 1 | S:2,3,4 |
| 2 | M:1 |
| 3 | M:1 |
| 4 | M:1 |

| SEQUENCE NUMBER : 0 | |
|---|---|
| ID | MASTER/SLAVE |
| 1 | |
| 2 | |
| 3 | |
| 4 | |

(B)

| SEQUENCE NUMBER : 1 | |
|---|---|
| ID | MASTER/SLAVE |
| 1 | |
| 2 | |
| 3 | S:4 |
| 4 | M:3 |

(C)

| SEQUENCE NUMBER : 2 | |
|---|---|
| ID | MASTER/SLAVE |
| 1 | |
| 2 | M:3 |
| 3 | S:2,4 |
| 4 | M:3 |

(D)

| SEQUENCE NUMBER : 3 | |
|---|---|
| ID | MASTER/SLAVE |
| 1 | S:4 |
| 2 | M:3 |
| 3 | S:2,4 |
| 4 | M:1 |

(E)

| SEQUENCE NUMBER : 4 | |
|---|---|
| ID | MASTER/SLAVE |
| 1 | S:2,4 |
| 2 | M:1 |
| 3 | S:2,4 |
| 4 | M:1 |

(F)

| SEQUENCE NUMBER : 5 | |
|---|---|
| ID | MASTER/SLAVE |
| 1 | S:2,3,4 |
| 2 | M:1 |
| 3 | M:1 |
| 4 | M:1 |

[STEP 1: NORMAL OPERATION (NORMAL STATE)]

|  | AC/DC (M) | DC/DC (BATTERY) (S) | DC/DC (PV) (S) | DC/DC (LOAD) (S) |
|---|---|---|---|---|
| RATED VALUE | 25kW | 10kW | 10kW | 25kW |
| RESULT VALUE | 25kW | 0 | 0 | 25kW |

[STEP 2: OCCURRENCE OF BLACKOUT (ABNORMAL STATE)]

|  | AC/DC (M) | DC/DC (BATTERY) (S) | DC/DC (PV) (S) | DC/DC (LOAD) (S) |
|---|---|---|---|---|
| RATED VALUE | — | 10kW | 10kW | — |
| RESULT VALUE | — | 0 | 0 | — |

[STEP 3: FAIL SOFT (DEGRADED OPERATION)]

|  | AC/DC | DC/DC (BATTERY) (M) | DC/DC (PV) (S) | DC/DC (LOAD) (S) |
|---|---|---|---|---|
| RATED VALUE | — | 10kW | 10kW | 25kW |
| RESULT VALUE | — | 10kW | 10kW | 20kW |

[STEP 4: RECOVERY FROM BLACKOUT (RECOVERY FROM ABNORMALITY) —> TO STEP 1]

|  | AC/DC | DC/DC (BATTERY) (M) | DC/DC (PV) (S) | DC/DC (LOAD) (S) |
|---|---|---|---|---|
| RATED VALUE | 25kW | 10kW | 10kW | 25kW |
| RESULT VALUE | 0 | 10kW | 10kW | 20kW |

FIG. 27C

NOTIFY MESSAGE

| COMMUNICATION HEADER | MESSAGE TYPE | SEQUENCE NUMBER | TRANSMISSION DEVICE ID | NOTIFICATION /UPDATE /SEPARATION |
|---|---|---|---|---|

FIG. 28

SEARCH MESSAGE

| COMMUNICATION HEADER | MESSAGE TYPE | TRANSMISSION DEVICE ID | WAIT TIME |
|---|---|---|---|

FIG. 29

SEARCH-RESPONSE MESSAGE

| COMMUNICATION HEADER | MESSAGE TYPE | SEQUENCE NUMBER | TRANSMISSION DEVICE ID |
|---|---|---|---|

FIG. 30

SCDATA-WRITE-RESPONSE MESSAGE

| COMMUNICATION HEADER | MESSAGE TYPE | SEQUENCE NUMBER | TRANSMISSION DEVICE ID | WRITE RESULT |
|---|---|---|---|---|

FIG. 32

SCDATA-READ-REQUEST MESSAGE

| COMMUNICATION HEADER | MESSAGE TYPE | TRANSMISSION DEVICE ID |
|---|---|---|

FIG. 33

POWER ELECTRONICS DEVICE, CONTROL METHOD, AND NON-TRANSITORY COMPUTER READABLE MEDIUM

CROSS-REFERENCE TO RELATED APPLICATIONS

This application is based upon and claims the benefit of priority from Japanese Patent Application No. 2014-221962, filed Oct. 30, 2014; the entire contents of which are incorporated herein by reference.

FIELD

An embodiment relates to a power electronics device, a control method, and a non-transitory computer readable medium.

BACKGROUND

A solar power generator, an energy storage device, and the like may be connected to a power system and coordinated control may be performed with these devices serving as distributed power sources. Each of the distributed power sources is provided with a power electronics device (an inverter or a converter) that performs power conversion. It is assumed that a system automatically performs capacity change in any cases including expansion, occurrence of abnormality or the like by applying autonomous cooperative control among multiple power electronics devices while ensuring operational flexibility, wherein the power electronics devices are provided with a communication function. For example, it is assumed that a plurality of power electronics devices are connected in parallel to enable optimization of output, not as individual power electronics devices but as a power electronics system. In this case, it is necessary to determine a master device (hereinafter referred to as "master") that acts as a controlling entity for coordinating the outputs of each of the power electronics devices. Power conversion efficiency as a system can be improved by determining the master from among the plurality of power electronics devices, determining the remaining devices as slave devices (hereinafter referred to as "slaves"), and causing the master to give instructions regarding the output power to the slaves.

However, when the roles of master/slaves are automatically determined between or among the plurality of power electronics devices at the time of initial installation, in the event of occurrence of abnormality, or the like, each power electronics device operates individually and independently. As a result, it is possible that the operation is started in a state where a plurality of masters exist in the system if the state of establishment or non-establishment of a logical configuration for power control is not taken into account.

In addition, when addition, stoppage, failure, and the like of power electronics devices constituting the distributed power supply system occur in a distributed power supply system where multiple power electronics devices configure a master-slave relationship and cooperatively operate, it is necessary to reconfigure the group without stopping the power output and restore the normal operation state.

Conventionally, a method is known according to which multiple inverters whose master/slave roles are specified in a fixed manner realize parallel operation that corresponds to phase synchronization control of output power using an optical communication line. In addition, a method is known according to which the device information is notified to a server that monitors and controls the devices when the devices are connected to the system, using a communication function, and setting of the software on the server is automatically done. However, even when these methods are combined, it is not possible to solve the aforementioned problem.

BRIEF DESCRIPTION OF THE DRAWINGS

FIG. 4 is a diagram illustrating an example of characteristic information.

FIG. 6 is a diagram illustrating an example of configuration information.

FIG. 7 is a diagram illustrating an example of a master-slave relationship model.

FIG. 24C illustrates an example of update of the configuration information.

FIG. 25C illustrates an example of update of the configuration information.

FIG. 27C is a diagram illustrating an example of an operational state of a plurality of power electronics devices at the time of occurrence of abnormality.

FIG. 28 is a diagram illustrating an example configuration of a communication message.

FIG. 29 is a diagram illustrating an example configuration of the communication message.

FIG. 30 is a diagram illustrating an example configuration of the communication message.

FIG. 32 is a diagram illustrating an example configuration of the communication message.

FIG. 33 is a diagram illustrating an example configuration of the communication message.

DETAILED DESCRIPTION

Figure 1:
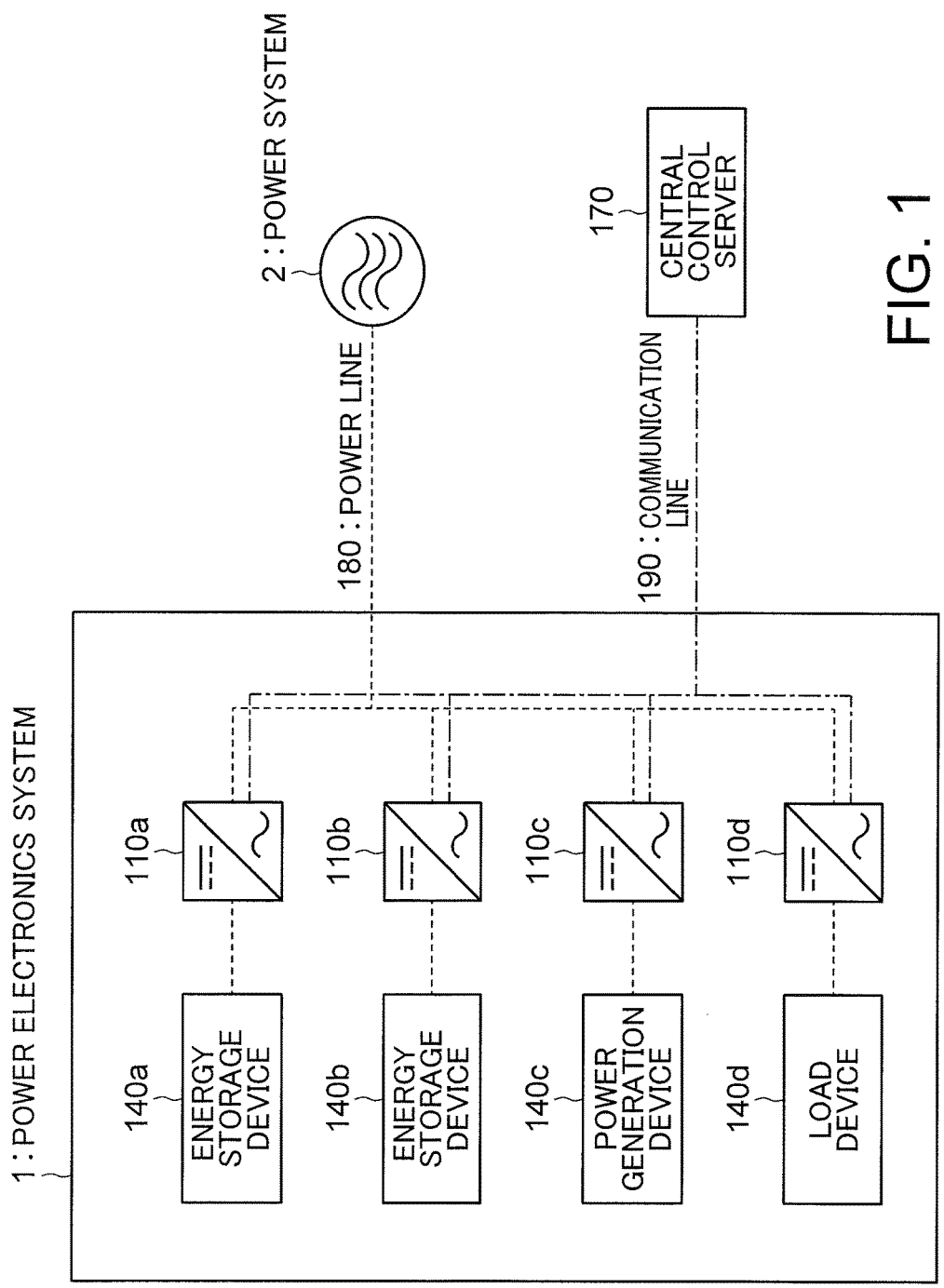
FIG. 1 is a diagram illustrating an example of a power electronics system according to this embodiment.

According to one embodiment, a control device in a power electronics device includes a controller, a configuration determiner and a manager.

The controller performs control associated with power conversion in the power electronics device, in accordance with a first logical configuration of control between the power electronics device and other power electronics device.

The configuration determiner performs determination processing of a second logical configuration of control between the power electronics device and the other power electronics device when a change condition of the first logical configuration is satisfied.

The manager instructs the controller to perform the control in accordance with the second logical configuration, the manager performing management such that the controller performs the control associated with the power conversion in accordance with previously given control information for a period after the change condition of the first logical configuration is satisfied and until the manager instructs the controller to perform the control in accordance with the second logical configuration.

Below, the outline of this embodiment is explained. According to this embodiment, in a case where a power electronics system is configured by multiple power electronics devices, each of the power electronics devices executes control associated with power conversion (input/output control of assigned power, phase control of output power, etc.) in accordance with a logical configuration of control among these power electronics devices. There are various modes of the logical configuration of control among the power electronics devices. As one example, there is a configuration in which one power electronics device acts as a master, and the remaining power electronics devices acts as slaves controlled by the master. In a case where the fact has been detected that a change condition of the logical configuration has been satisfied in a certain power electronics device (for example, characteristic information of one of the power electronics devices being changed; stoppage, failure or separation of one of the power electronics devices; addition of a new power electronics device, etc.), information exchange is performed among the power electronics devices, a new logical configuration of control among the currently operating power electronics devices is determined, and the control associated with power conversion is performed under the new logical configuration. The logical configuration prior to the change condition being satisfied corresponds to a first logical configuration, and the changed logical configuration that has been newly determined after the change condition being satisfied corresponds to a second logical configuration. By sharing an algorithm for determination of the logical configuration among the power electronics devices, the same logical configuration is determined by each of the power electronics devices as long as the information used in the determination of the logical configuration is common. Here, after the change condition of the above described logical configuration being satisfied has been detected and until a new logical configuration is generated and execution of the control is started on the basis of this logical configuration, each of the power control devices leaves undefined the logical configuration of control and continues the control of power conversion in accordance with control information given in advance. In this manner, the period during which the power control is continued in accordance with the control information while leaving undefined the logical configuration of control and the generation of the new logical configuration is performed is referred to as a "critical section" in this embodiment. When each of the power electronics devices has recognized that the information for generating the same logical configuration is allowed to be shared by the other power electronics devices, each of the power electronics devices exits the critical section and starts control on the basis of the new logical configuration. By virtue of this, it is made possible to configure a new logical configuration that is consistent among the power electronics devices while guaranteeing the availability of the system.

An embodiment of the present invention is described below with reference to the drawings.

FIG. 1 illustrates the power electronics system according to this embodiment. A plurality of power electronics devices 110a, 110b, 110c, and 110d have an input part and an output part of electrical power, and are respectively connected to at least one or more power lines. Each of the power electronics devices is connected via the power line to an energy storage device 140*a*, an energy storage device 140*b*, a power generation device 140*c*, and a load device 140*d*. In addition, each of the power electronics devices is connected via a power line to the same power line (bus or bus line) 180. The power line 180 is connected to a power system 2 and the power line 180 includes a local power line within the power electronics system and a system power line between a power electronics system and the power system 2. The power electronics system corresponds to a local system connected to the power system 2. This power electronics system may be called a distributed power supply system, for the energy storage device, the power generation device, the load device, etc. are arranged in a distributed manner. In a distributed power supply system, it is possible to perform dynamic addition and removal of power electronics devices and power devices connected thereto (an energy storage device, a power generation device, and a load device). As has been described at the beginning of the explanation of this embodiment, one of the features in this embodiment is that it is possible to promptly reconfigure the logical configuration (a master-slave configuration, etc.) and restore a normal state while maintaining the availability of the system even when a failure, etc. occurs in any one of the power electronics devices constituting the distributed power supply system, causing stoppage of the power electronics device at issue.

The energy storage devices 140*a* and 140*b* are devices that convert electrical energy into other forms of energy and store the energy that has been converted. An energy storage and an electric vehicle (EV) on which the energy storage is mounted are typical energy storage devices, but a dry cell intended to perform discharge after manufacturing thereof may be included. The energy storage device may be provided with a control system configured by an electrical energy transformation component such as a microcontroller, a regulator, an inverter, etc. for management of charge/discharge speed, battery degradation, and lifetime. An energy storage device that integrates a PCS and an energy storage device may be called BESS (Battery Energy Storage System). The PCS may be attached to a solar power generator or other small power generator as well as the energy storage device. The energy storage device may refer to, in a broad sense, a water tower which may be interpreted as storing electrical energy as potential energy, an uninterruptible power supply device. Also, a flywheel or the like that is capable of retrieving electrical energy from the stored kinetic energy may also be interpreted as a type of the energy storage device. In addition, the energy storage device during charging may be regarded as a type of the load device, and the energy storage device in discharging may be regarded as a type of the power generation device.

The power generation device 140*c* is a device that converts various forms of energy into electrical energy. For example, a solar power generator (PV: Photovoltaic) using light energy, a water/wind power generator using fluid energy such as water flow and wind flow, a thermal power generator using chemical energy such as fossil fuel, a geothermal power generator using heat existing in the nature, and other power generators by vibration and tidal power, etc. may be mentioned. Nuclear power generation plants or the like may be likewise mentioned as an example of the power generation devices. In the power generation device, there is often provided a configuration in which various forms of energy are once converted into rotary motion and electrical power is obtained using a synchronizer, but there is also a form of power generation, such as the solar power generator, that does not rely on the kinetic energy. As in the case of a device serving as both a kettle and a gas thermal power generator, a mode incorporating a plurality of functions may be provided.

The load device 140*d* is a device that consumes electrical power, and a device that concerts the electrical energy into other forms of energy. Most of them directly or indirectly concerts electrical energy into thermal energy.

As typical load devices, a motor, lighting and/or heating devices, and computers may be envisaged. In a micro grid, the motor often exists in the form where it is combined with other devices such as home appliances, elevator, escalator, etc. or additional function is added thereto. If the load device is a motor, electrical power is converted into motive/kinetic energy and consumed. At this point, the power produced by the motor may be used directly as the driving force. In addition, changing of speed, direction and the like of motion, displacement of rotation shafts and rotation/liner motion conversion, and branching/coupling of kinetic energy via a power converter such as a gear may be performed. The entire power system including the motor and power transmission/power conversion mechanisms can be regarded as the load device of the system. In addition, those having impedance are denoted as a load device in a broad sense including inductance and capacitance that actually do not consume energy. This may include the one having relatively large impedance such as a pole transformer as well as impedance of sometimes negligible quantity such as minute electrical resistance that a wire has, inductance, and earth capacitance.

The power electronics device 110*a* to 110*d* are devices that perform conversion associated with electrical power such as DC/AC, voltage, current, frequency, and the number of phases. Specifically, the power electronics devices 110*a* to 110*d* may be an inverter, a converter, or a transformer, and the inverter is envisaged in this embodiment. The power electronics device performs the above-described conversion while the device as such consumes no or little electrical power. An inverter is generally a device that converts direct-current power into alternating-current power, and there may be those having a function for converting the alternating-current power into direct-current power by switching an operation mode, a function for converting AC power into AC power, or a function for converting DC power into DC power. Also, devices that may perform shutoff and modification of power transmission paths such as a breaker and power rooter may also be understood as the power electronics devices in a broad sense.

The power electronics devices 110*a* to 110*d* are capable of controlling the output power through cooperative operation among these power electronics devices. As one example, the cooperative operation as a whole is enabled by making one of the power electronics devices 110*a* to 110*d* act as the master and the remaining devices as the slaves such that the master controls the operation of the slaves. Alternatively, there may be a mode in which the power electronics devices 110*a* to 110*d* perform the coordinated control under an instruction from a central control server 170, an EMS, or the like. In this case, it is possible to understand that the central control server 170 is a fixed master. Incidentally, a power conversion element and a control controller that are in the power electronics device may be integrated, which may be called a PCS (Power Conditioning System). The control facility of the PCS may include a communication function.

The power electronics devices 110*a* to 110*d* illustrated in FIG. 1 are an inverter that converts DC power into AC power. These inverters correspond to a system cooperation inverter connected to the power system 2 via the power line

Figure 2:
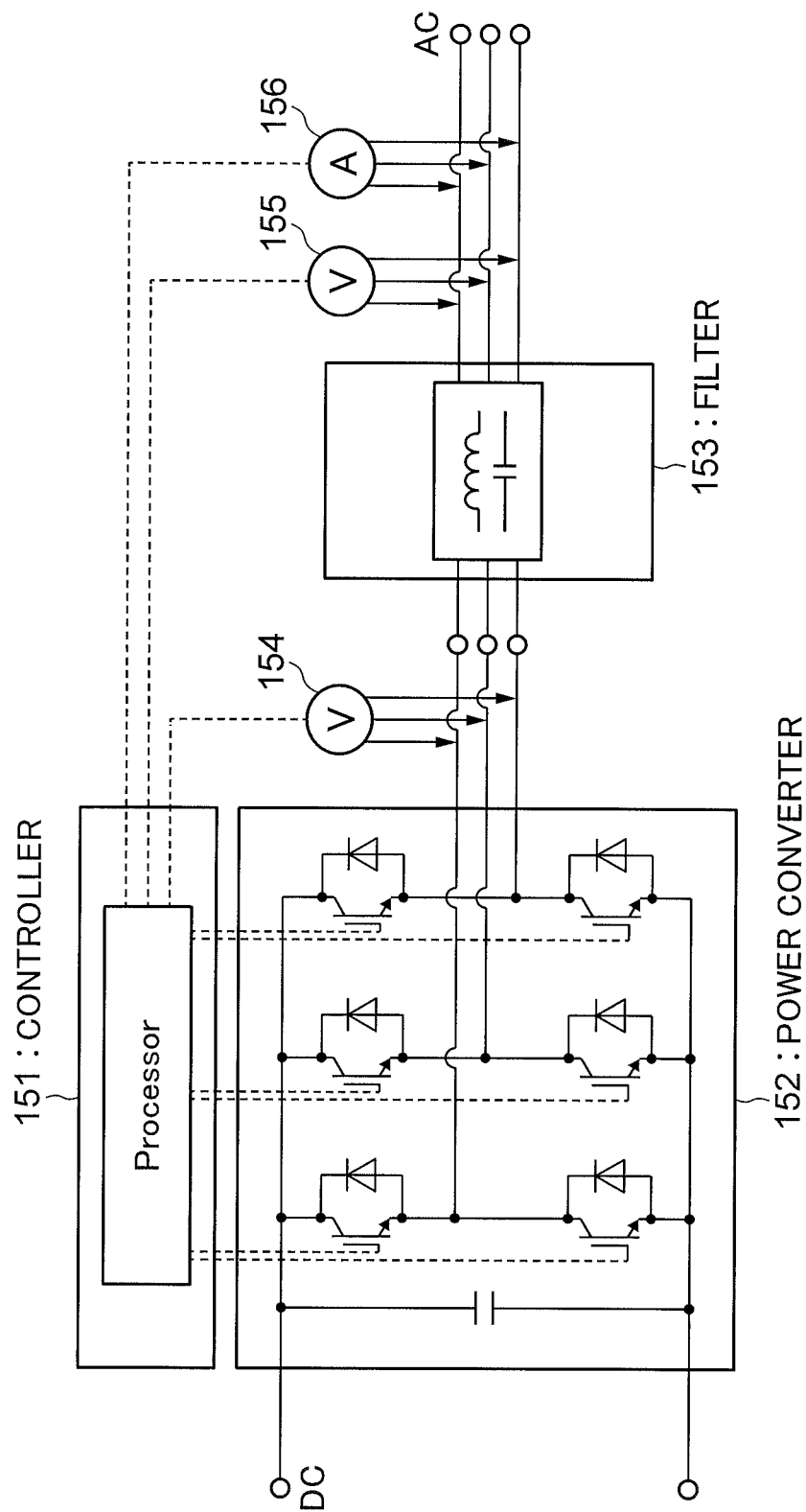
FIG. 2 is a diagram illustrating an example of a configuration of a portion associated with power input/output and conversion of a system-interconnection inverter.

180 as in FIG. 1. FIG. 2 illustrates an example of a configuration of a portion associated with power input/output and conversion of a system-interconnection inverter. The system cooperation inverter is mainly configured by a controller 151, a power converter 152, and a filter 153. The controller 151 includes a processor generates a gate drive signal in accordance with a target output and drives the power conversion element in the power converter 152 (here, a diode that is a semiconductor device. Incidentally, a freewheeling transistor is connected in parallel with each of the diodes). Since the electrical power output from the power converter 152 includes a considerable amount of harmonic component and electromagnetic noise, they are normally eliminated by the filter 153. The filter 153 is designed as a low-pass filter so as to let the electrical power of the system frequency pass and eliminate the electrical power of the other frequencies. In addition, various sensors such as voltmeters 154, 155 and an ammeter 156 are attached to the power electronics device, and values detected thereby are delivered to the controller 151 for use in feedback control. The controller 151 may perform output control on the basis of output target information obtained externally by communications as well as the information from the sensors. In addition, there exists a configuration wherein direct current voltage as input is raised or lowered by a chopper circuit, etc. and efficiency of power conversion is changed. In FIG. 2, the configuration of the portions associated with power input/output and conversion of the system-interconnection inverter is illustrated, but as an example of a configuration of a power electronics device (inverter) that is not directly connected to the system, a configuration obtained by deleting the filter 13 from that illustrated in FIG. 2 can be used. For example, in FIG. 1, the power electronics devices 110a to 110d are connected in parallel with each other and thus connected to the power system 2, but power electronics devices may be connected in a hierarchical manner (see the later-described FIG. 22A, etc.). In this case, in the power electronics device, the highest-order power electronics device is connected to the power system and the power electronics device of the lower orders are not directly connected to the power system.

The power line connected to the input part and output part of each of the power electronics devices may be configured by a plurality of core wires and the number of the core wires depends on the number of phases handled by the power electronics device. In DC current and single-phase AC current, often two core wires are provided, but there may be the one that includes another wire for grounding. There may be another one in which a core wire is used both in shielding and grounding. The same applies to cases of three or more phases, and basically the core wires in the number corresponding to the number of phases are included, but a core wire for grounding may be included. In addition, in a transmission and distribution network including a system power line, communication lines and signal lines such as optical fiber may be included together. The power line may be regarded as one of the components of the power electronics system or local system. As described above, the power line varies in its number of the wires (the number of core wires) depending on the number of phases and presence/absence of a grounding wire, and multiple types of power lines often exist in one local system.

The power electronics system is capable of including all kinds of sensors. For example, they may be a smart meter, a voltmeter, an ammeter, a temperature sensor, etc. These sensors may be built into a device such as the power electronics device (inverter). In addition, these sensors may include a communication function and operate as an external sensor of the device such as an inverter, or may be used in control of the inside of the entire system by configuring a sensor network.

Every device that resides within the power electronics system may be provided with a communication function. For example, the PCS of the energy storage device, when provided with the communication function, is capable of announcing the residual charge capacity of this device to the other devices. In addition, information aggregation devices in which communication is one of the main functions such as an HEMS (Home Energy Management System) server, a BEMS (Building Energy Management System) server, a controller, a gateway, a personal computer, a server, and the like may be arranged inside or outside of the power electronics system. The information aggregation device may constitute an important component of the system, and is capable of analyze the information collected from devices such as the energy storage device and the various sensors and perform optimization of the energy supply and demand within the system and centralized control. Each HMS, HEMS, server, controller, etc. may be generically denoted as EMS. As one example, the central control server of FIG. 1 that is arranged outside of the system corresponds to the information aggregation device of this kind. Incidentally, communication relay devices such as LAN hub or LAN switch, a wireless LAN access point (AP), etc. may be arranged in the system in accordance with the form of communications. Incidentally, the LAN hub or LAN switch performs branching of an Ethernet cable for use in wired LAN (Local Area Network).

In a case where the information aggregation device performs the centralized control, this information aggregation device corresponds to the central control device acting as a master unit, and the power electronics device, power generation device, energy storage device, load device, communication device, and the like correspond to subordinate devices. It may also be possible that the devices per se such as the power electronics device, power generation device, energy storage device, load device, communication devices, etc. do not act as the subordinate devices, but controllers externally attached thereto serves as the subordinate devices. In addition, a subordinate device may include sensors or the like. In contrast to the centralized control, a form of distributed control is also possible. In that case, a system may be envisaged in which no central control device exists and the concepts of master and subordinate devices do not need to be relied on. In addition, another possible system will be such that a master device is automatically selected from the devices constituting the system and the centralized control is performed under the device that has been selected as the master device.

Incidentally, the power electronics system according to this embodiment can communicate with an EMS (Energy Management System) server (Community EMS) managing the community, electric utility company, and the like via an HEM Server, a gateway and the like so that the system is used in demand response where the energy for the community as a whole is controlled.

Figure 3:
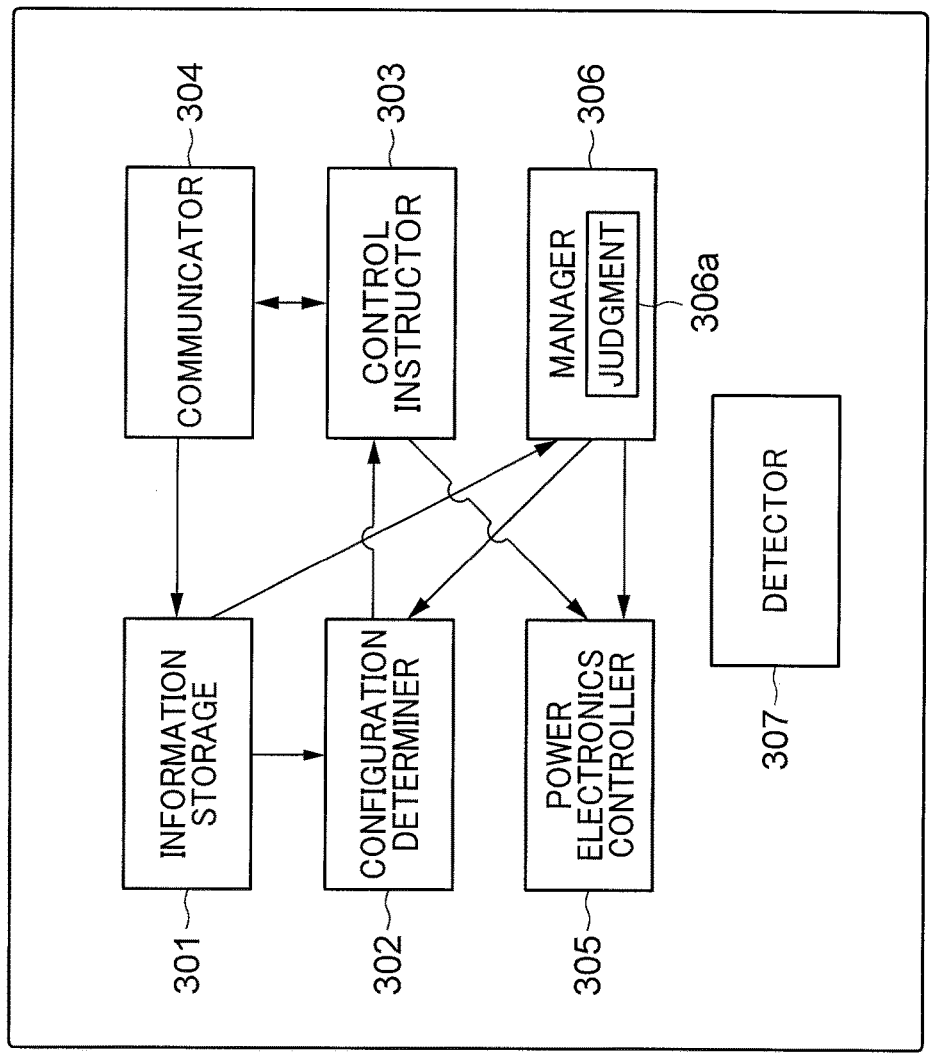
FIG. 3 is a diagram illustrating a functional block diagram of a control device mounted in a power electronics device according to this embodiment.

FIG. 3 illustrates a functional block diagram of a control device mounted in a power electronics device according to this embodiment.

The control device of FIG. 3 includes an information storage 301, a configuration determiner 302, a control instructor 303, a communicator 304, a controller (power conversion controller) 305, a manager 306, and a detector 307. Each element of a configuration determiner 302, a control instructor 303, a communicator 304, a controller (power conversion controller) 305, a manager 306, and a detector 307 can be implemented by circuitry, respectively. The circuitry may include a circuit, a plurality of circuits or a system of circuits. Each element is may be different physical circuitry or all or a part of them may be same physical circuitry.

The information storage 301 is a device that stores the characteristic information of the power electronics this device (hereinafter referred to as "this device") and other power electronics device (hereinafter referred to as "other devices") and the configuration information representing the logical configuration (the master-slave relationship, etc.) of the system. A set of the characteristic information of this device and other devices may hereafter be referred to as a "characteristic information set." The information storage 301 stores information in the form of HDD, flash memory, SSD, RAM, and the like. As in the case of a network drive, the information storage 301 may be a storage device arranged on a communication network. In this case, information will be stored and read via the communication network. In the case where the information storage 301 is arranged on the communication network, another storage within the device may store the address of the information storage 301 (URI of a cloud server or the like).

FIG. 4 illustrates an example of the characteristic information. This characteristic information is information of one power electronics device. If the total number of this device and the other devices is X, then X pieces of characteristic information of the same format are stored in the information storage 301. The characteristic information includes information on a plurality of items associated with the power electronics device. Part of or all of the items of the characteristic information are used in determination of the logical configuration (the master-slave relationship, etc.). The method of obtaining the characteristic information vary: The characteristic information may be information hard-coded at the time of manufacturing; information manually input by an operator depending on the situations of use; or information obtained by the power electronics device automatically recognizing after having started. The items of the characteristic information are respectively explained below. Incidentally, the items explained below are examples, and the characteristic information according to this embodiment may include any item other than those illustrated in FIG. 4, and some of the items illustrated in FIG. 4 may be omitted.

"Device identification number" is an individual identification number. This may be a manufacturer's serial number or MAC address (Media Access Control Address). It also may be a unique string that is unique within the same network (for example, a host name and an SSID of a wireless LAN).

"Power conversion type" represents the characteristic of power conversion of the power electronics device. For example, there may be AC/AC for conversion of frequency or voltage between alternating-current powers, AC/DC for conversion of alternating-current power into direct-current power, or DC/DC for conversion of voltage between direct-current powers. In addition, information may be included on the number of input/output phases, the number of input/output ports, on whether or not the direction of conversion is variable, and the like. When devices such as a repeater, a power path switch, and a central control device that do not perform conversion of voltage/frequency are used, "No conversion" indicative of the fact that the power conversion type has no value may be defined.

"Control device type" indicates the capability or role of a power electronics device. For example, in a case of a device developed for use in or with a central control device and having higher performance than that of other power electronics devices, "central control device" is specified, and in a case of a power electronics device connected to a power device (power generation device, energy storage device, load, etc.) of the end of the distributed power supply system, "end device" is specified. The control device type affects the priority determination at the time of selection of the master which will be described later.

"Connected device type" represents the power device (power generation device, energy storage device, load device, etc.) connected to the power electronics device. By the connected device type, it is possible to roughly understand the stability of the power source of the power electronics device. For example, assume that there exist a power electronics device connected to the energy storage device and a power electronics device connected to the load device. The power electronics device connected to the load device cannot make its internal controller (microcontroller, etc.) operate without electrical power being supplied from outside. On the other hand, the power electronics device connected to the energy storage device can make its internal controller using the stored electrical power and without receiving electrical power from outside. As a result, it can be said that the latter is capable of operating more stably. In addition, since, as a power generation devices, there exist various types of devices such as a solar power generation device, a gas thermal power generation device, a wind power generation device, and a water power generation device, the connection types may be defined in a very specific manner.

"Input/output rated value" represents rated voltage, rated current, rated power, etc. of input and output of the power electronics device.

"Communication connection information" is information that represents a device (devices) on the same network. As one example, it is a list of devices that the power electronics device can directly make communications with. In the multi-hop communication system, it is also possible that it is configured as a list of devices including those with which the power electronics device can make indirect communications. In another example, it is defined as an ID of the network group to which this device belongs. As an example of this ID, in a case where communications are performed by TCP/IP, it is possible to use a subnet IP address, a domain name, and the like. The setting of this communication connection information may be implemented as a method of manual input and confirmation by an operator using a display terminal, etc.; a method for setting using known network automatic configuration protocols such as DHCP (Dynamic Host Configuration Protocol) and UPnP (Universal Plug and Play); and a method of setting by recognizing and configuring the communication network by a specially defined protocol. It is also possible to provide settings by using any method other than those mentioned herein, and this embodiment does not rely on particular methodology. In addition, as the communication connection information, in a case where communications are made by packet loss rate between nodes and wireless communication, radio wave intensity between nodes, an SN ratio, and further the number of hops at the time of multi-hop communication, and any other parameters indicative of the communication environment may be included.

"Power connection information" is information that represents other power electronics devices connected to the same power line (bus). With regard to setting of the power connection information, there are a method according to which an operator performs manual input and confirmation using a display terminal, etc. and a method of automatic recognition according to which the existence of connection to the same power line is automatically recognized between the power electronics devices. The method of manually making the confirmation includes a mode in which am operator individually uses visual inspection, design drawings, etc., confirms the individual connection relationship, and makes the input to the power electronics device. The automatic recognition method includes a method according to which particular power signal output is notified by communication and the behavior on the power line is confirmed (first automatic recognition method) and a conduction confirmation method according using Normally-On in a case of two power electronics devices (second automatic recognition method). The first automatic confirmation method is such that, for example, if pulse voltage is applied to the power bus from one side, detection is done on the one side, the respectively detected information is exchanged using the communication network, and if it is determined that it falls within a predetermined error range, then it is determined based on this that any connection in terms of power exists. The second automatic recognition method is such that transition to the conduction state is passively determined without using communications. There is also a method that may be positioned between the automatic recognition and the manual input. For example, there is a method according to which a power electronics device that entered a particular operation state as a result of operation from the operator within the same time interval is recognized as being positioned on the same bus. Any other methods other than those mentioned herein are also possible, and this embodiment is not affected by any particular methodology. The power connection information may retain a hierarchical configuration of connection not only to the power electronics devices connected by the same power line but also to other power electronics devices constituting the same local system.

"Failure information" represents the state associated with the failure of the power electronics device. It may be a binary parameter indicative of the presence or absence of a failure, and the types and severity of the failures may be very specifically defined. For example, even in a case where the power conversion element within the power electronics device fails and cannot perform power output, it is possible to operate as a master that does not perform the power output (such as instructing the slave about the output power or output power phase, etc.) as long as the other components such as the power conversion controller 305 are in a normal state. On the other hand, even in a case where the power conversion element does not fail, it is not possible to execute the coordinated control with the other power electronics devices if a failure exists in the communicator 304. In this manner, the role of this device within the system may vary depending upon the location, type, and severity of the failure, so that it is desirable to conceive several variations for the failure information.

"Device temperature level" is information associated with a temperature of the power electronics device. Generally, the temperature of the device rises when the power electronics device operates for a long time. The rise in the device temperature leads to decrease in the conversion efficiency, and further excessive temperature rise may be a cause of a failure. It is envisaged that the control may be changed depending on the device temperature. As the device temperature level, an actual value of the temperature may be used, or a boundary value may be defined such that the device temperature level is expressed as a range level (low temperature, middle temperature, high temperature, extremely high temperature, etc.) within which the measured value falls. Related data such as humidity may also be included. At this point, if the level determination (sampling) is performed simply using a threshold as a boundary, the level will be frequently updated in a case where the value oscillate in the neighborhood of the threshold. In order to avoid this, the level determination may be performed using a Schmitt trigger.

"Operation duration" represents the length of a period after the power electronics device is activated (power is turned on) to the current time. The operation duration may be managed by dividing it into the operation time of the power conversion controller 305 and the operation time of the power converter. The operation duration may be an actually measured time length, and in the similar manner as in the case of the device temperature level, a boundary value may be defined and the operation duration may be expressed by a range level (short, middle, long, very long, etc.) in which the measured value falls.

"Hash value" or "random number" are examples of values that are expected to be unique with respect to other power electronics devices. The hash value is a type of random number. When the number of digits of the hash value or the random number is sufficiently large, it is expected that the information is unique. As one example, the hash value is computed by a hash function from the other items of the characteristic information. The computation of the hash value is performed by a configuration determiner 302 or manager 306 which will be explained later. It is envisaged that the items used in computation of the hash value should include at least the item used to determine the logical configuration. The hash value is computed every time a change occurs in at least one of these items and the latest hash value is included in the characteristic information (table). As the method for computing the hash value, algorithms such as MD5 and SHA256 are widely used, and whichever algorithm may be used. When the hash value is used, it is necessary to take into account collision of the hash value, but the probability of collision of computed hash is sufficiently small in algorithms having sufficient length and complexity such as the above-described MD5 and SHA256, so that the problem of collision may be ignored.

It is also possible to include information other than the above in the characteristic information. For example, in a power electronics device connected to an energy storage device, consumption and power generation histories such as the number of times of charge/discharge and charge/discharge times can be included in the characteristic information as a numerical value or a graph. In addition, the degree of degradation of the energy storage device assumed therefrom can be included in the characteristic information. Also, dynamic information such as output current, output active power, output reactive power, power factor, harmonic frequency and amplitude, etc. as well as static information such as date of shipment can be included in the characteristic information.

The communicator 304 performs transmission and reception via a communication network with the other power electronics devices, EMS, and a local controller or central control device arranged in the power electronics system, and with the power devices (energy storage device, power generation device, etc.) connected to the power electronics devices. As the transmission and reception with the other power electronics devices, EMS, the central control device, and the like, for example, a communication message including the characteristic information, the configuration information (see FIG. 6) which will be described later, or monitor control information after operation having started, etc. is transmitted and received. The transmission of the communication message may take place according to a mode where the message is transmitted upon activation, a mode where it is periodically transmitted, and a mode where it is transmitted upon request from the other power electronics devices, EMS, local controller, etc. In addition, there is another mode according to which the transmission takes place at the timing when a change occurs in the characteristic information, configuration information, and monitor control information. As the timing at which the characteristic information changes, there are timings of: addition of a power electronics device (this device or other devices) to the power electronics system; removal of the power electronics device (this device or other devices) from the power electronics system; and failure of the power electronics device (in this case, it is assumed that the communicator is in a normal state). In addition, where the detected value (temperature, etc.) from various sensors is to be included in the characteristic information, a timing at which the detected value of the sensor has changed may be included.

Here, the communicator 304 may have a configuration according to which it includes a plurality of communicators in addition to a configuration according to which it exists as a single communicator. For example, the communicator 304 may include a first communicator and a second communicator. For example, the first communicator make communications via a wireless communication medium such as IEEE802.11 wireless LAN, etc. as well as wired communication medium such as optical fiber, telephone line, Ethernet, etc., and the second communicator makes communications via Ethernet, CAN, etc. For example, the first communicator transmits and receives communication messages to and from an EMS, a local controller, other power electronics devices, etc. The second communicator obtains the characteristic information from the energy storage device (BMU), the power generation device, and the like connected to the power electronics device, and in addition, obtains measurement information/specified information during the operation in the energy storage device, power generation device, and the like. In addition, the second communicator, where the energy storage device (BMU) is connected to the power electronics device, periodically obtains measurement information (SOC, SOH, charge/discharge current, and charge/discharge voltage) which is variable information during the operation of the energy storage device (BMU). The second communicator can be realized by a wired communication medium such as Ethernet, CAN, etc. as described above or an electrical signal line that is specially defined by a vendor. The communicator of this embodiment is not limited to the above described configurations. In addition, in the case where the energy storage device is connected to the power electronics device, since an internal battery cell is generally has the characteristic of natural discharge, only one time of transmission is not sufficient for information of SOC, SOH, etc. to the EMS, local controller, other power electronics device and the like, and it is desirable that the characteristic of values always changing over time is taken into account in the similar manner as in the case of information of voltage, current, etc. and the values are notified as appropriate.

The configuration determiner 302 computes the configuration information indicative of the logical configuration of the system (logical configuration of master-slave relationship, etc.) on the basis of the characteristic information of this device and the other devices. The algorithm of computation of the configuration information is specified such that the common algorithm is shared by the respective power electronics devices. The configuration information is stored in the information storage 301. The configuration determiner 302 may include a function of obtaining part of the characteristic information illustrated in FIG. 4 (communication connection information, power connection information, etc.) by the aforementioned automatic recognition method. In addition, the configuration determiner 302 may obtain the characteristic information of the other devices via the communicator 304. In addition, the configuration determiner 302 may transmit the characteristic information of this device via the communicator 304 to the other devices.

The characteristic information obtained from the other devices is also stored in the information storage 301. The configuration determiner 302 determines the logical configuration (master-slave configuration, etc.) on the basis of the characteristic information of this device and other devices, for example, using all the characteristic information of the power electronics devices recognized by this device. In addition, the configuration determiner 302, for example, in a case where stoppage, failure of the power electronics device or separation of the power electronics device from the system occurred, standardizes (convergence) the characteristic information of this device and other devices among the power electronics devices if the change condition of the logical configuration has been satisfied, for example, if the value of the characteristic information of the power electronics device has been changed, and thereafter computes configuration information indicative of the new logical configuration in the similar manner as described above. When the configuration determiner 302 computed the new configuration information, the configuration determiner 302 may make a notification to that effect to the control instructor 303.

FIG. 6 illustrates an example of the configuration information. In this example, the configuration information may include a group identification number, a device ID of the master (device identification number), a device ID of the slave, and a device ID of an independent device. The independent device refers to a device that is neither a master nor a slave (device that is not subject to control from outside). As described above, each of the power electronics devices performs determination of the logical configuration (the master-slave relationship, etc.) by the configuration determiner 302 on the basis of the characteristic information set, and generates and updates the configuration information. A predetermined algorithm is implemented in all of the power electronics devices within the system such that the determination result is uniquely determined from the characteristic information set. By virtue of this, it is guaranteed that all configuration information obtained by each of the power electronics devices on the basis of the characteristic information set is in consistency as long as each of the power electronics devices has the same characteristic information set. In this embodiment, it is permissible that there exists a power electronics device that does not include the computation function of the logical configuration. In that case, the power electronics device in that state may receive the configuration information defined by the determination from the power electronics device having that computation function, recognize the role of this device using the received configuration information, and thus perform the operation. Since each of the power electronics devices can obtain the same determination result, it is possible to omit the processing of delivering the configuration information computed by this device to the other devices.

The control instructor 303, where this device is the master, generates control information associated with control instruction and other devices for this device, and sends a control instruction to the power conversion controller 305 of this device. Also, the control instructor 303 transmits control information to the power conversion controller 305 of the other devices via the communicator 304. The other devices generate the control instruction on the basis of the control information and send the control instruction to the power conversion controller 305. The control instructor 303, issues the control instruction for the power conversion controller 305, as the control instruction issued for the power conversion controller 305, on the basis of the real-time monitor control information or non-real-time monitor control information, which becomes necessary for power application function at the time of normal operation.

The real-time monitor control information includes instruction values and actually measured values of voltage, frequency, etc., and information for time synchronization and the like, for example, in the case of the function of output phase synchronization according to which the output phase is synchronized with respect to the other power electronics device. The non-real-time monitor control information includes, for example, charge/discharge plan information on the basis of the requests from the energy storage device (BMU) connected to a power electronics device, a power generation device of renewable energy, and a power system network.

This plan information may, for example, be expressed in the form of "horizontal axis: time; vertical axis: electric energy, etc." In order to configure this information, as an example, there is a method that uses information specific to charge/discharge control of the power generation device of the energy storage device (BMU), renewable energy, etc. For example, in the case of the energy storage device (BMU), there exist the concepts of rated charge/discharge power indicated by unit watt (W: Watt), rated capacity indicated by unit of watt hour (Wh), state of charge (SOC) indicated by percentage, and dischargeable time and chargeable time associated with SOC. In a constant current charging system which is a common charging system of the energy storage device (BMU), the amount of electrical power (amount of current) that is input and output by the battery cell in the energy storage device (BMU) continues to be a fixed state until the SOC indicated by percentage reaches a predetermined threshold. In view of this, it is possible to compute the chargeable time and dischargeable time, maximum charging/discharging power, and electrical energy necessary for charging/discharging (a product of chargeable/dischargeable time and electric energy) that are associated with the information by obtaining the value of the SOC from the energy storage device (BMU). In the constant current charging, since there is a characteristic that the amount of current necessary for charging is minimized after the SOC exceeded a predetermined threshold, it is possible to compute the approximation of the information necessary for the charge/discharge plan. Incidentally, as the electric energy at the time of the charge/discharge control, amount of current indicated by unit ampere time (Ah) and amount of voltage (Vh) indicated by unit volt time may be used, respectively, as well as the electric energy indicated by the unit watt hour (Wh). In addition, in the case of a power generation device of renewable energy such as solar power generation, wind power generation, and the like, it is not possible to store (charge) the electrical power, so that there is not the concept of the SOC, and it operates as a discharge-only device. In contrast, in the case of a heat storage device, it is not possible to discharge electrical power, so that it operates as a charging-only device. The plan information of the power electronics device is, on the basis of this information, created on the assumption that specific charge/discharge operation for the power device (or load) connected to this device is performed.

When preventing instantaneous interruption of the power supply in the power system network, real-time operation is desirable according to which communication messages are transmitted and received as appropriate. Meanwhile, when control is done at relatively moderate time intervals during a night time period, non-real-time operation is desirable wherein the operation timing interval is specified and the operation is performed at that specified interval. However, this embodiment does not depend on any specific operation mode such as real-time and non-real-time operations.

Figure 5:
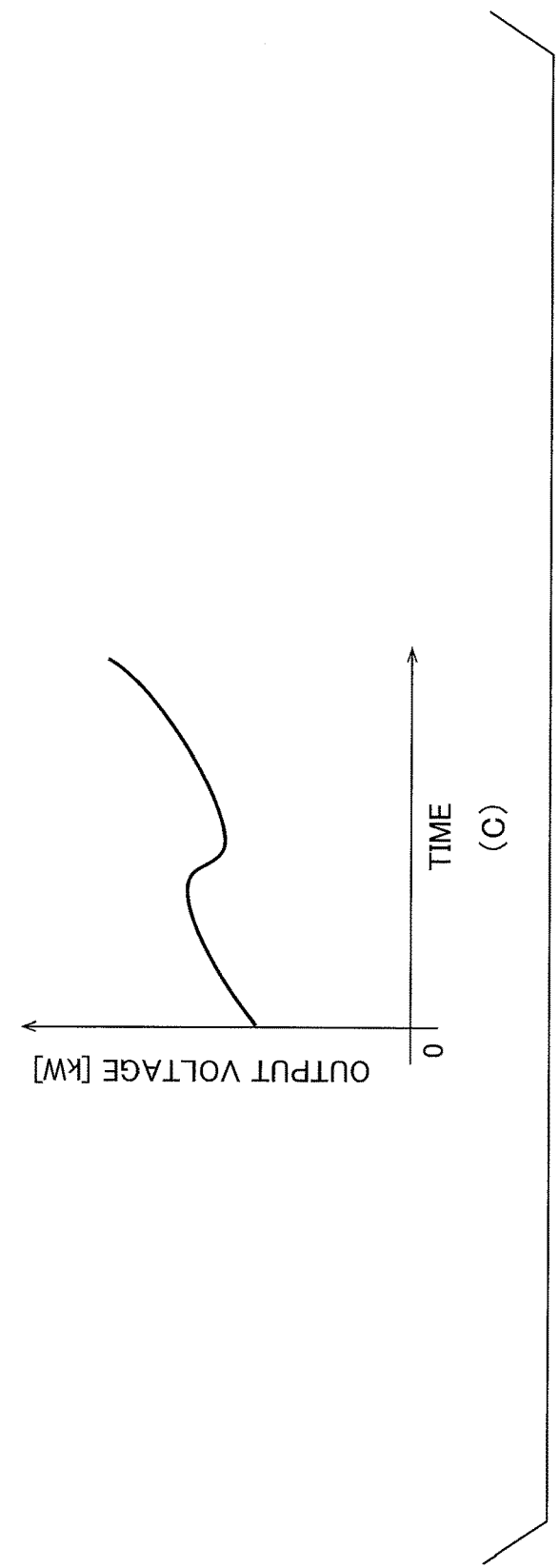
FIG. 5 illustrates an example of control information.

The control instructor 303 outputs the created control instruction to the power conversion controller 305, and the power conversion is performed by the power conversion controller 305. Also, if this device is the master, control information for the other devices is generated and transmitted via the communicator 304 to the control instructor 303 of the other devices. When the control information is received from the other devices, a control instruction is generated on the basis of this control information and output to the power conversion controller 305. In particular, the control instructor 303 of the device acting as the master performs operation of the total output value of the entire system, calculate the distribution of electrical power output between this device and the slave devices, and transmits control information that prescribes the distribution value by communications. The control information may prescribe, for example, as illustrated in FIG. 5(A), a scalar quantity such as an active power value and a reactive power value, and may indicate, as illustrated in FIG. 5(B), an output value for each time period, and may be expressed, as illustrated in FIG. 5(C), as a relationship between time and an output value in the form of graph or the like.

The power conversion controller 305 executes the power conversion in accordance with the control instruction received from the control instructor 303 (controls the power converter 152 of FIG. 2). The power conversion may specifically take various forms such as: converting alternating-current power into direct current in accordance with the control instruction from the power line (bus) and charging the energy storage device thereby; retrieving the energy stored in the energy storage device by an amount or time in accordance with the control instruction, converting the retrieved energy into alternating-current power and outputting the converted power on the bus; converting the energy generated by the power generation device into alternating-current power and output the converted energy on the bus; and converting the energy from the bus into direct-current power and supply the converted energy to the load at a predetermined electrical power. The control information of stopping the operation of the power generation device, the load and the like may be received from the EMS, the local controller, the master, etc. In this case, in response thereto, the operation of the power generation device may be stopped or power supply to the load may be stopped. Incidentally, in addition to the conversion between direct current and alternating current, there may be conversion between direct current and direct current and conversion between alternating current and alternating current.

The manager 306 monitors whether or not the change condition of the logical configuration (the master-slave relationship, etc.) applied in the system is satisfied, and when the change condition has been satisfied, the manager 306 causes the configuration determiner 302 to generate new configuration information (logical configuration). When the new configuration information (logical configuration) is generated in the configuration determiner 302, the manager 306 instructs the power converter 305 to perform control in accordance with the generated configuration information. The manager 306, after the change condition has been satisfied, manages such that the power conversion controller 305 performs power conversion in accordance with the control information given in advance until the execution of control based on the new configuration information is instructed for the power conversion controller 305 while leaving the logical configuration undefined. The following cases may be mentioned as the cases where the change condition has been satisfied a case where there is a change (variation) of the characteristic information of one from among other devices as well as this device (in particular there is a change of the value of the item used in computation of the configuration information); a case where stoppage, failure, or separation of other power electronics devices occurs; or a case where a case where a new power electronics device has been added may be mentioned. The manager 306 includes a judgment unit 306a that determines whether or not the change condition of the current logical configuration is satisfied. The manager 306 may operate as appropriate in cooperation with the configuration determiner 302 after the change condition has been satisfied and until the control based on the new configuration information is started.

As a more specific operation of the manager 306, in this embodiment, a critical section is specified so as to identify the period after the above-described change condition having been established and before starting the control based on the new configuration information. As one example, the setting of the critical section is performed by turning on the flag of the critical section. Specifying the critical section may be referred to as "enter the critical section" "start the critical section." During the critical section, the manager 306 causes the configuration determiner 302 to perform convergence processing such that the characteristic information set (the characteristic information of this device and the other devices) stored by the information storage 301 is made to agree with the characteristic information set stored by the other devices, and thereafter causes it to perform the re-generation of the configuration information. Meanwhile, the manager 306 instructs, during the critical section, the power conversion controller 305 to output the control instruction value in accordance with the control information given in advance. The control information given in advance refers to a preprogrammed control method applied during the critical section.

As the preprogrammed control method, for example, it may be possible that the control instruction value at any time within a predetermined time period with reference to the time at which the critical section is entered (for example, the time when or immediately before the critical section is entered, etc.) is kept on an as-is basis. Alternatively, there is a method according to which, for example, a certain percentage (for example, 80 percent) of the output value at any time within a predetermined time period with reference to the time at which the critical section is entered (for example, the time when or immediately before the critical section is entered, etc.) is kept. In addition, in another example, there is a method according to which the variation of the instruction value from the past to the time immediately before the critical section being entered is stored, and the instruction value during the critical section is predicted from the tendency of the change, and the predicted instruction value is used. In addition, there is a method according to which future reservation instruction value is downloaded in advance from the master, the EMS server, etc., and during the critical section, the downloaded reservation instruction value is used and the control is continued. If a predetermined time has elapsed but the characteristic information of each power electronics device does not converge and the critical section is not exited for a long time, the manager 306 may regard it as a critical error and execute the critical error management sequence. This may be, for example, stoppage or restart of all of the power electronics devices within the system.

The manager 306 performs convergence processing such that the stored characteristic information sets are in consistency among the power electronics devices, cancels the critical section when the re-generation of the configuration information has been completed, and starts the control under the new configuration information. Cancellation of the critical section may be expressed as exit from the critical section, or termination of critical section. As one example, cancellation of the critical section is performed by turning off the flag of the critical section. The manager 306 or any other processor may determine whether or the critical section is entered by confirming the flag of the critical section.

The detector 307 detects parameters such as at least one of a voltage value, a current value, and a housing temperature. The detected value is stored in the information storage 301 as part of the characteristic information. Also, the detector 307 performs detection processing of the power line connection. The detection processing of the power line connection refers to processing of comparing at least one of voltage value, voltage waveform, frequency, and harmonic ratio detected by this device with those of the other devices which were obtained through communication via the communicator 304, and determination of whether or not they are connected to the same power bus. For example, if both of them agree with each other or the difference between both of them falls within a predetermined range, it is determined that they are connected to the same power bus. Otherwise, it is determined that it is connected to a power bus different from the one to which the other devices are connected, or disconnected. In this embodiment, as illustrated in FIG. 4, the communication connection information and power connection information are made to be part of the characteristic information, but one or both of the communication connection information and power connection information may be managed as part of the configuration information.

As discussed in the foregoing, there exists a master-slave relationship as one example of the logical configuration of the control among the power electronics devices. FIG. 7 illustrates by way of example the model of the master-slave relationship. A plurality of types are envisaged as the master-slave relationship. FIG. 7 illustrates four examples as models I, II, III, and IV. A, B, C, and D of the leftmost column indicated in the vertical direction represent the power electronics devices 110a, 110b, and 110c, 110d illustrated in FIG. 1, respectively.

In the model I, there is only one master within the system, and the remaining power electronics devices all become slaves. In such a model, the plurality of slaves perform cooperative operation under the instruction of the master.

In the model II, priority orders are assigned to all of the power electronics devices, and it is assumed that the device having the highest priority order has the highest control authority (in other words, corresponds to the master). In the model II, when the first-priority-order power electronics device stops, the power electronics device of the second-highest priority order functions as the master in lieu of the first-priority-order device.

In the model III, the role of the master is divided into segments and the divided roles of the master are allocated on a per-control-type basis. One power electronics device may act as the master having a plurality of roles, and there may exist a power electronics device having no role. In the example of the figure, the power electronics device 110a is the power control master, and the power electronics device 110b serves as the synchronization master that transmits a reference signal for synchronization of the output (phase) of the plurality of power electronics devices. In addition, the power electronics device 110c serves as the communication master which may act as a communication gateway with respect to the higher-order EMS server and provide DHCP service. The power electronics device 110d is a slave that does not have any role as the master. In the model III, even a master becomes a slave with regard to roles other than the role allocated to this device.

In the model IV, the relationship of the master and the slaves is defined as a relationship between two power electronics devices, and a tree-shaped master-subordinate relationship (master-slave relationship) is constructed. In the illustrated example, the power electronics device 110b is a slave of the power electronics device 110a and also is a master of the power electronics devices 110c and 110d.

This embodiment is not limited to the models I to IV illustrated in FIG. 7 and a combined model of two or more of these models and other models is also possible.

For example, suppose that there is a model that combines the models II and III. In this model, three types of masters of the power control master, the synchronization master, and the communication master are allocated for a plurality of power electronics devices within the system in accordance with a predetermined order. As one example, the power electronics device 110a becomes (power control master order, synchronization control master order, communication control master order)=(1, 3, 4), and the power electronics device 110b becomes (2, 1, 3), the power electronics device 110c becomes (3, 4, 1), and the power electronics device 110d becomes (4, 2, 2). In other words, the order (priority) of the power control master becomes the order of the power electronics device 110a, the power electronics device 110b, the power electronics device 110c, and the power electronics device 110d; the order of the synchronization control master becomes the order of the power electronics device 110b, the power electronics device 110d, the power electronics device 110a, and the power electronics device 110c; and the communication control master order becomes the order of the power electronics device 110c, the power electronics device 110d, the power electronics device 110b, and the power electronics device 110a.

Here, it is also possible that the relationship of the master and the slaves (logical configuration) is not determined by one round of processing, but determined by a plurality of stages. For example, in a system constituted by a plurality of power electronics devices, one device is selected as the master in accordance with the model I of FIG. 7, the remaining devices are made to act as the slaves, and thereby the logical configuration (lower-layer logical configuration) serving as the basis is determined. The master (configuration master) in the logical configuration (lower-layer logical configuration) serving as the basis assigns roles to each of the slaves by communications, and thus a more advanced logical configuration (upper-layer logical configuration) is determined. The advanced logical configuration (upper-layer logical configuration) may be, for example, a logical configuration such as the model III of FIG. 7.

The model of the master-slave relationship explained by FIG. 6 can be called a model (quasi-autonomous distributed model) that dynamically determines the master(s) and the slave(s). On the other hand, in addition to the model of the master-slave relationship as a control model, there are another model (centrally controlled model) according to which, in a case where there exist a central control device, then that central control device performs the centralized control while each of the power electronics devices is placed under the control of the central control device, and a fully autonomous distributed model according to which coordinated control is realized without determining the master or the slave(s). FIGS. 8(A), 8(B), and 8(C) illustrate the centrally controlled model, the quasi-autonomous distributed model, and the fully autonomous distributed model, respectively.

In the centrally controlled model of FIG. 8(A), in a case where the central control device (EMS server, etc.) exists, the central control device performs centralized control for each of the power electronics devices. In this case, the central control device can be regarded as a fixed master. The central control device may be a power electronics device.

Also, the central control device may be a server computer, etc. In addition, the central control device and the power electronics device subordinate thereto do not need to be always arranged physically in vicinity of each other. There may be an EMS where the central control device is connected to the power electronics devices via the communication network, and it also may be a cloud system.

In the quasi-autonomous distributed model of FIG. 8(B), a fixed master as in FIG. 8(A) does not exist, and the master and the slave(s) are dynamically determined within the system. In this model, the master is determined from among a plurality of devices, and the coordinated control is performed under the control of the master. In the figure, "M" enclosed by a circle represents the master, "S" enclosed by a circle represents the slave. Hereafter, this annotation may be used in the figures mentioned below.

In the fully autonomous distributed control model of FIG. 8(C), coordinated control is realized without determining the master or slaves. For example, in a case where one operating power electronics device evenly distributes the system's total output instruction value and each power electronics device performs power output, it is possible to realize the cooperative operation without determining the roles of the master and the slaves, as long as the number of power electronics devices operating in the system and the total output instruction value are known. In addition, in a case where it is guaranteed, without the even distribution, that the stored characteristic information sets agree with each other among all of the devices within the system, it is also possible to directly compute the control instruction value, using a predetermined function, from the characteristic information of this device and other devices. For example, suppose that a power electronics system is constituted by three power electronics devices. It may be envisaged that each of the power electronics devices exchanges and shares the characteristic information and computes the hash value of the characteristic information for each power electronics device, and the output is distributed at the ratio of 3:2:1 in order of magnitude of hash values. In this case of the fully autonomous distributed model, the number of necessary processing and communication steps can be reduced when compared with a case where the master first makes determination and then cooperative operation is performed by the instruction of the master as in the case of the quasi-autonomous distributed model.

Figure 8:
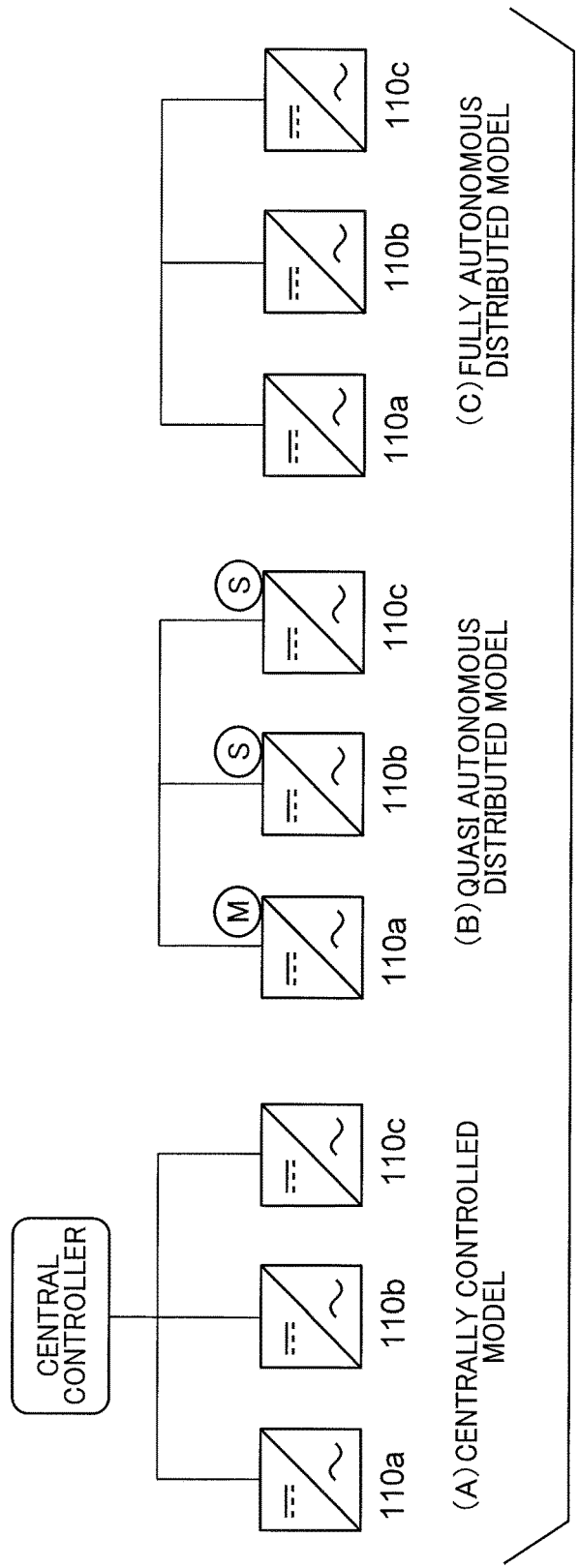
FIG. 8 illustrates an example of a control mode of a distributed power source system envisaged in this embodiment.

Also, although not illustrated in FIG. 8, a model (combined model) may be envisaged according to which the master is further determined in a system in which a central control device exists as illustrated in FIG. 8(A). The master in this case may be determined by the central control device or may be determined by communication and operation between or among the power electronics devices. In this combined model, for example, the total output of the system is determined by the central control device, but it is possible that, for example, the distribution of the output among a plurality of power electronics devices constituting the system is determined by the master. When it is assumed that the central control device is the master that determines the total output of the system, it is possible to recognize that there exist two masters having different roles. By adopting such a combined model, it is made possible to realize distribution of roles such that non-real-time control such as the determination of the total output of the system may be undertaken by the central control device (cloud system, etc.) that is susceptible to communication delay and packet loss but suited to management of each of the power electronics devices, and high-speed re-configuration of the mode of control (FIGS. 7 and 8) in the event of failure of the slave, feedback control that is required to be real-time, etc. are undertaken by the locally installed master. Also, by adopting the combined model, it is made possible for the master to perform fine control of the slaves by the central control device controlling the master as if a plurality of power electronics devices were a single large-capacity power electronics device.

This embodiment may be applied to any one of the three control models illustrated in FIG. 8. In addition, it is possible to combine these three control models with the master-slave relationship model of FIG. 7. In addition, this embodiment can be applied to switching of the models in a case of re-computation (update) of the logical configuration (between the master and the slave of FIG. 7, between the control models of FIG. 8, or between the master-slave relationship model and the combination of the control models).

Figure 9:
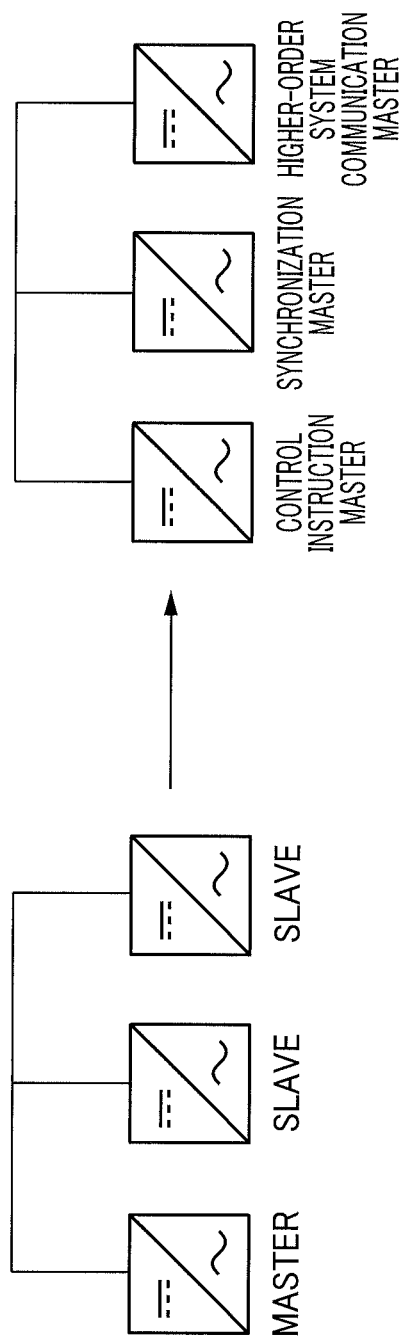
FIG. 9 is a diagram illustrating an example of switching of models.

FIG. 9 illustrates an example of switching of the models. In the example of FIG. 9, initially, the master is determined by the quasi-autonomous distributed model plus the model I of FIG. 8(B) or the aforementioned combined model plus the model I. Subsequently, the logical configuration is recomputed (re-computation of the configuration information), and roles are assigned to each of the power electronics devices (see the model III of FIG. 7), as the updated logical configuration, under the instruction of the master or central control device (a central control device is not illustrated in FIG. 9), and the model is changed to the quasi-autonomous distributed model plus the model III, or the aforementioned combined model plus the model III.

As described above, the power electronics device of this embodiment exchanges the characteristic information (and the later-described hash information as required) with the other power electronics devices, and performs computation of the configuration information (generation of the logical configuration). It is not necessary that all of the power electronics devices within the system are always involved in the exchange. It is also possible to divide the internal system into several sub-groups, exchange the characteristic information (and the later-described hash information as required) only within the sub-group, and perform determination of the configuration information.

Figure 10:
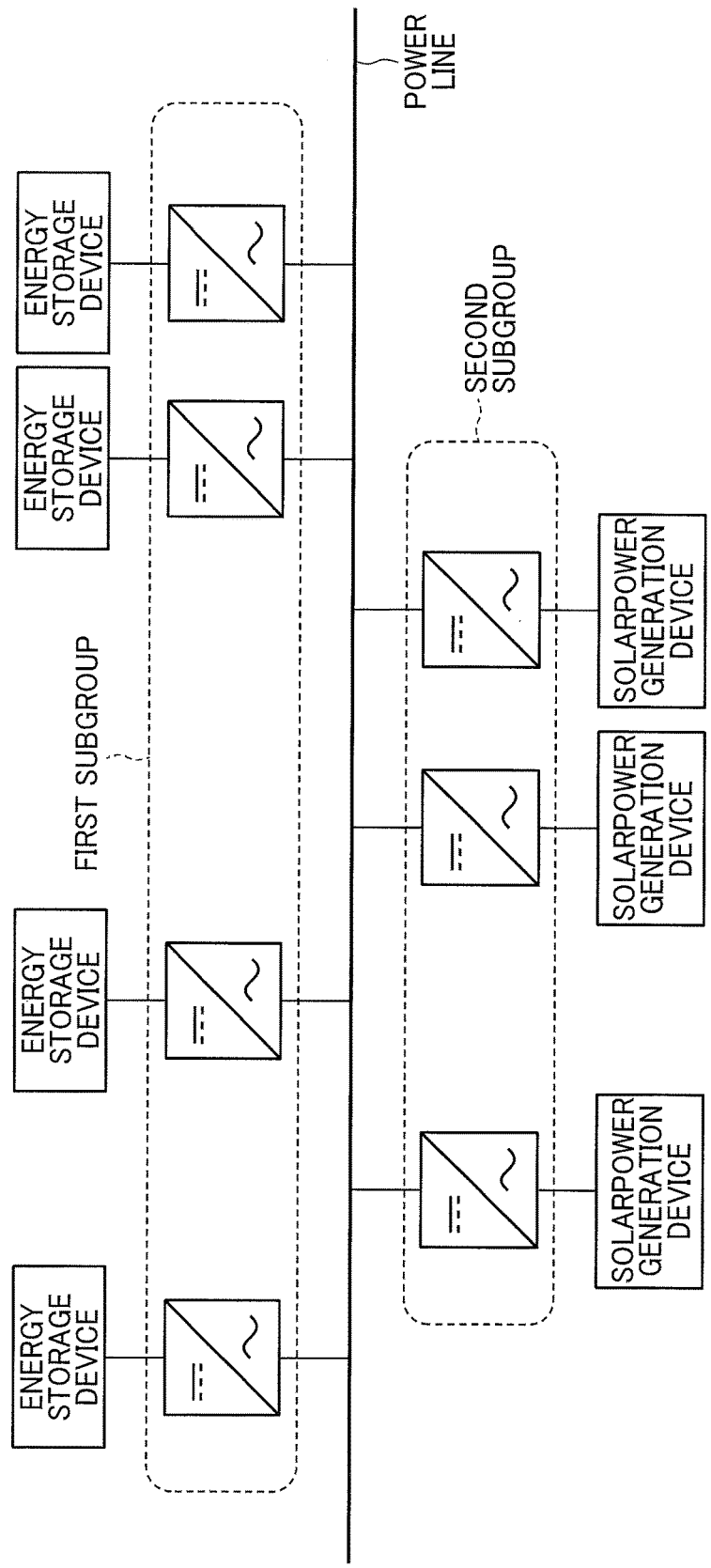
FIG. 10 is a diagram illustrating an example of dividing a system into a plurality of sub-groups.

FIG. 10 illustrates an example of dividing the internal system into a plurality of sub-groups. Here, an example is illustrated where the system is divided in accordance with the classification of the power devices connected to the power electronics devices. For example, suppose that there exist four energy storage devices and the power electronics devices connected thereto in the system. In addition, suppose that there exist three solar power generators and power electronics devices connected thereto. In this case, the system is divided into two sub-groups of an energy storage device group and a solar power generator group. It is possible to perform exchange of the characteristic information, etc. and generation of the configuration information within each of the sub-groups. At this point, the master is determined in the sub-group, the characteristic information is exchanged between the sub-group masters, and thus the group master is determined. At this point, also with regard to the critical section, two critical sections, i.e., a critical section for the sub-groups and a critical section for the entire system may be defined for use in the control.

Here, a specific example is illustrated where the configuration information that represents the logical configuration (in this context, the master-slave relationship) is computed on the basis of the characteristic information (characteristic information set) of this device and the other devices.

As one example of a master determination method, the connected device types within the characteristic information of this device and other devices are compared, and the priority is specified that becomes higher in the order of the energy storage device>>the power relay device>>the power generation device>>the load device (weighting becomes higher in this order), and the master is determined on the basis of the specified priority. This priority order takes into account the device that is the most likely to operate at the time of occurrence of abnormality, etc. such as a case where a certain power electronics device fails. For example, it is preferable in terms of the controllability to select, as the master, a power electronics device power connected to a storage device that is capable of storing power and supplying power necessary for preemptive operation at the time of occurrence of abnormality.

When there exist two or more energy storage devices, the power conversion types are compared, and high priority is specified in the order of AC/DC>>AC/AC>>DC/DC (weighting becomes higher in this order), and the master is determined on the basis of the priority.

In a case where there exist two or more power electronics devices whose power conversion types are identical, the items of other characteristic information are compared and the master is determined. Since the device identification number is unique within the system, it is made possible to uniquely determine the priority order of the master by including the device identification number in the comparison targets. Also, as the hash value or random number is also expected to be unique values, it is similarly possible to uniquely determine the priority order of the master using the hash value or random number.

Since the EMS/central control device is generally realized by high-performance computer that is capable of advanced algorithm processing, it is desirable in terms of the performance that the same device is selected as the master in a case where there exists the EMS/central control device in the system. The local controller may be classified as an EMS.

As described above, since the power electronics device according to this embodiment is provided with the algorithm for uniquely computing the configuration information from part of or all of the items of the characteristic information set, it is possible to guarantee the consistency of the configuration information that the individual devices independently computed, as long as the respectively stored characteristic information sets agree with each other among the two or more power electronics devices. In order to confirm that, among the power electronics devices, the characteristic information set held by this device agrees with the characteristic information set held by the other devices, it suffices, as the simplest method, that the characteristic information set held by this device is transmitted by communication to the other devices, or the characteristic information set held by the other devices is received by communication.

Figure 11:
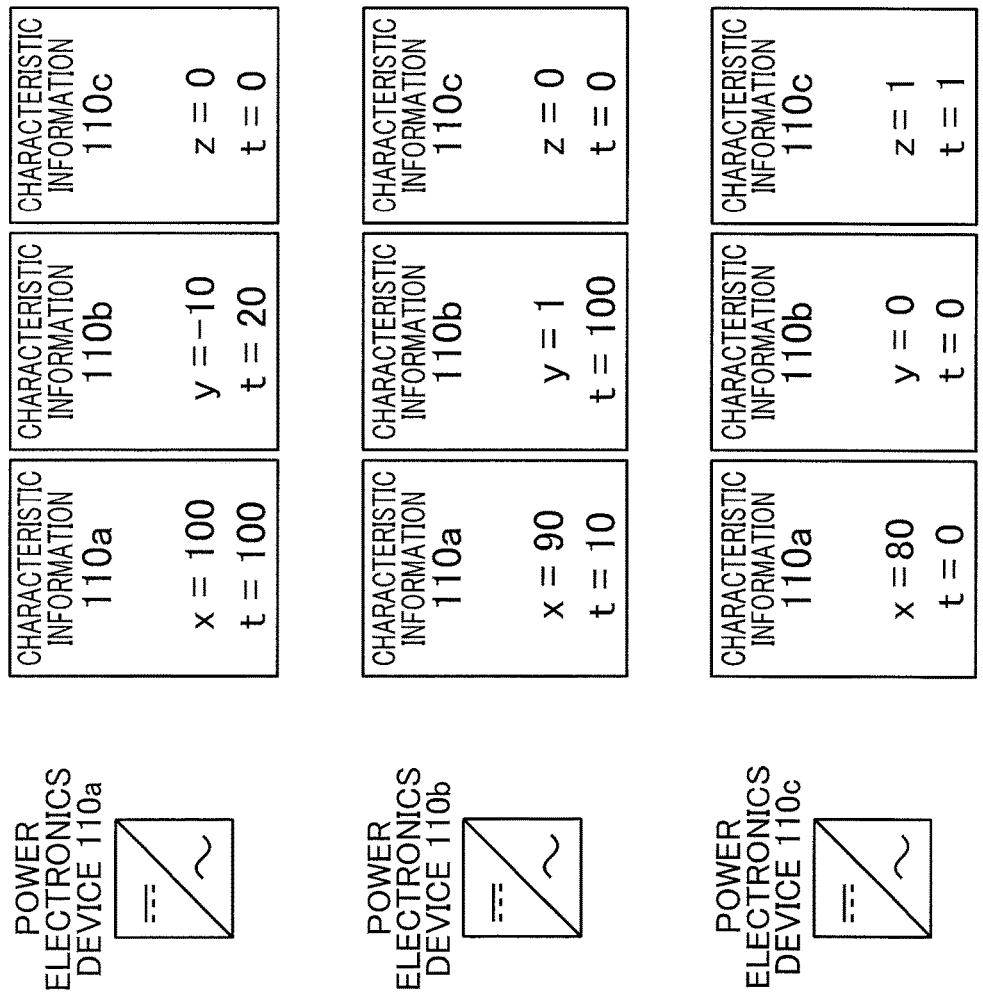
FIG. 11 is a diagram explaining confirmation of consistency of the characteristic information and a convergence method in the case of inconsistency.

The confirmation of the consistency of the characteristic information sets and the convergence processing in the case of inconsistency are explained with reference to FIG. 11. It is assumed here that there exist three power electronics devices 110a to 110c in the system and part of the characteristic information sets stored by each of the power electronics devices are not in consistency. The variables "x," "y," and "z" represent the characteristic information of the power electronics devices 110a, 110b, and 110c, respectively, and "t" is a time stamp at the time when the characteristic information was updated. The time stamp is the time at which the last characteristic information was updated, and, for example, the time stamp "t" of the characteristic information "x" of the power electronics device 110a is the time at which the power electronics device 110a last updated the characteristic information "x."

In the example of the figure, the power electronics device 110a stores "100" as the characteristic information "x" of the power electronics device 110a itself, "−10 as the characteristic information "y" of the power electronics device 110b, and "0" as the characteristic information "z" of the power electronics device 110c. In other words, it stores (x, y, z)=(100, −10, 0). Incidentally, the values of the characteristic information are given for the sake of explanations and actually they are not limited to expression by such a single numerical value.

The power electronics device 110b stores "90" as the characteristic information "x" of the power electronics device 110a, "1" as the characteristic information "y" of the power electronics device 110b itself, and "0" as the characteristic information "z" of the power electronics device 110c. In other words, it stores (x, y, z)=(90, 1, 0).

The power electronics device 110c stores "80" as the characteristic information "x" of the power electronics device 110a, "0" as the characteristic information "y" of the power electronics device 110b, and "1" as the characteristic information "z" of the power electronics device 110c itself. In other words, it stores (x, y, z)=(80, 0, 1).

In view of the foregoing, it is understood that (100, −10, 0), (90, 1, 0), and (80, 0, 1) are inconsistent with each other, and accordingly the characteristic information sets stored in each of the power electronics devices are inconsistent with each other.

Figure 12:
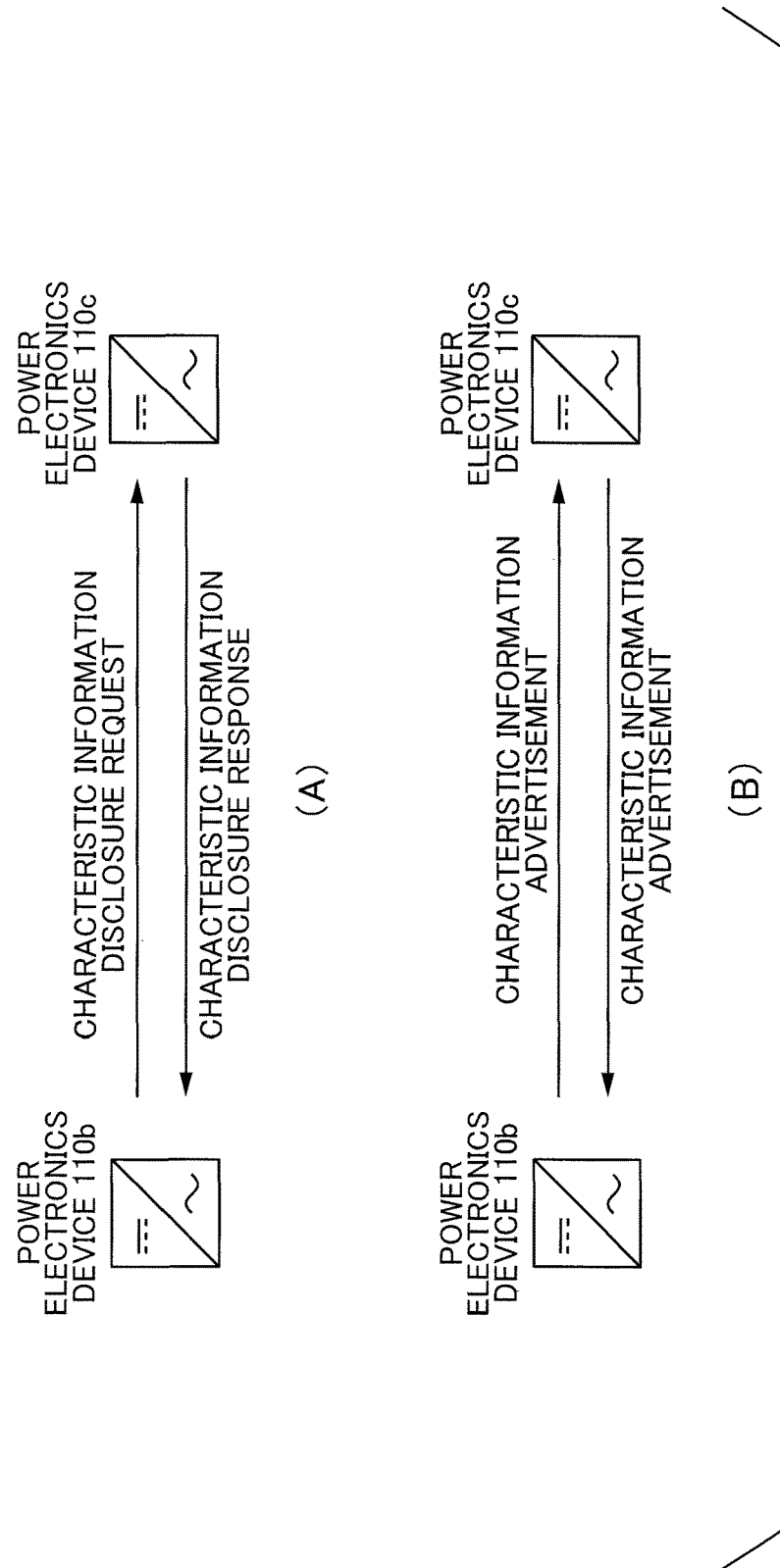
FIG. 12 illustrates an example of a sequence in exchanging the characteristic information.

Focus is given to the power electronics devices 110b and 110c. The characteristic information stored by the power electronics devices 110b and 110c is exchanged by communication between the power electronics devices 110b and 110c. As the exchange method, as illustrated in FIG. 12(A), there is exchange by a disclosure request message and a disclosure response message of the characteristic information. Alternatively, as illustrated in FIG. 12(B), there is exchange, etc. by a characteristic information advertisement message that is transmitted in every predetermined period or transmitted with the update of the characteristic information serving as the trigger. The exchanged characteristic information may be only characteristic information of this device, or the characteristic information set held by this device. The explanation here is continued in the context of the latter.

After the exchange, the power electronics devices 110b and 110c respectively recognize that the characteristic information set (characteristic information "x" to "z") obtained by the exchange is in inconsistency with the respectively stored characteristic information set (characteristic information "x" to "z"). When it has been recognized that the characteristic information is in inconsistency, the power electronics devices 110b and 110c respectively enter the critical section. During the critical section, the logical configuration (configuration information) remains undefined, and the power conversion is controlled in accordance with predetermined control information so as to maintain the availability of the system. Meanwhile, convergence of the characteristic information is attempted, and the new logical configuration (configuration information) is computed.

Figure 13:
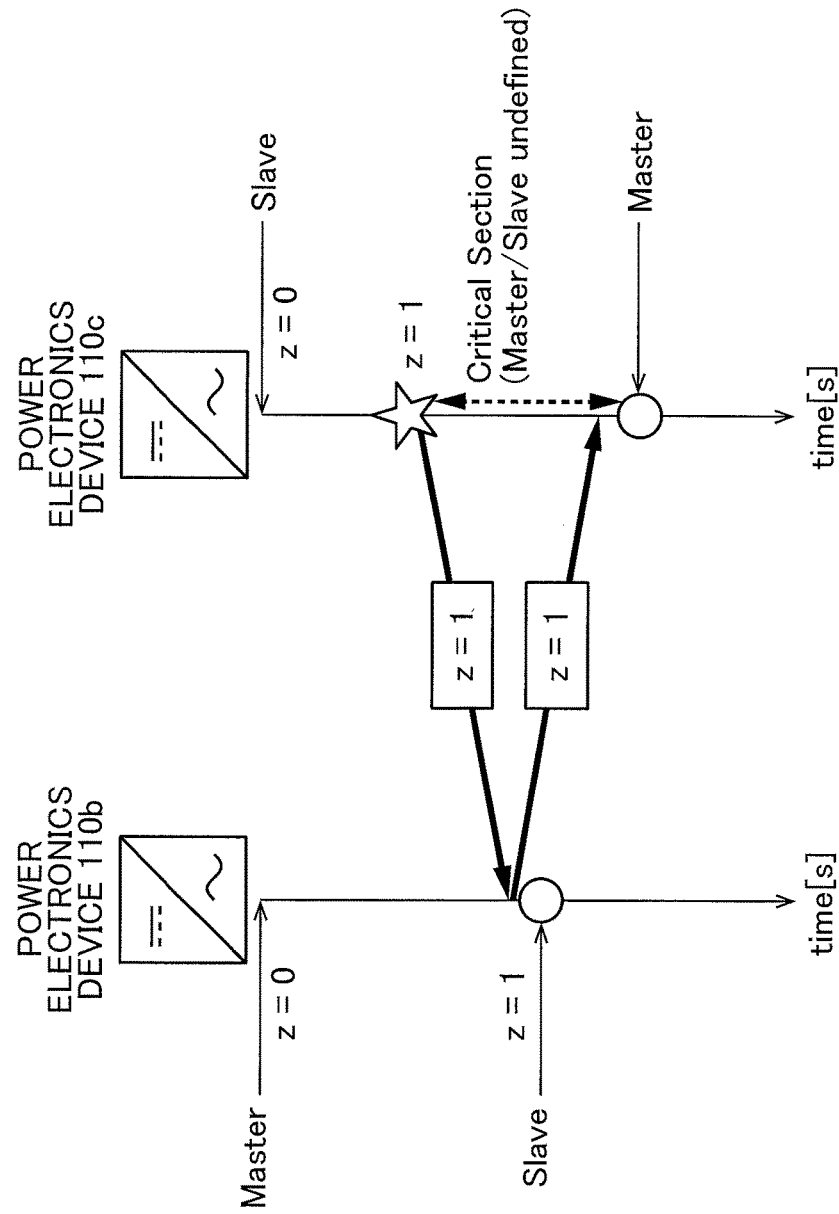
FIG. 13 is a diagram illustrating an example of an operation sequence including setting of a critical section in a case where there are three power electronics devices.

FIG. 13 illustrates by way of example an operation sequence in a case where a critical section is specified in the course of updating/exchanging of the characteristic information by the power electronics devices 110b and 110c. Here, it is assumed that only two power electronics device in operation exist in the system (or a sub-system).

In the initial state, the characteristic information of the power electronics device 110c is given as z=0, and z=0 is shared by the power electronics devices 110b and 110c. In addition, the power electronics device 110b is the master, and the power electronics device 110c is the slave. A predetermined period of time elapsed after the initial state, the update of z=1 occurs in the power electronics device 110c (which occurs at the timing of the asterisk). This corresponds to a case where, for example, the update takes place as a result of the operation duration of the power electronics device 110c reaching or exceeding one hour and accumulation of stable operation performances. The power electronics device 110c, when having updated the characteristic information "z" to 1, enters the critical section and delivers the update message of the characteristic information "z" to the other surrounding power electronics devices. The update notification message includes the characteristic information "z." The method of delivering the characteristic information "z" may be active message transmission or passive response to a characteristic information disclosure request from the other devices. The power electronics device 110c in the critical section determines that master or slave is undefined.

Meanwhile, the power electronics device 110b at the time of the initial state recognizes the characteristic information z=0 of the power electronics device 110c. The power electronics device 110b, when having recognized the update of z=1 by the message exchange, does not switch to the critical section and transmits the message to the effect that z=1 has been recognized to the power electronics device 110c. The power electronics device 110b does not enter the critical section because only two power electronics device exist in the system and the update of the characteristic information "z" of the power electronics device 110c was notified from the power electronics device 110c itself. A circle on an axis on the side of the power electronics device 110b indicates the timing at which the power electronics device 110*b* recognized the update of the characteristic information of the power electronics device 110*c* and the updated characteristic information (in other words, the timing at which a consensus on the update of the characteristic information was established on the side of the power electronics device 110*b*). Incidentally, an algorithm may be adopted according to which, on the operation flow, the power electronics device 110*b* also enters temporarily the critical section and immediately exits the critical section.

The power electronics device 110*c* cancels the critical section when it has been confirmed that the update of z=1 has been recognized by the power electronics device 110*b*. A circle on an axis on the side of the power electronics device 110*c* represents the timing at which the power electronics device 110*c* grasped the fact that the update of the characteristic information and the updated characteristic information of the power electronics device 110*c* have been recognized by the power electronics device 110*b* (in other words, the timing at which a consensus on the update of the characteristic information has been established on the side of the power electronics device 110*c*).

Each of the power electronics devices respectively performs the re-generation of the configuration information (re-determination of the master-slave relationship) at the timing (the timing of the circle) at which the consensus on the update of the characteristic information has been established, on the basis of the characteristic information set held by this device. As a result, it is determined independently by each of the power electronics devices 110*b* and 110*c* that the power electronics device 110*b* becomes the slave and the power electronics device 110*c* becomes the master (in other words, the determination result of the power electronics device 110*b* becomes identical with the determination result of the power electronics device 110*c*). The power conversion controller 305 of each power electronics device thereafter respectively performs control associated with the power conversion in accordance with the newly determined master-slave relationship (controls the power converter 152 of FIG. 2).

Figure 14:
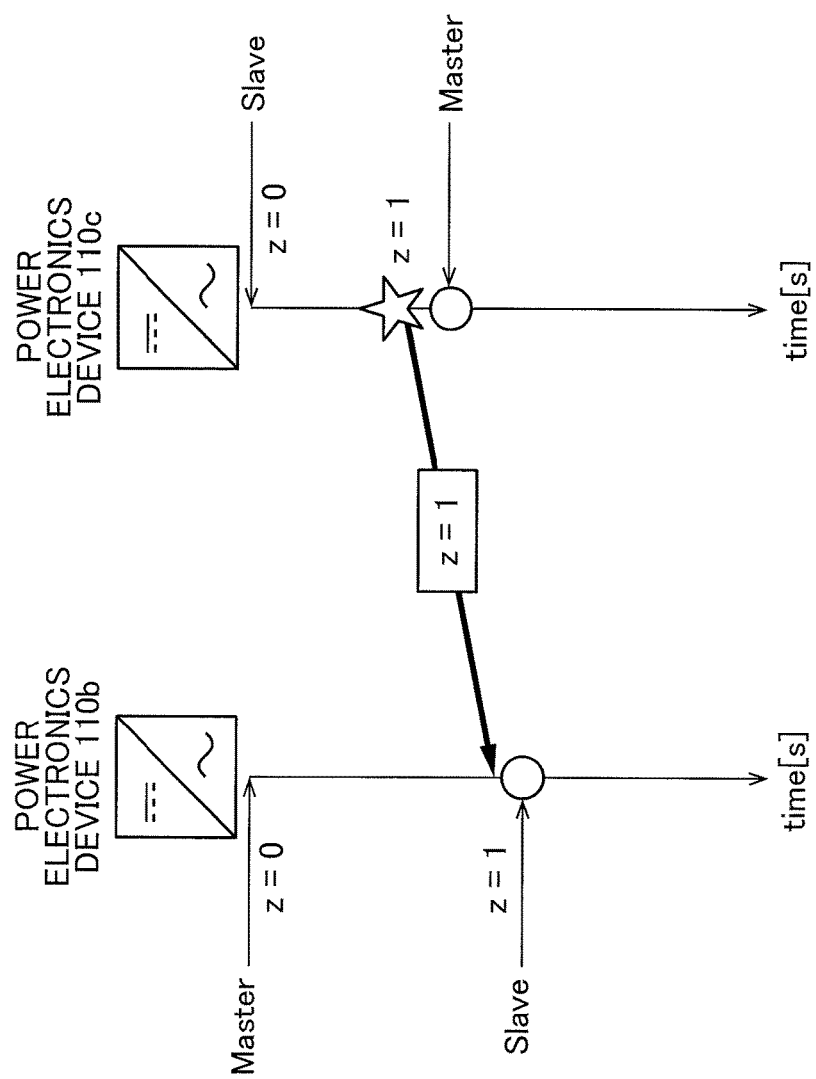
FIG. 14 is a diagram explaining a problem in a case where the critical section is not specified.

FIG. 14 illustrates, in the similar manner as in FIG. 13, an example of the operation sequence performed without specifying the critical section specified in a case where there only exist the power electronics device 110*b* and the power electronics device 110*c*. When the critical section is not specified, there occurs a problem that two masters temporarily exist in the system. Specifically, the power electronics device 110*c* re-generates the configuration information at the timing at which the characteristic information "z" of this device has been updated, and the power electronics device 110*c* determines that this device has become the master and the power electronics device 110*b* has become the slave. However, at this point, the update of the characteristic information "z" is not notified to the power electronics device 110*b*, so that the power electronics device 110*b* recognizes that the power electronics device 110*b* is the master and the power electronics device 110*c* is the slave. Therefore, the configuration information is inconsistent between the power electronics devices (recognition of the master-slave relationship is not the same), and there may occur malfunction in the coordinated control. This becomes more significant in a situation where a packet loss may occur in the communication. In an initial setting of a general TCP communication, a packet is retransmitted when an ACK is not returned after waiting for 200 ms following the transmission of the message. Accordingly, in the case where the critical section is not specified, when a packet loss occurs once in the transmission of the update notification message notifying the characteristic information x=1, it follows that, after the update, masters simultaneously exist for at least 200 ms. As a result, the power electronics device 110*b* and the power electronics device 110*b* respectively transmits the control instructions to each other.

To address such a problem, as illustrated in the example operation sequence of FIG. 13, it is made possible to prevent inconsistency of the configuration information among the power electronics devices (inconsistency in the recognition of the master-slave relationship) by providing the critical section, i.e., a configuration information undefined period (master-slave undefined period) in accordance with this embodiment. Thus, it is made possible to achieve stable cooperative operation by the multiple power electronics devices.

Meanwhile, with regard to the power control, the power electronics device that entered the critical section (the power electronics device 110*c* in the example of FIG. 13) continues the power control in accordance with the predetermined control information (a preprogrammed control method) during the critical section. Specifically, in this embodiment, the management of the configuration information (the master-slave relationship) and the power control are treated as distinct processes, and in the normal state, the power electronics device (slave) performs the power control using the instruction value issued by the master, but once it enters the critical section, during that time, the slave (and also the master in a case where the power electronics device that entered the critical section is the master) continues the power control in accordance with the preprogrammed control method. For example, the power electronics device that is placed in the critical section keeps the instruction value immediately before the critical section and continues the power control. In this manner, with regard to the configuration information, preference is given to establishment of the consistency among the plurality of power electronics device, and there is provided a period during which the master-slave relationship is undefined, but with regard to the power control, preference is given to the operational continuity, and it is allowed to perform the operation without the consistency between the plurality of power electronics device. Incidentally, in a case where the power electronics device that entered the critical section is the master, this master should also stop the instruction or the control for the slave during the critical section (alternatively, it may be configured such that even when the slave receives the instruction of control from the master, the instruction is ignored).

Figure 15:
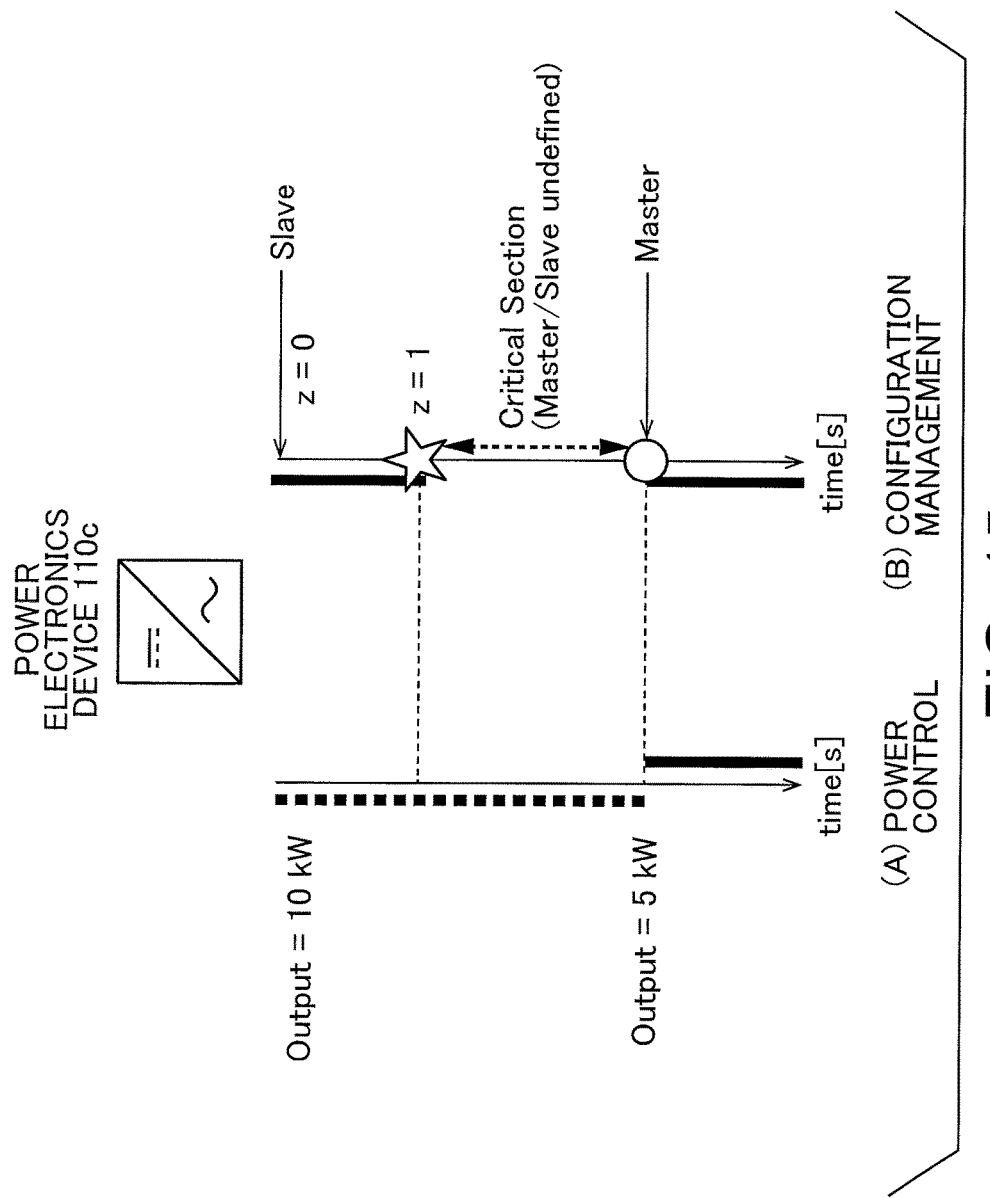
FIG. 15 illustrates an example of power control performed in a case where the critical section is entered.

FIG. 15 illustrates an example of power control performed in the case where the power electronics device 110*c* entered the critical section in the example operation sequence illustrated in FIG. 13. In this example, the power electronics device 110*c* placed in the critical section keeps the output of 10 kW in accordance with the most recent instruction value. After termination of the critical section, it operates in accordance with the instruction value of the power electronics device that has become the master under the new master-slave relationship. In this example, as the power electronics device 110*c* itself has become the master, the output value of this device is determined as 5 kW, and output of 5 kW is performed after termination of the critical section.

Figure 16:
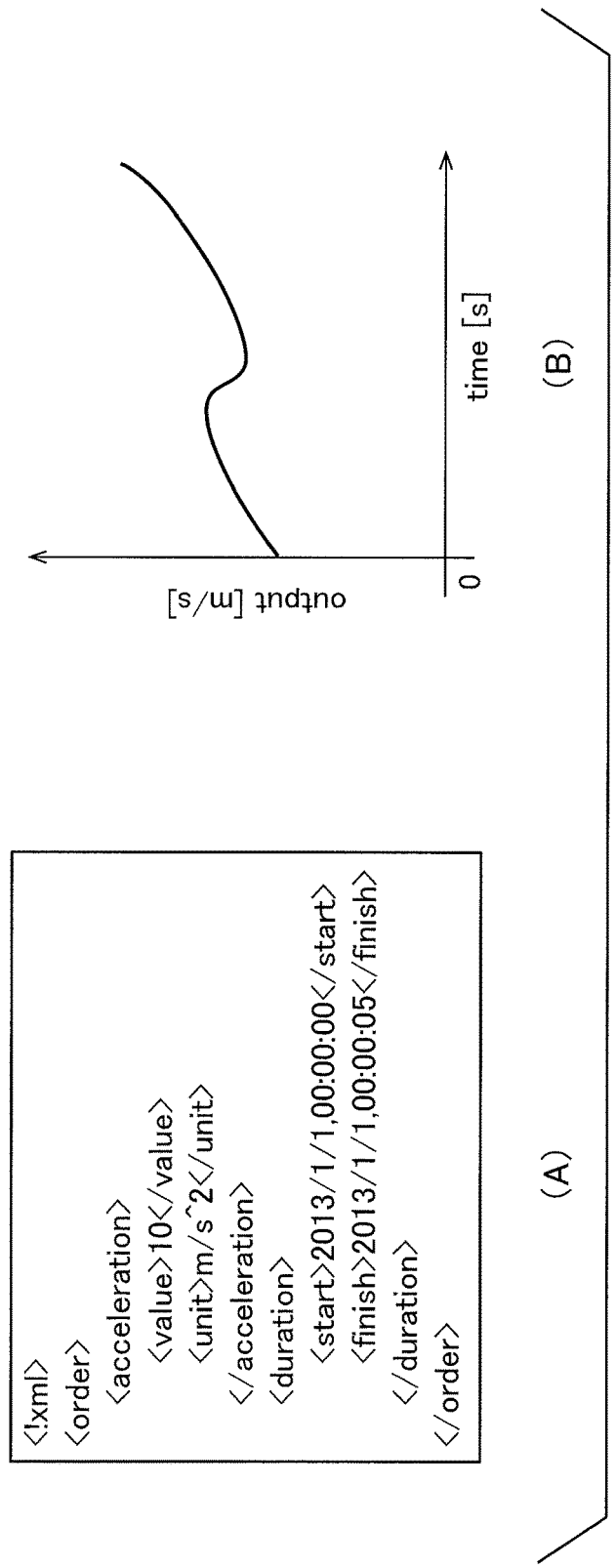
FIG. 16 illustrates an example of a profile including future information.

As an example of the power control performed during the critical section, as an example other than using the most recent instruction value, output active power value that is designated by a predetermined constant may be used. Alternatively, power control may be performed in accordance with a profile including future information. FIG. 16 illustrates an example of the profile including the future information as an example of the predefined control information (a preprogrammed control method). In FIG. 16(A), it is indicated that the output is changed from the previous value at 10 m/s2 from Jan. 1, 2013 at 0 hour 0 minute 0 second to Jan. 1, 2013 at 0 hour 0 minute 5 seconds. In FIG. 16(B), time variation of the output is indicated based on a predetermined time point (for example, the time at which the critical section was entered). Also, as another example, a method is conceivable according to which future change is predicted by a predetermined algorithm and based on the history of variation of output in the past and the output is changed at and after the time when the critical section was entered so as to be adjusted to the predicted change. As one example of the application of the power electronics device, where a motor drive system is envisaged, in most cases abrupt variation of the target number of output rotations is not desirable, and in this case, it will be desirable to perform control in accordance with information that causes variation of the target value, in place of designating the predetermined constant value.

In the example of the operation sequence explained by FIG. 13, a case where there exist two power electronics devices in the system has been explained. Here, the operation sequence is explained in a case where three power electronics devices exist in the system.

Figure 17:
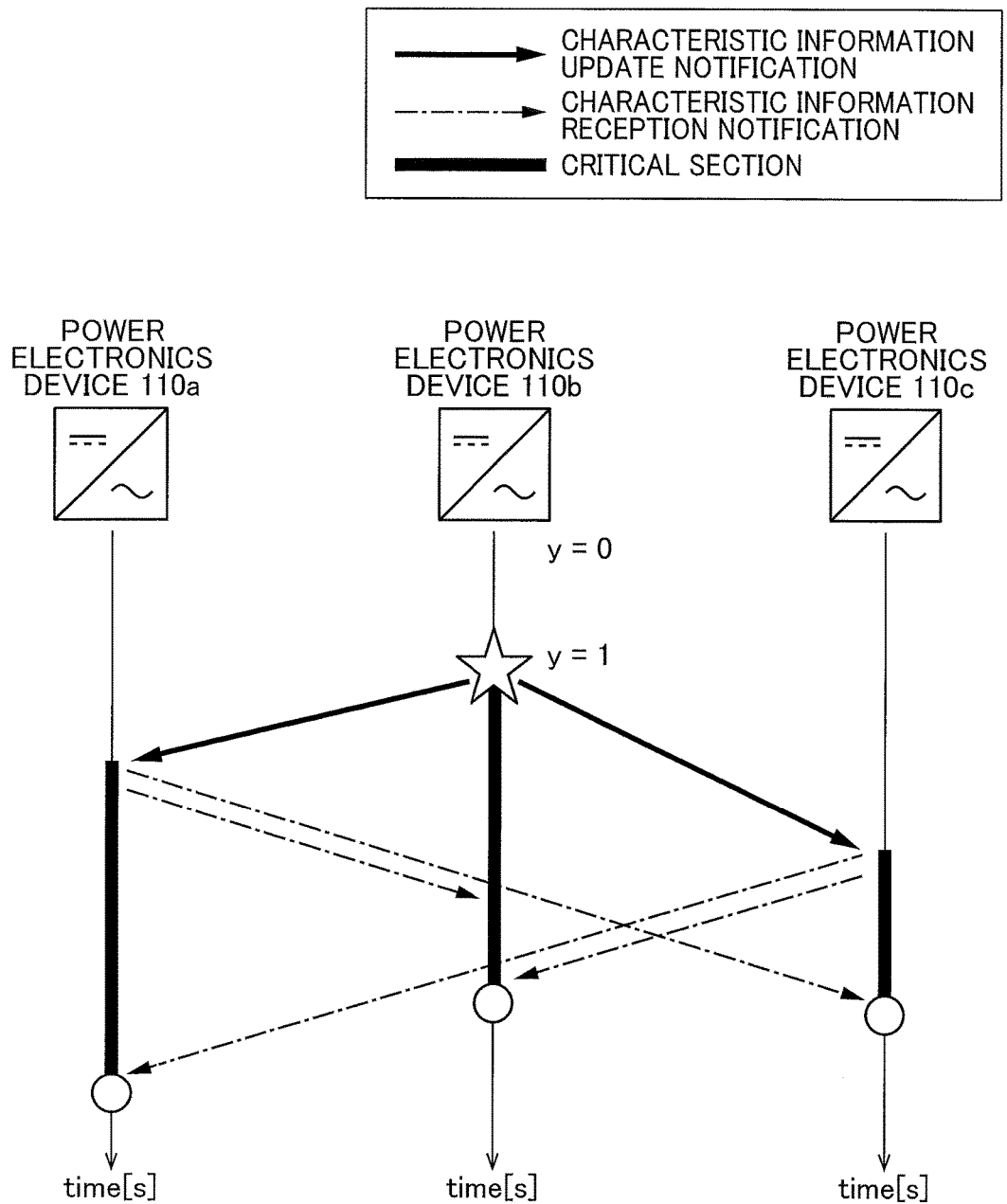
FIG. 17 is a diagram illustrating an example of an operation sequence including setting of the critical section in a case where there are three power electronics devices.

FIG. 17 illustrates an example of operation sequence in a case where there are three power electronics devices 110a, 110b, and 110c.

The characteristic information of the power electronics device 110b was initially y=0 and the characteristic information "y" is changed to 1 at the timing of the symbol of star of the figure. When the characteristic information is updated, the power electronics device 110b enters the critical section, and the update notification message of the characteristic information "y" is transmitted by communication from the power electronics device 110b to the other power electronics devices 110a and 110c. The update notification message of the characteristic information "y" includes the value of the updated characteristic information "y." The power electronics devices 110a and 110c, when having received the update notification message of the characteristic information "y" of the power electronics device 110b, transmit the reception notification message notifying the reception of the update notification message of the characteristic information "y" of the power electronics device 110b to all of the other power electronics devices, and respectively enter the critical section. Specifically, the power electronics device 110a transmits the reception notification message to the power electronics devices 110c and 110b, and the power electronics device 110c transmits the reception notification message to the power electronics devices 110a and 110b. Incidentally, the power electronics devices 110a and 110c may transmit the reception notification message after entry into the critical section.

The power electronics device (110a, 110b, 110c) that have entered the critical section wait for reception of the reception notification message sent from all of the other power electronics devices except for the power electronics device that transmitted the update notification message (the power electronics device 110b in this case). In this example, the power electronics device 110a waits for the reception of the reception notification message from the power electronics device 110c, and the power electronics device 110b waits for the reception of the reception notification message from the power electronics devices 110a and 110c, and the power electronics device 110c waits for the reception of the reception notification message from the power electronics device 110a.

When reception of reception notification messages from all of the other power electronics devices has been completed, each of the power electronics devices terminates the critical section and performs computation of the configuration information (determination of the master-slave relationship, etc.). Incidentally, in the example of FIG. 17, it is not particularly explicitly described which one of the power electronics devices 110a, 110b, and 110c is the master or slave, but this operation sequence is applicable regardless of which one is the master or the slave.

Incidentally, the update notification message transmitted from the power electronics device 110b may be transmitted only when a value of an item necessary for computation of the configuration information has been updated. In addition, in the power electronics device 110b, the timing of transmission of the update notification message and the timing of transition to the critical section may be simultaneous or either one may take place following the other. The characteristic information notified by the power electronics device 110b is solely the characteristic information of this device, but it may be a characteristic information set held by this device.

In the example of the operation sequence explained in FIGS. 13 and 17, when update of the characteristic information of the power electronics device was performed, that power electronics device transmitted the update notification message of the characteristic information to the other devices, as a result of which the other devices immediately entered the critical section at the time of receiving the update notification message. In other words, even when the other devices do not compare in advance the characteristic information of the power electronics device that has been updated and held by this device with the characteristic information of the power electronics device that was notified by the update notification message, the other devices can understand that they do not agree, so that they were able to be placed in the critical section at the time when the update notification message was received. However, it may also be envisaged that processing is performed for confirming presence or absence of consistency in the characteristic information on both sides so that they are placed in the critical section only when they are inconsistent. In addition, in the example of the operation sequence explained in FIGS. 13 and 17, the updated characteristic information of the power electronics device is transmitted by the update notification message directly from the power electronics device for which update of the characteristic information has been made, as a result of which it is not necessary to independently perform the acquisition processing of that characteristic information of the power electronics device, and it is guaranteed that the notified characteristic information is the latest characteristic information of the power electronics device. Hence, it suffices that the other devices updates the characteristic information of the power electronics device held by this device (old characteristic information) by the characteristic information notified from the power electronics device, and use it in computation of the configuration information.

Meanwhile, the notification of the characteristic information may include modes according to which notification is periodically made, or notification is only made when the other devices request the notification, instead of the method according to which the notification is made when the characteristic information has been updated as discussed in the foregoing. In this case, the characteristic information that has been obtained periodically or upon transmission of a request and in response to the request is compared with the characteristic information stored by this device, and if the inconsistency results, then it is necessary to enter the critical section and perform convergence process of the characteristic information (a process for making the characteristic information sets converge into the common one among the power electronics devices) and the generation process of the configuration information thereafter (the master-slave relationship, etc.).

At this point, several methods may be conceived for the convergence process of the characteristic information. For example, suppose that there is a case where the inconsistency of the characteristic information "x" of the above power electronics device 110a is recognized by the power electronics devices 110b and 110c by exchange of the characteristic information set (characteristic information x, y, z) by communication between the power electronics devices 110b and 110c.

At this point, as a method for the power electronics devices 110b and 110c to make the characteristic information x converge (for the power electronics devices 110b and 110c to share the same characteristic information x), in accordance with the first method (direct update method), the power electronics devices 110b and 110c each obtains the characteristic information "x" (the latest characteristic information) directly from the power electronics device 110a.

In accordance with the second method (indirect update method), the power electronics devices 110b and 110c compare a time stamp added to the characteristic information "x" in the mutually exchanged characteristic information set, and adopt the newer characteristic information "x." Specifically, if the time stamp of the characteristic information "x" of the power electronics device 110a held by this device is newer than or the same as the time stamp of the characteristic information "x" obtained from the power electronics device 110c, then the power electronics device 110b discards the characteristic information "x" obtained from the power electronics device 110c, and continues to use the characteristic information "x" held by this device. On the other hand, the time stamp of the characteristic information "x" of the power electronics device 110a held by this device is older than the time stamp of the characteristic information "x" obtained from the power electronics device 110c, then the power electronics device 110b updates the characteristic information "x" held by this device by the characteristic information "x" obtained from the power electronics device 110c. Explanation is given herein by the example of the power electronics device 110b but the same applies to the power electronics device 110c.

In the case of the second method, the characteristic information "x" of the power electronics device 110a exchanged between the power electronics devices 110b and 110c does not necessarily agrees with the latest characteristic information "x" stored by the power electronics device 110a, but if it suffices that the characteristic information "x" matches between the power electronics devices 110b and 110c, there may be cases where the second method is satisfactory. The second method does not need to guarantee the consistency of the characteristic information among all of the power electronics devices as in the case of the model IV illustrated in FIG. 7, and it is effective in cases where it suffices that the consistency of the characteristic information is confirmed in a partial group, between two power electronics devices, etc.

Incidentally, it is not necessary to perform the confirmation of the consistency with regard to the items out of the characteristic information that are not used in generation of the configuration information. For example, if the item or items used in determination of the master-slave relationship are solely the device identification number and the connected device type, then it is not necessary to confirm the consistency of the other items of the characteristic information, i.e., input/output rated value, etc. In addition, with regard to static items of the characteristic information, for example, such as an input/output rated value, since these items are not changed once the information has been exchanged, the information exchange for the second round and after may be omitted.

Here, in transmission and reception of the consistency of the characteristic information or the characteristic information set, if the entire data of the characteristic information or the characteristic information set as such is transmitted and received by communication, then the amount of information transmitted and received increases, which may cause wasteful use of the communication bandwidth resources. Also, processing of the large-size communication message requires operation resources and may cause decrease in the overall operation speed.

In such a case, it is made possible to reduce the communication traffic while obtaining the same or equivalent effect, by using hash information (random number) computed on the basis of the characteristic information, or hash information (random number) computed on the basis of the characteristic information set, instead of including the data of the characteristic information or characteristic information set in the communication message.

As the hash information computed on the basis of the characteristic information, the hash value of the lowest item of the characteristic information of FIG. 4 may be used on an as-is basis. Meanwhile, as the example configuration of the hash information on the basis of the characteristic information set, it may be the sum of the hash values of the characteristic information of respective in the characteristic information set. For example, if there exist the power electronics device 110a, 110b, and 110c and it is assumed that hash values of the characteristic information "x", "y," and "z" are Ha, Hb, and Hc, respectively, then the hash information may be the sum of these hash values, Ha+Hb+Hc. Alternatively, a set (list) of these hash values, i.e., "Ha, Hb, Hc" may be the hash information. Alternatively, it may be a combination of these hash values, "HaHbHc." Alternatively, an output value (hash value) of the hash function wherein the characteristic information "x", "y," and "z" are the input parameters may be the hash information. The hash information on the basis of the characteristic information set may be stored in the information storage 301, or may be stored in a storage different than that.

In a case where the hash information on the basis of the characteristic information set is used, if the mutually exchanged hash information is different, then it is possible to recognize that the mutually stored characteristic information sets disagree with each other, but it is not possible to identify the specific device whose characteristic information is different. In this case, it is made possible to achieve convergence (consistency) of the hash information by using the aforementioned first method (direct update method) or the second method (indirect update method) and exchanging the characteristic information of the real data with the recognition of inconsistency of the hash information being the trigger.

Figure 18:
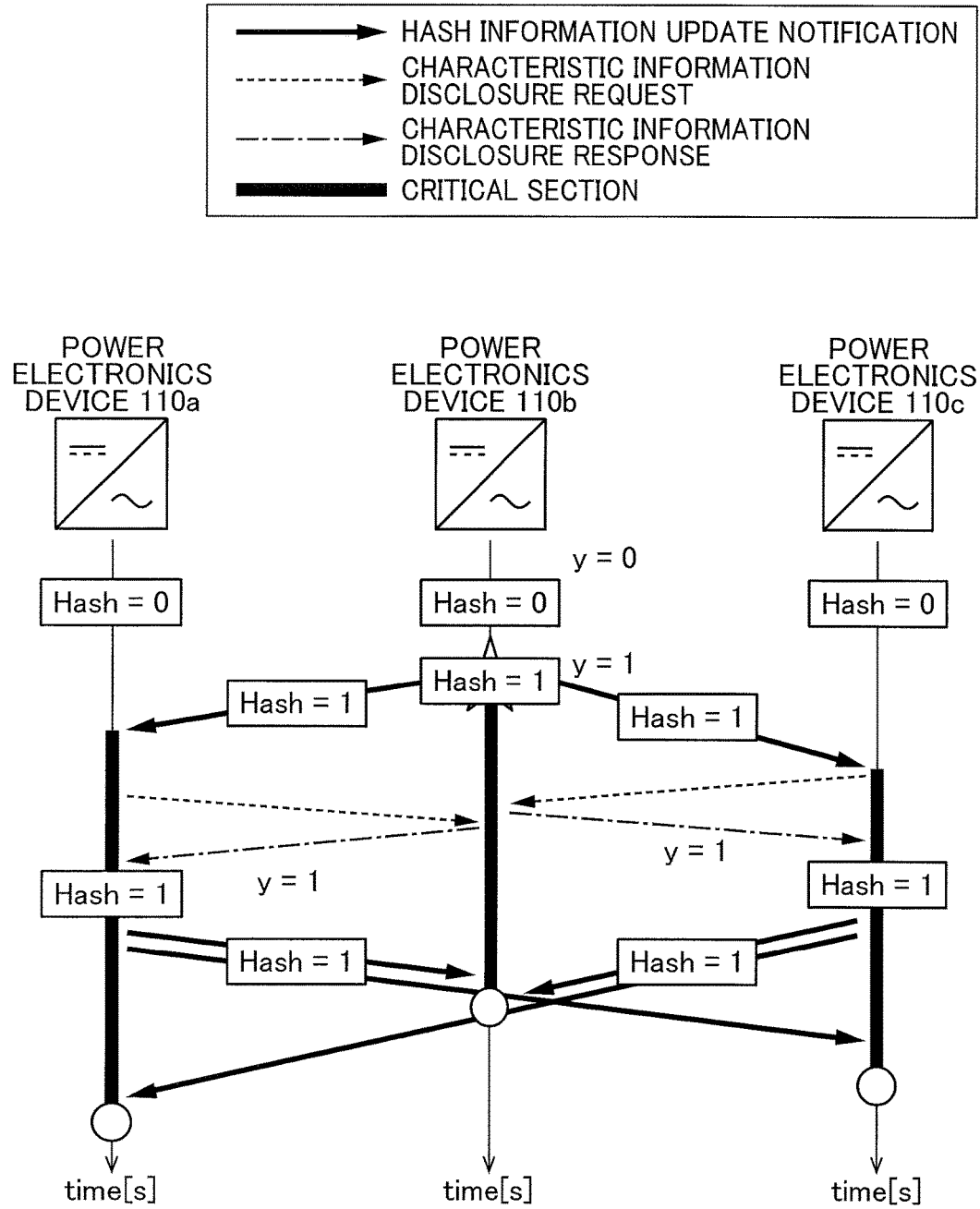
FIG. 18 is a diagram illustrating an example of an operation sequence including setting of the critical section where hash information is used.

FIG. 18 illustrates an example of operation sequence including setting of the critical section where hash information is used. In this example, there exist the power electronics devices 110a, 110b, and 110c as the currently operating power electronics devices, and the hash information is defined as the sum of the hash values of the characteristic information "x", "y," and "z" of the power electronics devices 110a, 110b, and 110c. As one example, the hash information is a total value of an MD5 hash value of "x," an MD5 hash value of "y," and an MD5 hash value of "z."

Suppose that, in the power electronics device 110b, the characteristic information of the power electronics device y has been updated from 0 to 1. Specifically, suppose that the yet-to-be-updated characteristic information "y" is 0 and the updated characteristic information "y" is 1 (these figures are used for the sake of explanations so as to distinguish the characteristic information). The power electronics device 110b computes the hash information on the basis of the updated characteristic information "y" and the characteristic information "x" and "z" of the power electronics devices 110a and 110c held by this device (the computed hash information is changed from the hash information before the characteristic information "y" was updated). The power electronics device 110b transmits an update notification message including the new hash information Hash (here, the value of the Hash is given as 1) to the other devices 110a and 110c and then enters the critical section. It is assumed that the yet-to-be-updated hash information is given as 0.

The power electronics device 110a receives the new hash information Hash=1 from the power electronics device 110b, compares it with the hash information Hash=0 held by this device, and determines that they are inconsistent with each other. The power electronics device 110a transmits a disclosure notification message requesting the disclosure of the characteristic information to the power electronics device 110b, and receives a disclosure response message including the updated characteristic information y=1.

The power electronics device 110a updates the characteristic information of the power electronics device 110b held by this device by the received characteristic information y=1, and performs the re-computation of the hash information on the basis of the updated characteristic information of the power electronics device 110b, the characteristic information of this device 110a, and the characteristic information of the power electronics device 110c. As the power electronics device 110a gets the new characteristic information y=1 from the power electronics device 110b, the computed hash information becomes Hash=1, which agrees with the hash information that has previously been received from the power electronics device 110b. Hence, the power electronics device 110a recognizes that the characteristic information set held by this device agrees with the characteristic information set held by power electronics device 110b.

The power electronics device 110a transmits an update notification message including the new hash information Hash=1 to the other power electronics devices 110b and 110c. Meanwhile, the power electronics device 110a waits for the reception of the update notification message of the hash information sent from the power electronics device (in this example, the power electronics device 110c) other than the power electronics device 110b that notified update of the hash information. The power electronics device 110a continues the critical section until the hash information received from the power electronics device 110b, the new hash information computed by this device, and the hash information sent from the power electronics device 110c all agree with each other. When the hash information is brought into consistency, it is recognized that the characteristic information sets respectively held by all of the power electronics device agree with each other (at least the values of the items used in the generation of the configuration information agree with each other), and the critical section is canceled. Then generation of the configuration information (the relationship of the master and the slave, etc.) is performed on the basis of the characteristic information of the power electronics devices 110a, 110b, and 110c held by this device. Thereafter, the power control is performed on the basis of the determined master-slave relationship.

Since the power electronics device 110c also operates in the same or similar manner as that of the power electronics device 110a, the explanation is omitted (the above described explanation of the operation of the power electronics device 110a should be read with 110a and 110c replaced by 110c and 110a, respectively).

The power electronics device 110b waits for the reception of the update notification message of the hash information sent from the power electronics devices 110a and 110c, and continues the critical section until the updated hash information computed by this device and the hash information received from the power electronics devices 110a and 110c agree with each other. When the hash information is brought into consistency, the critical section is canceled, and generation of the configuration information (determination of the master-slave relationship, etc.) is performed on the basis of the characteristic information of the power electronics devices 110a, 110b, and 110c held by this device. Thereafter, the power control is performed on the basis of the determined master-slave relationship.

In the above described sequence, the power electronics device 110b transmits the disclosure response message including the changed characteristic information y=1 when the disclosure request message is received from the power electronics device 110a, 110c after having transmitted the update notification message including the updated hash information Hash=1. However, it is also possible to omit the transaction of the disclosure request message and the disclosure response message by including the changed characteristic information y=1 in the update notification message transmitting the updated hash information.

In a case where the master-slave relationship is formed among all of the power electronics devices existing in the system (for example, the cases of the models I to III in FIG. 7), as has been described in the foregoing, it is necessary to confirm that the characteristic information sets that are respectively held agree with each other among all of the power electronics devices. When the consistency has been confirmed, each of the power electronics devices independently generates the configuration information using the common algorithm. As an example, in the case of the model I in FIG. 7, one power electronics device is determined as the master, and the other power electronics devices all become the slaves. Meanwhile, in the case of the mode IV where the master-slave relationship is only determined between two power electronics devices, it suffices that the characteristic information agrees with each other between these two power electronics devices.

Figure 19:
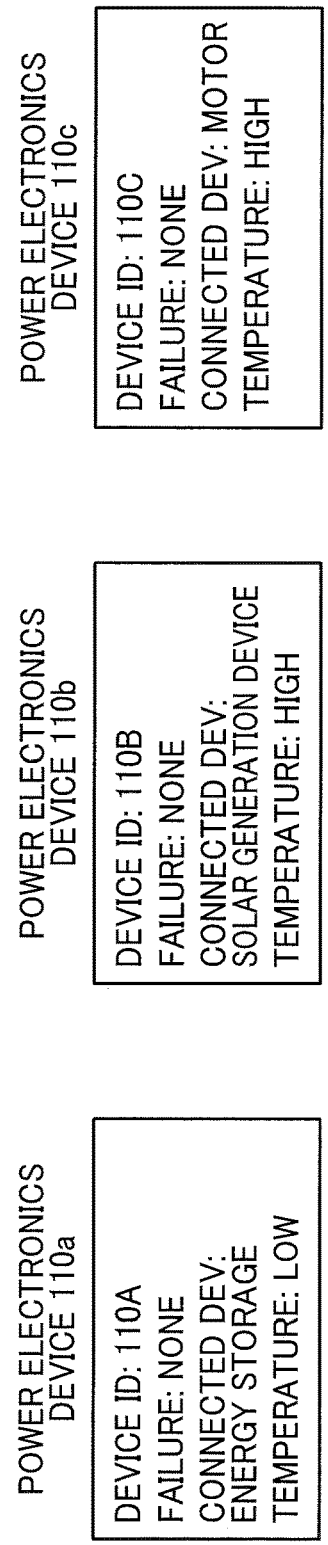
FIG. 19 illustrates some of the items of the characteristic information used in determining the master-slave relationship.

FIG. 19 illustrates some of the items of the characteristic information used in determining the master-slave relationship. In the illustrated example, there exist three power electronics devices 110a, 110b, and 110c within the system, and the characteristic information of the power electronics devices 110a, 110b, and 110c is indicated. Each of the power electronics devices, respectively upon cancellation of the critical section, selects the master on the basis of the illustrated characteristic information set held by this device (each of the power electronics devices has the same characteristic information). An example of operation for selecting the master on the basis of the characteristic information illustrated in the figure is illustrated below.

First, any failed devices among all of the power electronics devices are excluded from candidates for the master. In the illustrated example, no failure exists in any one of the power electronics devices 110a, 110b, and 110c. If a classification of the type of failure is provided, then at least any device whose communicator has failed is excluded as discussed in the foregoing.

Next, the degree of stability of the power electronics device is evaluated by the classification of the power device connected to the power electronics device. The power electronics devices 110a, 110b, and 110c in this example are connected to a energy storage device, a solar power generation device, and a motor, respectively. Among them, the energy storage device is defined as having the highest stability as a power source, and the power electronics device 110a connected to the energy storage device is selected as the master.

If there exist two or more power electronics devices connected to the energy storage device within the system, the housing temperature levels of the devices are compared, and the power electronics device whose temperature is low is defined as being more stable and this device is defined as the master. In the illustrated example, the housing temperature level of the power electronics device 110a is low, and the housing temperature levels of the power electronics device 110b and the power electronics device 110c are high. Accordingly, if the power device connected to the power electronics device 110b is an energy storage device, then the housing temperature levels are compared between the power electronics devices 110a and 110b, and the power electronics device 110a has the lower temperature level, so that the power electronics device 110a is selected as the master.

In addition, as the energy storage devices may differ in their characteristics and degree of stability depending upon the types of an electrode and an electrolyte solution, it may also be envisaged that evaluation of the degree of stability including the types of energy storage devices may be performed. For example, with regard to an energy storage device of lead-acid storage battery and an energy storage device of nickel-cadmium storage battery, the latter is superior in terms of the life-time number of charge and discharge cycles. For this reason, a power electronics device connected to the latter may be preferentially regarded as being a more stable device and determined as the master. In addition, energy storage capacity of the energy storage device can be included in the evaluation of the degree of stability.

The same applies to the solar power generation device and other power devices. For example, it is possible to include power generation efficiency, generation capacity, etc. into the evaluation of the degree of stability. This embodiment can be adopted regardless of what kind of algorithm is used in the evaluation of the degree of stability, i.e., determination of the priority of the master.

The above-described operation is independently performed by each of the power electronics devices 110a, 110b, and 110c, so that the same device is selected as the master for each of them. Thereafter, the power electronics devices 110a, 110b, and 110c perform normal operation with the device acting as the master.

Here, a method is explained according to which, in a case where a power electronics device is newly added to the power electronics system (distributed power supply system) or a case where the power electronics device is restarted within the power electronics system, the added or restarted power electronics device and the existing power electronics device operating within the system make recognition of each other.

In such a case where a power electronics device is newly added to the system or the power electronics device is restarted, the newly added or restarted power electronics device and the existing and operating power electronics device can mutually recognize their existences by using the scheme for device discovery using communications.

As a scheme for realizing device discovery of this kind, UPnP may be mentioned. UPnP is configured by several protocols, and in particular the device discovery is handled by SSDP (Simple Service Discovery Protocol). A power electronics device using SSDP transmits a NOTIFY message (method) immediately after being started by multicast transmission, and advertises to the surrounding other devices the fact that this device has participated in the system/network. The power electronics device that has received the NOTIFY message adds the transmission source device of the NOTIFY message to the list of devices (device list) recognized by this device. In a case where hash information on the basis of the characteristic information or the hash information on the basis of the characteristic information set is used, re-computation of the hash information may be performed immediately after the power electronics device being added to the list. In general, since multicast/broadcast transmission needs to take into account the possibility of a packet loss, it is desirable that the NOTIFY message is transmitted for multiple times. In addition, during the normal operation thereafter, the fact that this device continues its operation may be advertised by repeatedly transmitting the NOTIFY message for every predetermined interval (for example, one hour). Implementation of such a scheme/message as described above enables mutual automatic recognition of the power electronics devices using communications. In this embodiment, use of the UPnP/SSDP is not essential, and other existing protocol may be used, and a similar protocol may be specially defined and implemented.

In the SSDP, in addition, a SEARCH message is provided for making search for the other operating power electronics devices, and the device may be discovered using it. Alternatively, even when a message corresponding thereto is not used, it is possible to perform discovery of the device. For example, in a case where the NOTIFY message is received from an unknown new device, it is possible to obtain the same or equivalent effect by providing implementation such that this device also sends back a NOTIFY message by unicast or multicast broadcast, without implementation of the features associated with the SEARCH message.

In addition, in UPnP, collection of the device information is performed in two or more stages. In the collection of the characteristic information of this embodiment, only the discovery of the device and exchange of basic items such as device ID out of the characteristic information items are performed in the first stage of SSDP, and information on more detailed items is obtained in the second stage by making an access to an URI stated in the Location field obtained by SSDP.

In a case where UPnP or any scheme of stepwise information acquisition similar to UPnP is to be implemented, the computation of the hash information may be performed on the basis of the above described basic items at the time of the first step of the device discovery, or may be performed at the time when the more detailed characteristic information of the second step has been obtained, or can also be performed at both of these timings. In particular, in a case where information of the items at the time of the device discovery is not sufficient for performing the determination of the master, it is possible to reduce the length of the critical section by not performing the computation of the hash information at the time of the device discovery.

The method of determining stoppage of other power electronics devices in the system is described below. For determination of stoppage of other power electronics devices, a method that uses a communication network is envisaged. In UPnP, a specific scheme is defined. One scheme is a method that transmits a message announcing stoppage immediately before the stoppage of this device. In UPnP/SSDP, this device is to be stopped is notified to the other devices by transmitting a BYEBYE message. The other devices that received the BYEBYE message from the device scheduled to be stopped, delete the transmission source device of the BYEBYE message from the device list. In a case where the hash information on the basis of the characteristic information set is used, update of the hash information is performed on the basis of the characteristic information group from which the deleted characteristic information of the power electronics device is excluded. A method that uses the BYEBYE message in this manner may be applied to a case of planned stoppage of the power electronics devices. In addition, this method may be used in such a case where the communicator and the CPU are normal but failure occurs in the power conversion element, making it impossible for the power conversion element to output power any more.

Figure 20:
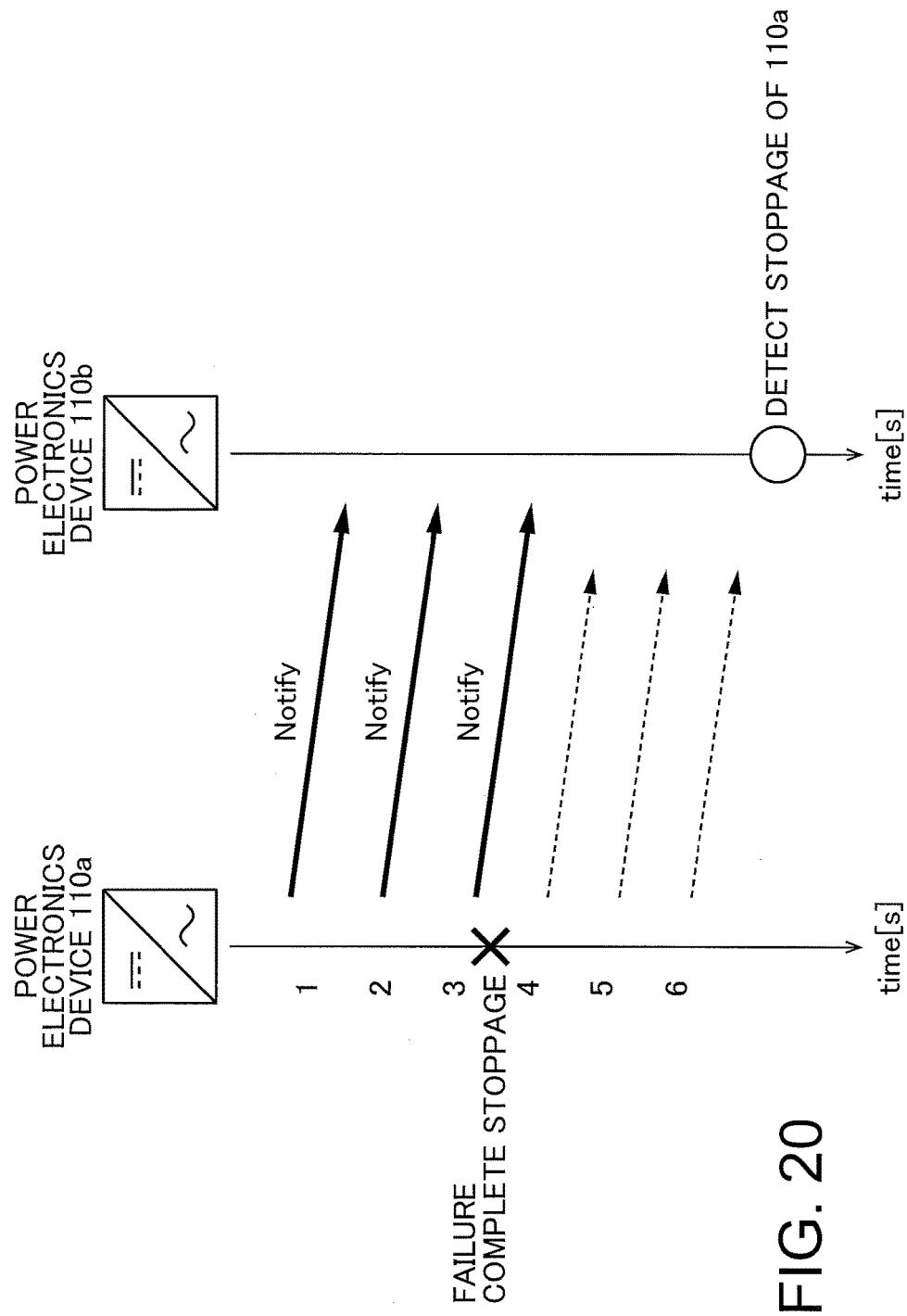
FIG. 20 illustrates a scheme of stoppage detection of UPnP.

On the other hand, in cases where the entire device is suddenly stopped due to a failure or the communicator 304 has failed, the above-described BYEBYE message cannot be transmitted. In such a case, a method is conceivable, for the other devices, according to which, as in the case of the NOTIFY message of UPnP, the reception time stamp of the message transmitted for every predetermined interval is monitored, and the stoppage is detected when the NOTIFY message cannot be received for a predetermined time or more or for a predetermined round or rounds. FIG. 20 illustrates the scheme of the stoppage detection of UPnP. The NOTIFY message is transmitted for every predetermined interval from the power electronics device 110a, but in the meantime the power electronics device 110a is completely stopped, and the transmission of the NOTIFY message is also stopped. The power electronics device 110b that ceased to receive the NOTIFY message from the power electronics device 110a does not receive NOTIFY message for a predetermined time from the reception of the most recently received NOTIFY message, and thus it is determined that the power electronics device 110a stopped.

When the NOTIFY message of UPnP/SSDP or a message equivalent thereto is multicasted/broadcasted, or transmitted using UDP, etc., which is unreliable communication system, the possibility of the message being lost midway in the transfer has to be taken into account. Accordingly, when a scheme for stoppage detection as described above is used, it is desirable that stoppage is determined when the message was not able to be received for a predetermined time or more, or consecutively for multiple times.

In addition, in a case where the message was failed to be received for one round or multiple rounds consecutively, communication may be made for confirming the operation of that power electronics device. As one example of such a communication, PING may be mentioned. In addition to transmission of the message for every predetermined time by the power electronics device that is operating as in the case of the NOTIFY message, it is also possible to determine the operation/stoppage of the device by the presence or absence of the response message when PING continues to send the messages that corresponds thereto for every predetermined period.

Incidentally, the operation policy of a power electronics device in which only the communicator 304 failed while the power converter is normal can be determined on a per-system basis. As one example, it is desirable that a power electronics device whose communicator 304 failed is programmed to stop the operation. This is because it may cause trouble to continue to output power to this power electronics device in a case where a power electronics device that cannot make communications exists in the system that is built on the premise of the cooperative operation by multiple devices using communications.

In addition to the stoppage detection using the communicator 304, it is also possible to detect the stoppage of the other power electronics device from that abnormal value using various sensors. In addition, more accurate stoppage detection is made possible by combination of the detection of the abnormal value from the sensor and the confirmation by communication.

As one example, voltage/current sensors are often provided at a power input terminal (power input part) and an output terminal (power output part) of the power electronics device. When a failure occurs in the power electronics device and the output of the power electronics device suddenly changes, an abnormal value is measured such as abrupt variation of the voltage and the power by a sensor of the other power electronics device connected by the power line. If it is possible to identify, based on the type of the abnormality, the power electronics device in which the abnormality occurred, the power electronics device that detected the abnormal value by the sensor can determine that the power electronics device at issue has been stopped and delete the entry associated with the power electronics device at issue from the device list of this device. Alternatively, the power electronics device can perform the step for stoppage confirmation, using communication such as PING, for the power electronics in which abnormality is determined to have occurred from the detected value of the sensor, and can perform the determination of the stoppage performed if there is no response such as a PONG communication. If it is only possible to determine that abnormality occurred in the system from the detected value of the sensor and it is not possible to identify the power electronics device in which the normality occurred, then the power electronics device in which the abnormality occurred may be identified by performing the PING communication for all of the other power electronics devices within the system.

Physical quantities for detection of abnormal values are not limited to a current value and a voltage value, and may be harmonic component of voltage, current, etc., noise, sound produced by a device having a movable part such as an electric motor and a power generator during its operation, and a sound produced as a result of a harmonic component being applied to a coil, and sensors may be used in accordance with the physical quantity to be detected. For a motor drive system that drives an electric motor by a power electronics device, it is envisaged that the abnormality detection of the power electronics device may be performed using sensing values associated with the control target such as the velocity and position of the rotor/drive system which is an output of the electric motor. Also, a scheme may be used according to which a temperature sensor, a power supply voltage sensor, or the like is interconnected between a plurality of power electronics devices and measurement is directly performed without communication, so that the abnormality is directly detected between the power electronics devices.

In this manner, this embodiment allows use of any kind of abnormal value detection methodology for detecting abnormality of the power electronics device.

The above described stoppage detection method of the power electronics device is performed between two devices of the power electronics device to be stopped and the power electronics device that detects the stoppage. It is also possible in this context to detect the stoppage of the device by another power electronics device when the power electronics device that detected the stoppage further transmits the stoppage information by communication to the other power electronics device. By virtue of the scheme for sharing the stoppage information by communication, it is made possible to notify the abnormality of the power system via the EMS server, a gateway, etc. to the power electronics device.

Incidentally, the characteristic information may include, in addition to the items illustrated in FIG. 4, a device ID of a power electronics device whose operation is confirmed, failure information of this device, and a measured value detected by various sensors.

In the operation sequences explained by FIGS. 13, 17, and 18, they are directed to setting and cancellation of the critical section in the case of change in the characteristic information of the power electronics device as well as the operation during the critical section. Similarly in the case where the power electronics device stopped, failed, or separated, or where a new power electronics device has been added, setting and cancellation of the critical section as well as the operation during the and critical section are possible.

Specifically, when the power electronics device is stopped, failed, or separated, then the power electronics device that detected the stoppage, failure or separation enters the critical section, and determines the logical configuration of control (the master-slave relationship, etc.) between or among the currently operating power electronics devices. At this point, it is ensured that notification information notifying the fact that the power electronics device stopped, failed, or separated is transmitted to and from the currently operating power electronics devices. For this, for example, instead of transmitting the update notification message of FIG. 17, a detection notification message of stoppage, failure or separation may be transmitted. The operating power electronics devices cancel the critical section when the detection notification messages have been received from all of the other operating power electronics devices. During the critical section, as in the same or similar manner as in the foregoing, the logical configuration (the master-slave relationship, etc.) is determined on the basis of the characteristic information of the currently operating power electronics devices.

Incidentally, there may exist some power electronics devices whose stoppage, failure or separation cannot be detected. For the power electronics devices of this type, the critical section may be specified when a detection message of the stoppage, failure or separation is received from at least one or more of the other operating power electronics devices, and the detection message of the stoppage, failure or separation may be transmitted. Thus, the critical section may be canceled when the detection messages of the stoppage, failure or separation have been received from all of the other operating power electronics devices.

On the other hand, in a case where addition of a new power electronics device (a case where the stopped power electronics device is activated, a case where new power electronics device has been installed, etc.) has been detected, the power electronics device that made the detection enters the critical section and the logical configuration (the master-slave relationship, etc.) of the control may be determined among the power electronics devices including the added power electronics device. At this point, the existing power electronics device obtains the characteristic information of the added power electronics device, and transmits an acquisition notification message (reception notification message). The added power electronics device obtains the characteristic information from the existing power electronics devices, and transmits the acquisition notification message (reception notification message). The existing power electronics devices may receive the acquisition notification messages from all of the other existing power electronics devices, and determine the logical configuration (the master-slave relationship, etc.) when the acquisition notification messages (with regard to all of the existing and operating power electronics devices) have been received from the added power electronics device, and cancel the critical section. When the acquisition notification messages have been received from all of the existing and operating power electronics devices, the added power electronics device may determine the logical configuration (the master-slave relationship, etc.). Also, the added power electronics device may operate such that it enters the critical section upon activation and cancels the critical section after having determined the logical configuration (the master-slave relationship, etc.).

Figure 21:
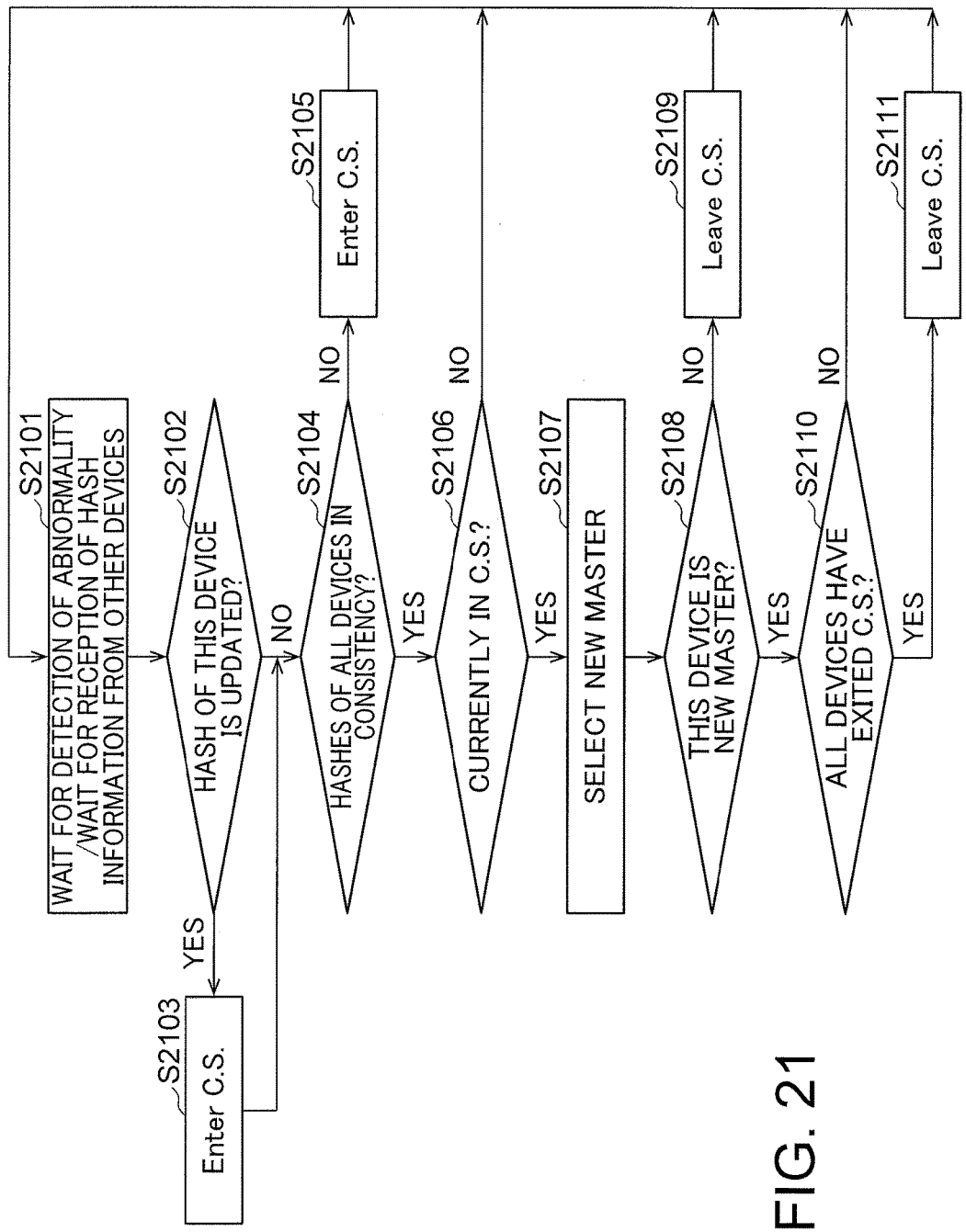
FIG. 21 illustrates an operation flow associated with entry into and exit from the critical section.

FIG. 21 illustrates an example of the operation flow associated with the entry into and exit from the critical section (Critical Section: S.C.) according to this embodiment. The power electronics device waits for detection of abnormality of the other devices, or update notification of hash information from the other devices (S2101). When the power electronics device has detected the abnormality of the other devices or received the update notification, then the power electronics device goes to the next step. It is determined whether or not the hash information of this device is updated (S2102). When it is updated, the device enters the critical section (when it is currently in the critical section, it maintains the critical section) (S2013). It is determined whether or not the hash information is the same among all of the power electronics devices, in other words, whether or not the characteristic information sets recognized by each of the power electronics devices agree with each other (S2104). If the hash information of all of the power electronics devices is not the same, the device enters the critical section, or maintains the critical section if it is currently in the critical section (S2105). If the hash information of all of the power electronics devices is the same, then it is determined whether or not it is currently in the critical section (S2106), and if it is not currently in the critical section, it goes back to the step S2101. If it is currently in the critical section, then it selects a new master on the basis of the currently held characteristic information set (S2107). It is determined whether or not the master selected is this device (S2108), and if it is not this device, then the critical section is exited (S2109). If the master that has been selected is this device, then it is determined whether or not all of the other power electronics devices canceled the critical section (S2110), and if there exists any other power electronics device that is still in the critical section, it goes back to the step S2101. If all of the other power electronics devices have canceled the critical section, then this device (new master) also cancels the critical section (S2111).

The determination of whether or not all of the other power electronics devices have canceled the critical section may be, as discussed in the foregoing, such that it is determined that all of the other power electronics devices have canceled the critical section when an update notification messages have been received from all of the other power electronics devices. Alternatively, it is also possible that it is determined that all of the power electronics devices have canceled the critical section when the other power electronics devices canceled the critical section, an exit notification message is sent to the master, and when the master received the exit notification messages from all of the other slaves. Alternatively, each slave may spontaneously transmit the exit notification message when it canceled the critical section, or may receive an inquiry from the master and, as a response to the inquiry, transmit the exit notification message when it has exited the critical section. Alternatively, the master may regard that all the slaves canceled the critical section after a predetermined time elapsed from the time when the master selected this device as the master.

FIGS. 22A, 22B, 22C, 22D and 23 illustrate examples of the determination procedure for the master-slave relationship. This procedure corresponds to a case where a mode such as the model IV of FIG. 7 is temporarily adopted, and the mode gradually converges to the mode such as the model I. Here, a case is illustrated in which determination of the master and the slave(s) is performed when existence of other devices has been discovered on the communication network or electricity network. The determination of the master and the slave(s) does not need to be performed in the same order as described below. In FIGS. 22A to 22D and FIG. 23, the configuration information of the master and the slave(s) is stepwise updated, and four rounds of configuration determination process are stepwise performed until the configuration information is brought into consistency in four power electronics devices. Incidentally, in FIGS. 22A to 22D, the master-slave relationship of each of the power electronics devices at that time is illustrated by a tree structure. "M" enclosed by a circle represents the master, and "S" enclosed by a circle represents the slave. In addition, the figures enclosed by a circle are symbols for identifying the power electronics devices. Also, lines having two types of width are indicated, where the bold line represents the power line and the narrow line represents the communication line.

Figure 22A:
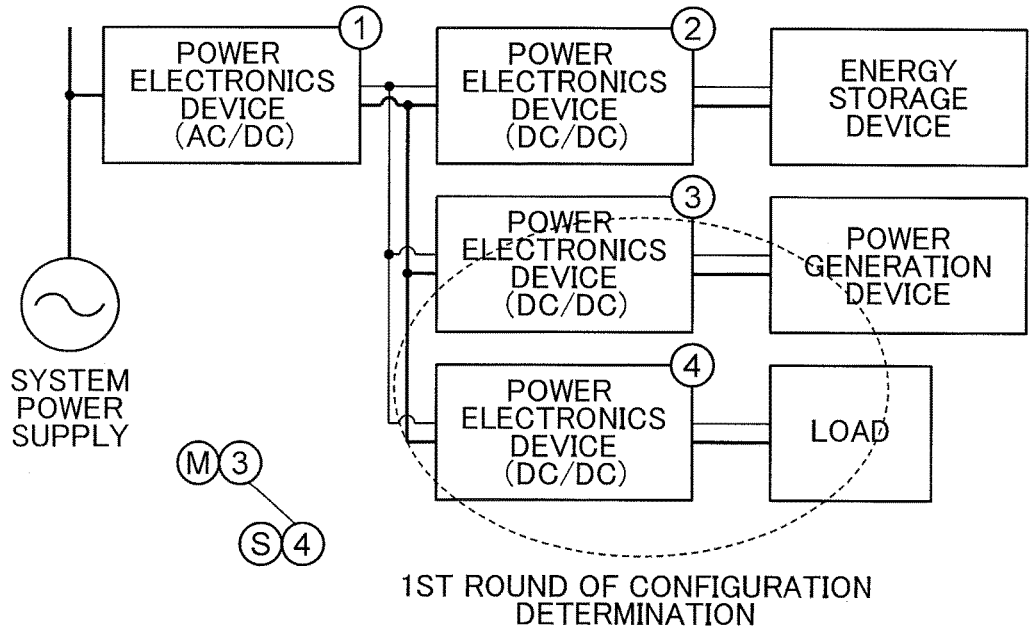
FIG. 22A is a diagram illustrating an example of configuration determination of a plurality of power electronics devices.
Figure 22B:
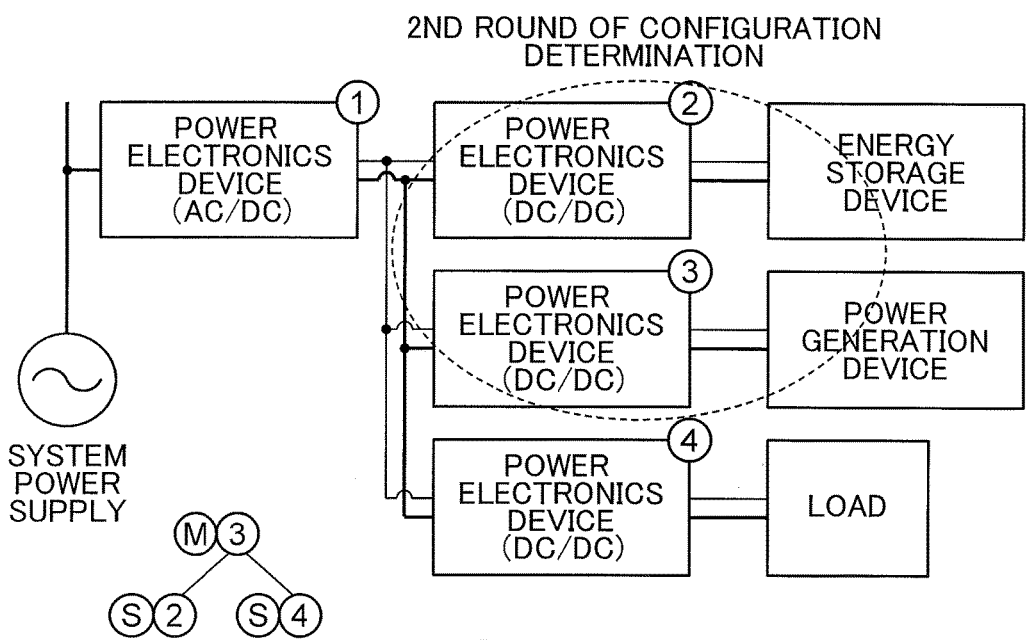
FIG. 22B is a diagram illustrating an example of configuration determination of a plurality of power electronics devices.
Figure 22C:
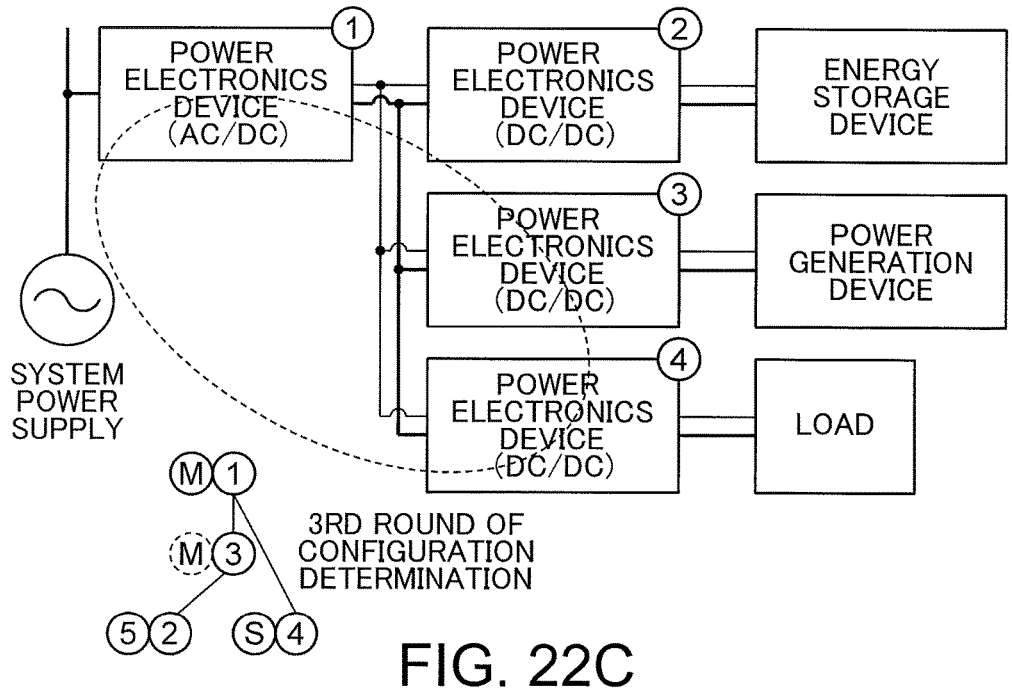
FIG. 22C is a diagram illustrating an example of configuration determination of a plurality of power electronics devices.
Figure 22D:
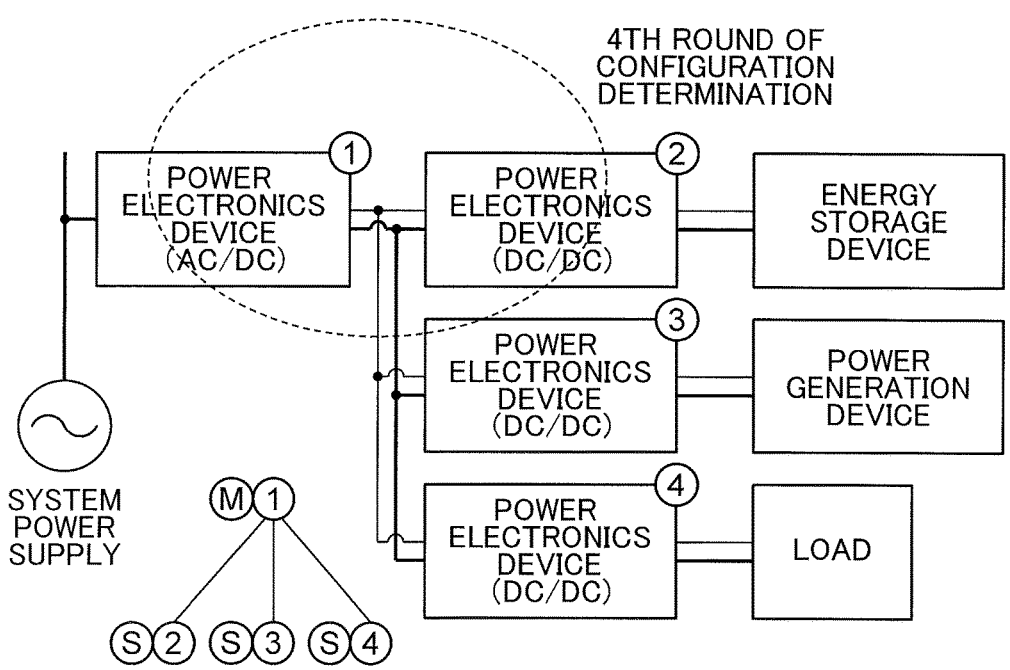
FIG. 22D is a diagram illustrating an example of configuration determination of a plurality of power electronics devices.

As the first round of configuration determination illustrated in FIG. 22A and the second round of configuration determination illustrated in FIG. 22B are performed, the configuration determination is performed among three power electronics devices (DC/DC). From the third round of configuration determination of FIG. 22C, the power electronics device (AC/DC) starts the configuration determination of these three power electronics devices (DC/DC). In the third round of configuration determination, more than one master exists in the system. In the example of the same figure, it never happens that there exist multiple masters for the power electronics device acting as the slave, so that collision of the power monitor and control does not happen, either. Accordingly there will be no problem if entry into the normal operation is permitted on an as-is-basis. Meanwhile, it may be possible that the information transfer efficiency is degraded due to the fact that many stages are formed in the logical hierarchical configuration extending from the power electronics device (AC/DC) acting as the highest-order master to the power electronics device (DC/DC) acting as the lowest-order slave. Actually, in the example of the same figure, there exist both of the communication connection and the power connection between the one power electronics device (AC/DC) and the three power electronics devices, so that it is desirable that a direct-connection-type logical hierarchical configuration is adopted in which one master exists and the power electronics devices other than the master are directly connected to the master as illustrated in the fourth round of the configuration determination of FIG. 22D.

Figure 23:
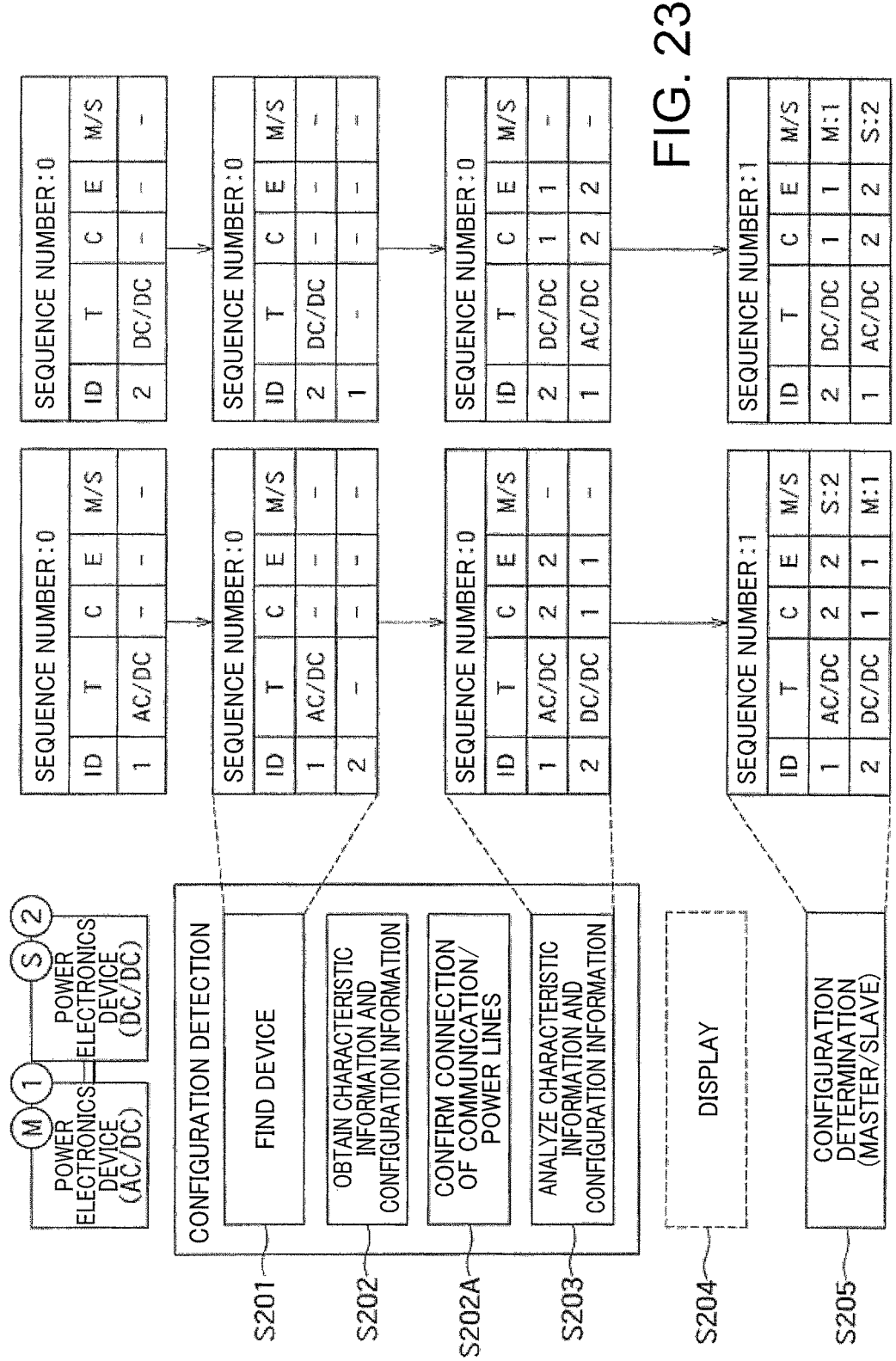
FIG. 23 is a diagram illustrating an example of configuration determination of a plurality of power electronics devices.

FIG. 23 depicts a state where, on the assumption that a power electronics device (AC/DC) and a power electronics device (DC/DC) are installed, as two power electronics devices, exchange of the characteristic information and the configuration information and master-slave determination are performed, and the configuration information is updated after the master-slave determination. The right portion of the figure depicts the state of the configuration information of each of the power electronics devices being changed stepwise, where the field of "T" represents the power conversion type; the field of "C" represents the ID of the counterpart having connection associated with communication; the field of "E" represents the ID of the counterpart having connection associated with power; and "M/S" represents the ID of the device that act as the master or slave.

In the step S201, the other power electronics device is discovered on the same power line; in the step S202, the characteristic information (and configuration information) of the discovered device is obtained; and in the step S203, the characteristic information obtained from the discovered counterpart device is reflected to the characteristic information of this device. It is not essential to obtain the configuration information, but the acquisition thereof makes it possible to confirm the current master-slave configuration grasped by the counterpart device. Incidentally, it may also be envisaged that a step S202A for confirmation of connection of communication/power line is added between the step S202 and the step S203.

Each of the power electronics devices performs the determination of the master and the slave(s) (computation of the configuration information) on the basis of the respective characteristic information sets. In the step S204, an operator confirms whether or not the master-slave configuration (logical configuration) is the same among each of the power electronics devices by display on a terminal of the operator. As another method, an operation sequence may be automatically performed wherein it is confirmed whether or not the master-slave configuration grasped by this device agrees with the master-slave configuration grasped by the counterpart device. As discussed in the foregoing, in this embodiment, since each of the power electronics device are provided with the same algorithm for the master-slave determination, it is not essential to confirm the consistency of the configuration information, but it is made possible to improve the certainty by performing the confirmation as described herein.

When it has been determined that the master-slave configurations are in consistency for the power electronics devices, each of the power electronics devices establishes the master-slave configuration with this content, and updates the configuration information (S205). Incidentally, by this update, the sequence number is incremented. Incidentally, the sequence number is for use in confirming the round of the process in the case where the determination of the master-slave configuration is stepwise performed, and the sequence number is incremented every time one round of the master-slave configuration determination is made.

Incidentally, in a case where there are three or more power electronics devices, as illustrated in FIGS. 22A to 22D, operation may be performed for conducting the confirmation of whether or not a master already exists for the device that is the counterpart of comparison of the configuration determination.

Figure 24A:
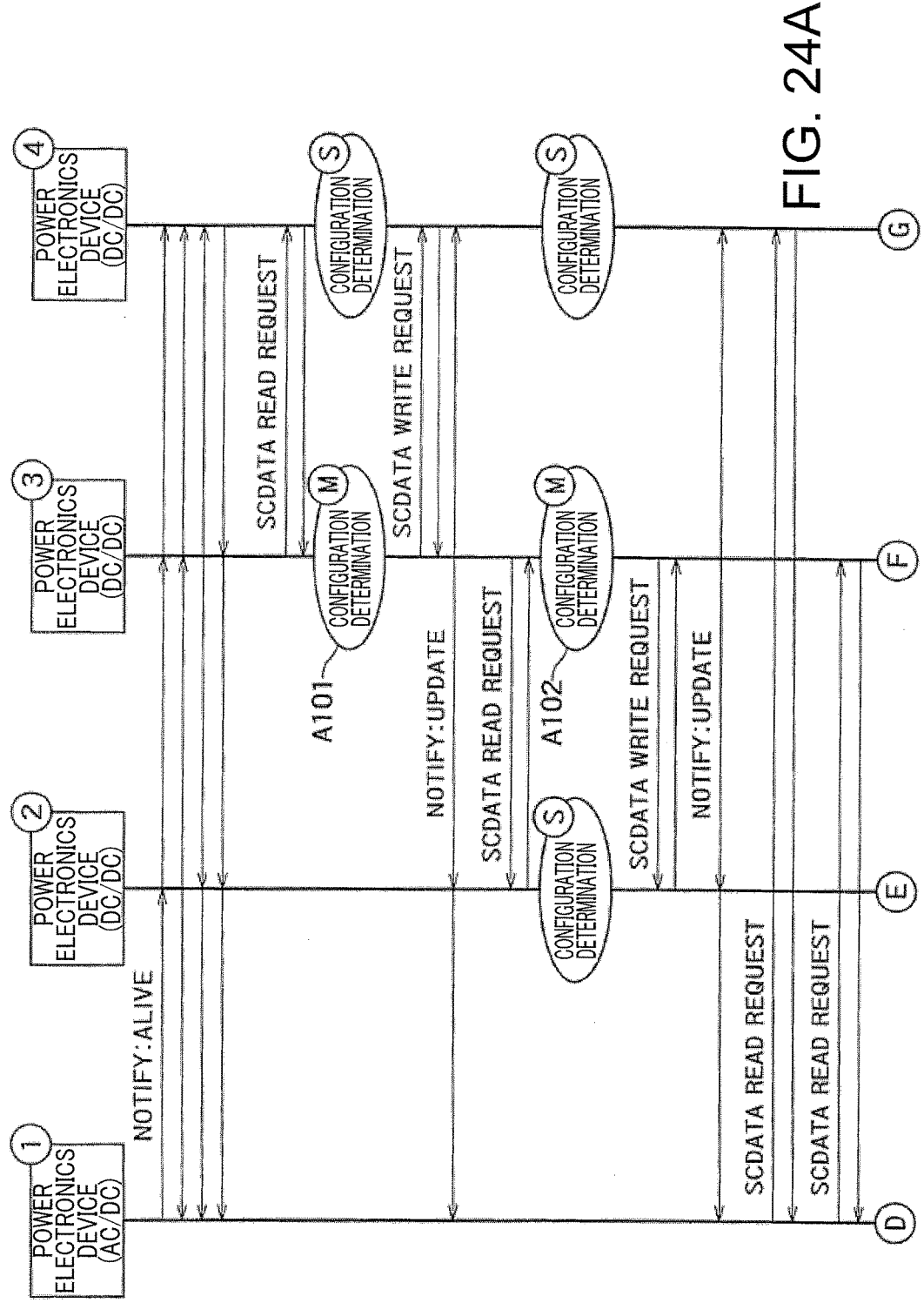
FIG. 24A is an operation sequence diagram of a plurality of power electronics devices.
Figure 24B:
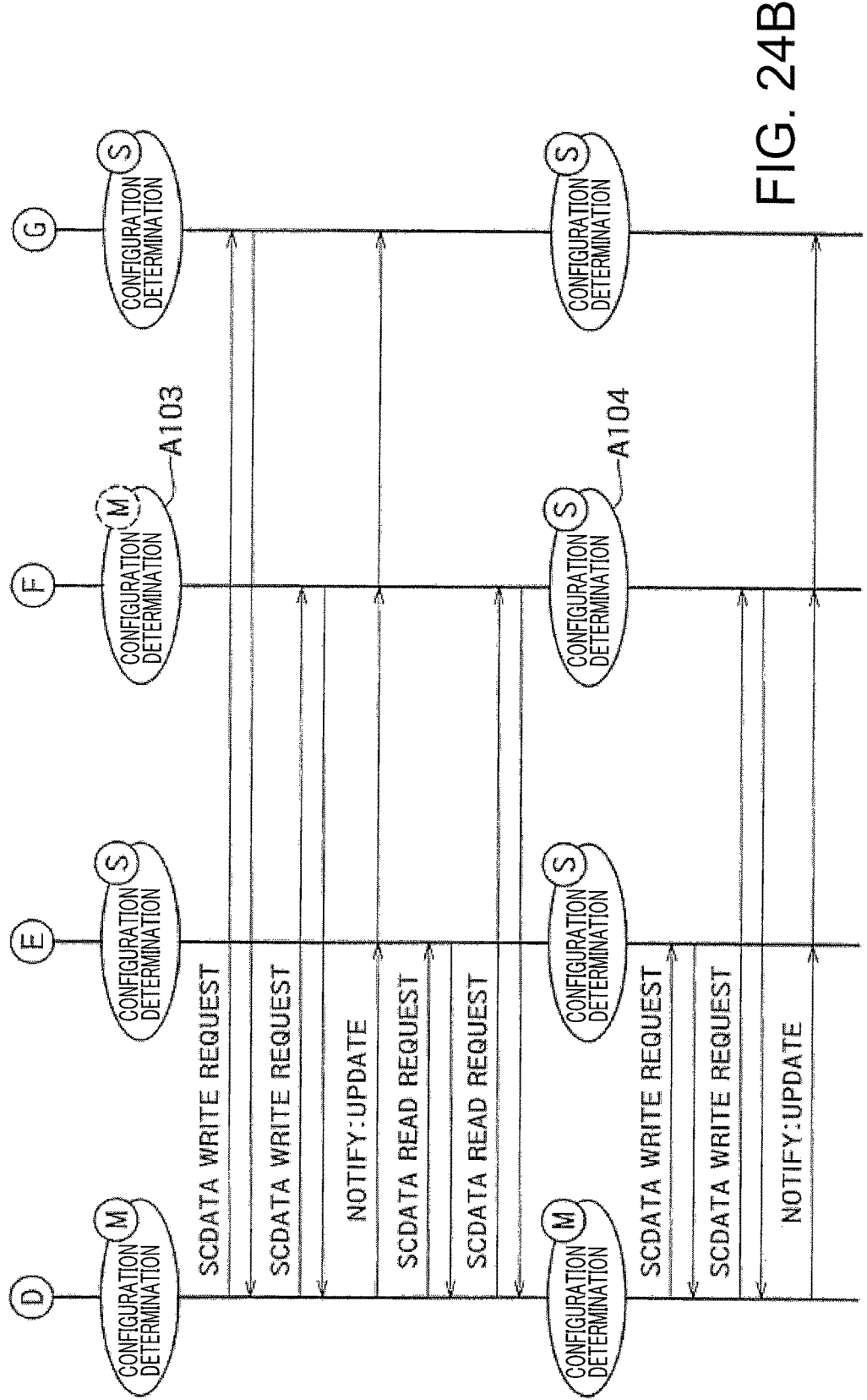
FIG. 24B is an operation sequence diagram to which FIG. 24A continues.

FIGS. 24A and 24B present an example of the operation sequence between the plurality of power electronics devices. These figures illustrate the detailed operation of actually exchanging the communication messages in the system configuration of FIGS. 22A to 22D. The example configuration of the communication messages exchanged in this sequence are illustrated in FIGS. 28, 29, 30, 31, 32, 33 and 34.

Figure 34:
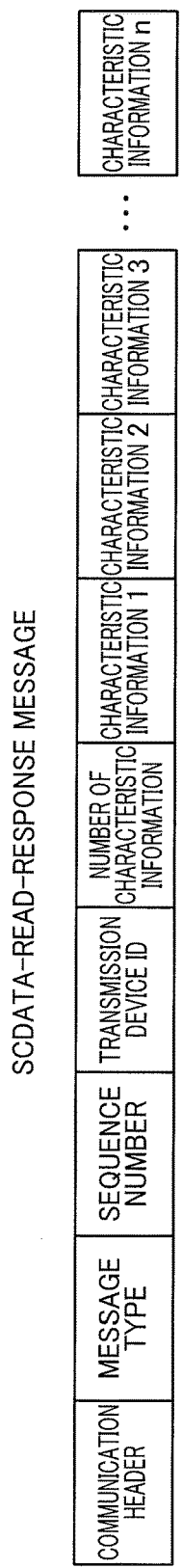
FIG. 34 is a diagram illustrating an example configuration of the communication message.

(A) to (E) of FIG. 24C illustrates a state where in the operation sequence of FIGS. 24A and 24B, values and sequence numbers of the master and the slave of the configuration information of power electronics device 3 is updated. (A) of FIG. 24C illustrates initial configuration information, and (B), (C), (D), and (E) of FIG. 24C illustrate the configuration information that is updated by the master-slave determinations A101, A102, A103, and A104 in this operation sequence. Specifically, the determination of the master and the slave(s) is performed between the power electronics devices 3 and 4 in the master-slave determination A101 of FIG. 24A; between the power electronics devices 2 and 3 in the master-slave determination A102; among the power electronics device 1 and 3 and 4 in the master-slave determination A103 of FIG. 24B; and among the power electronics device 1 and 2 and 3 in the master-slave determination A104 of FIG. 24B. Exchange of the characteristic information or characteristic information set is performed prior to each master-slave determination using SCDATA-READ-REQUEST message (FIG. 33) and SCDATA-READ-RESPONSE message (FIG. 34). Immediately after each master-slave determination, writing (exchange) of the configuration information to the counterpart device is performed using SCDATA-WRITE-REQUEST message (FIG. 31) and SCDATA-WRITE-RESPONSE message (FIG. 32), and it is made possible to confirm whether or not the mutually grasped configuration information is the same. Incidentally, in the operation sequence of FIGS. 24A and 24B, the power electronics device, in order to discover the other devices, uses the communication network and exchange the NOTIFY message (notifying notification/update/separation) of FIG. 28. As another method, it is also possible to use SEARCH message (inquiring the existence of the other devices) of FIG. 29, and SEARCH-RESPONSE message (notifying the existence of this device in response to the SEARCH message) of FIG. 30. In addition to this, as described in the foregoing, information of the electricity network (confirmation of the fact that the other devices have been connected to the same bus) may be used, and manual setting by the operator may also be envisaged. These communication messages may include the device ID of the transmission source device in addition to communication headers of TCP/IP (Transmission Control Protocol/Internet Protocol) or UDP/IP (User Datagram Protocol/Internet Protocol), etc. and information of message types to discriminate the messages. Also, SEARCH message includes information of the wait time after reception of the SEARCH message until the response of the SEARCH-RESPONSE.

Figure 25A:
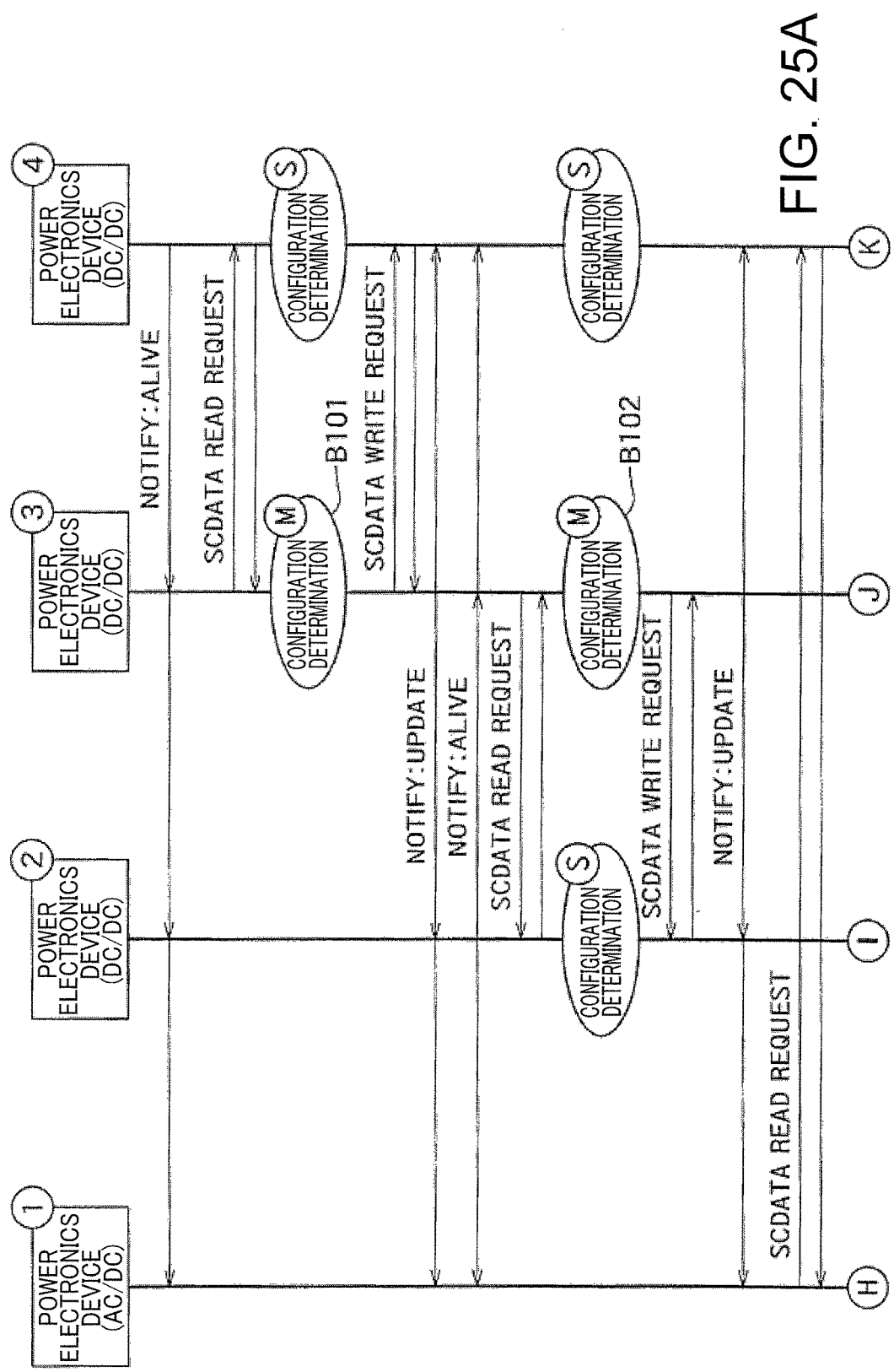
FIG. 25A is an operation sequence diagram of a plurality of power electronics devices.
Figure 25B:
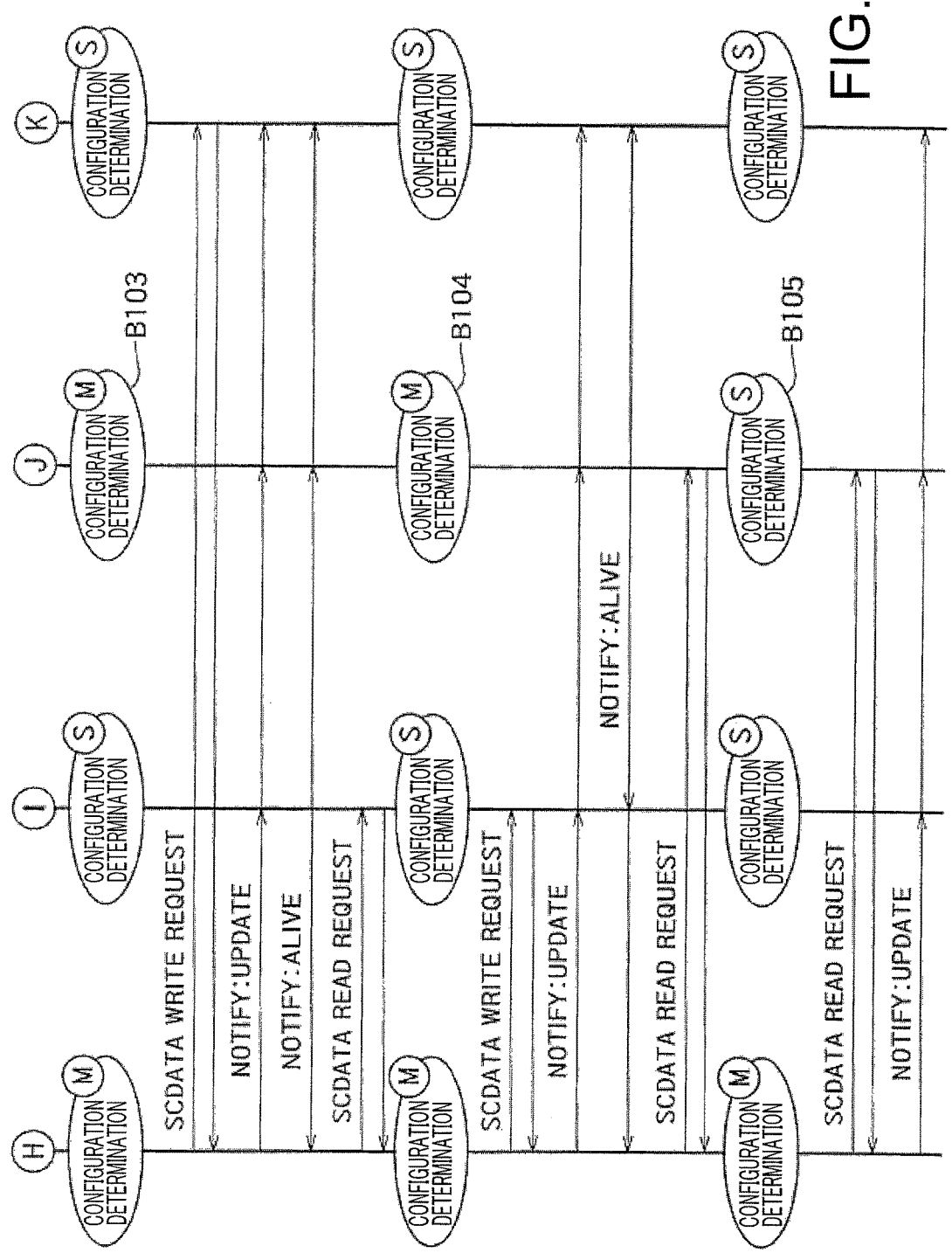
FIG. 25B is an operation sequence diagram to which FIG. 24A continues.

FIGS. 25A and 25B illustrate another example of the operation sequence between a plurality of power electronics devices.

(A) to (F) of FIG. 25C illustrate the operation sequence of FIGS. 25A and 25B, where (A) of FIG. 25C is the initial configuration information and (B), (C), (D), (E), and (F) of FIG. 25C illustrate the configuration information when updated by the master-slave determination B101, B102, B103, B104, and B105 in this operation sequence. Specifically, the determination of the master and the slave is determined between the power electronics devices 3 and 4 in the master-slave determination B101 of FIG. 25A; between the power electronics device 2 and 3 in the master-slave determination B102; between the power electronics device 1 and 4 in the master-slave determination B103 of FIG. 25B; and between the power electronics devices 1 and 2 in the master-slave determination B104.

The difference between FIGS. 24A and 24B and FIGS. 25A and 25B consists in the following point. In FIGS. 24A and 24B, exchange of the characteristic information for the master-slave determination and the configuration determination are performed after each of the power electronics devices has recognized the existences of all of the power electronics devices within the system (the existences of themselves are notified to each other by the NOTIFY message in the first four sequence of FIG. 24A). Meanwhile, in FIGS. 25A and 25B, exchange of the characteristic information for the master-slave determination and the configuration determination are started simultaneously with each of the power electronics devices recognizing the existences of the other individual power electronics devices. For example, in FIG. 25A, the power electronics device 3 starts the information exchange and the configuration determination simultaneously with recognizing the power electronics device 4 by reception of the NOTIFY message from the power electronics device 4.

As described above, the device ID is information for uniquely identifying the devices. In a case where a communication address such as IP address, etc. is used as this ID, it is possible to obtain characteristic information from the other power electronics devices and at the same time to access the other power electronics device in the system that are described therein. On the other hand, in a case where what is not the communication address is used as the device ID, it is not possible to access the other power electronics devices in the system relying solely on the acquisition of the characteristic information. Accordingly, in this case, the aforementioned repetitive acquisition of the characteristic information (FIG. 25A, FIG. 25B) is once terminated. In view of this, the final master-slave configuration is the same in FIGS. 24A and 24B and FIGS. 25A and 25B, but they differ from each other in that the number of rounds of the configuration determination leading thereto is not the same.

Figure 26:
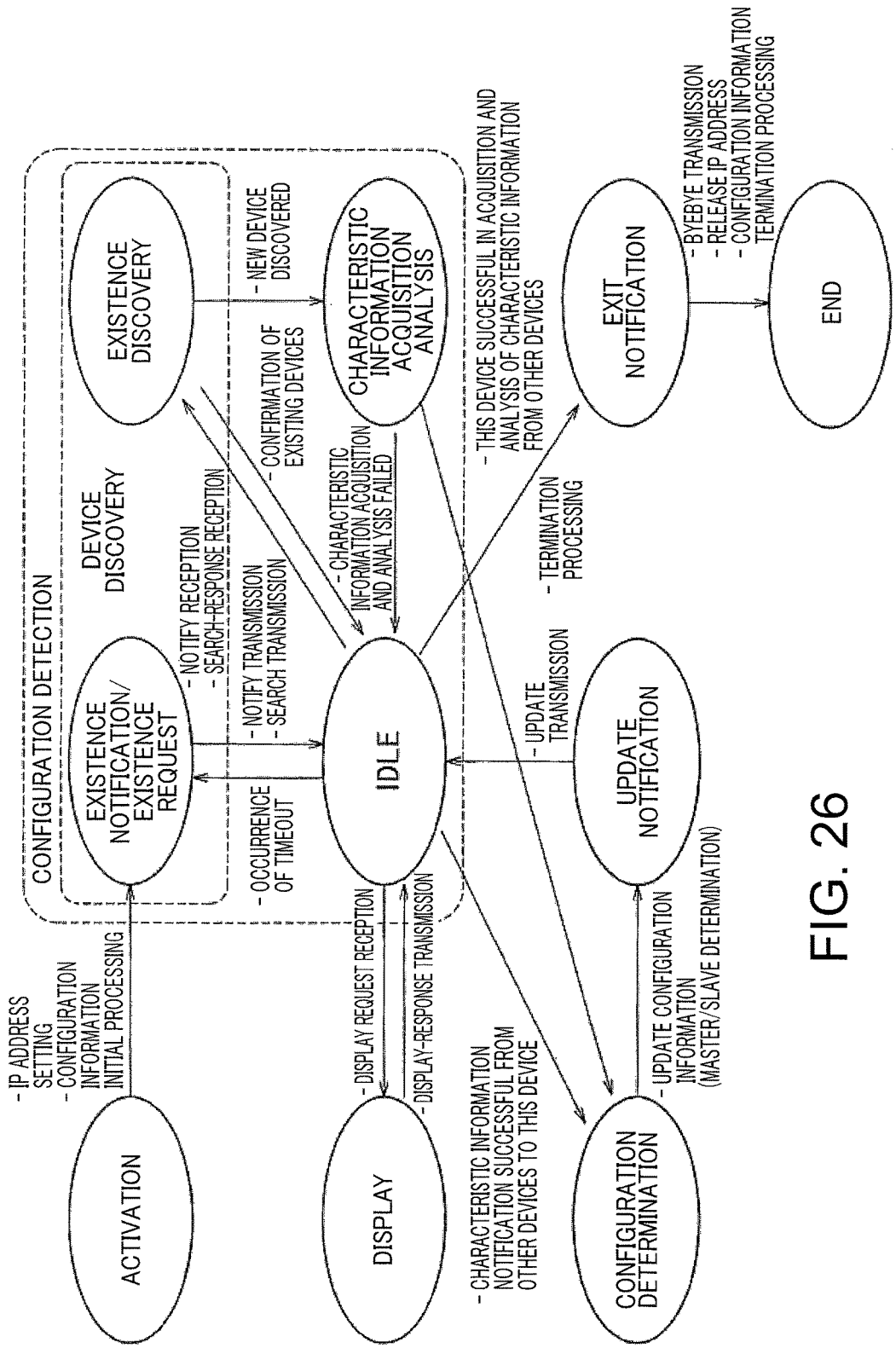
FIG. 26 is an internal state transition diagram of a power electronics device.

FIG. 26 is a state transition diagram associated with the determination of the logical configuration in the power electronics device according to this embodiment (in this context, the determination of the master-slave configuration). The internal state of the power electronics device is represented in the figure by an ellipse in which a letter is added. Occurrence of an event is represented by an event name with an arrow and the state transition occurs every time an event occurs. The device starts with the state of "ACTIVATION" and ends with the state of "END." As states in between to which transition may occur, there are "EXISTENCE NOTIFICATION/EXISTENCE REQUEST", "IDLE", "EXISTENCE DISCOVERY", "CHARACTERISTIC INFORMATION ACQUISITION ANALYSIS", "CONFIGURATION DETERMINATION", "DISPLAY", "UPDATE NOTIFICATION", and "EXIT NOTIFICATION."

For example, when "ACTIVATION" state is entered as power is turned on, IP address setting and characteristic information initial setting (and initial setting of configuration information) is performed, and the state transition occurs to "EXISTENCE NOTIFICATION/EXISTENCE REQUEST." When transition to this state occurs, a NOTIFY message or a SEARCH message is transmitted, and state transition occurs to the "IDLE" state. When the NOTIFY is received in the "IDLE" state, state transition occurs to the "EXISTENCE DISCOVERED" state. When a new device has been found, state transition occurs to "CHARACTERISTIC INFORMATION ACQUISITION ANALYSIS" state. When the characteristic information is obtained and analyzed, state transition occurs to the "CONFIGURATION DETERMINATION" state. Configuration information is updated (after having confirmed that the master-slave configuration agrees with those of the other devices as required) and then state transition occurs to the "UPDATE NOTIFICATION" state The updated configuration information is transmitted to the other devices, and the state returns to the "IDLE" state (configuration where the transmission of the configuration information is not performed is also conceivable). The state transition between other states is performed in the similar manner in accordance with the associated events.

Figure 27A:
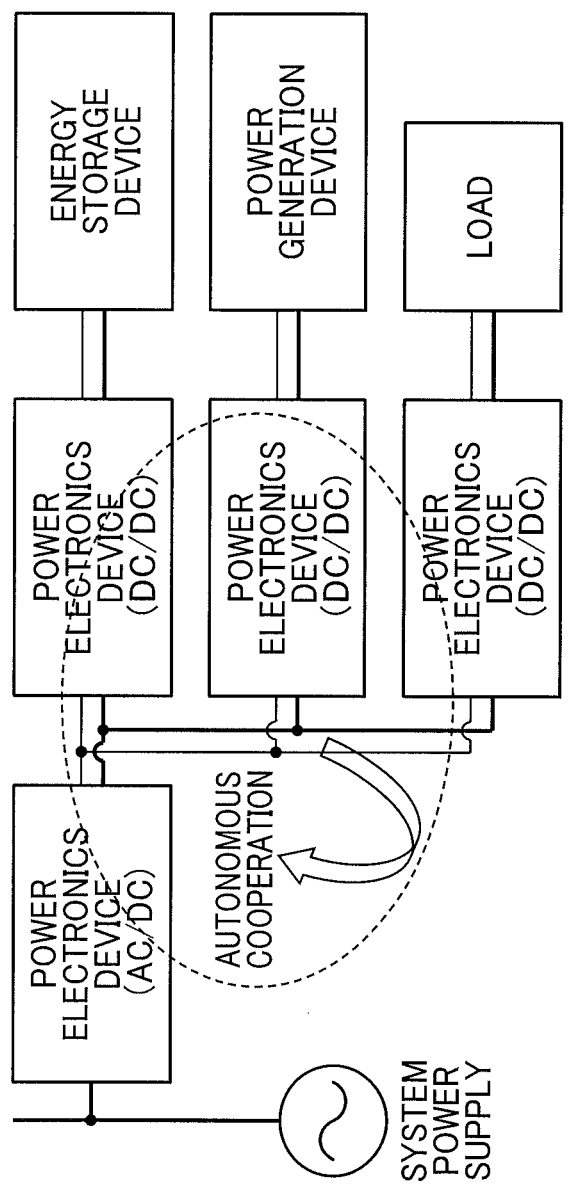
FIG. 27A is a diagram illustrating an example of the configuration of a plurality of power electronics devices for explanation of the operation at the time of occurrence of abnormality.
Figure 27B:
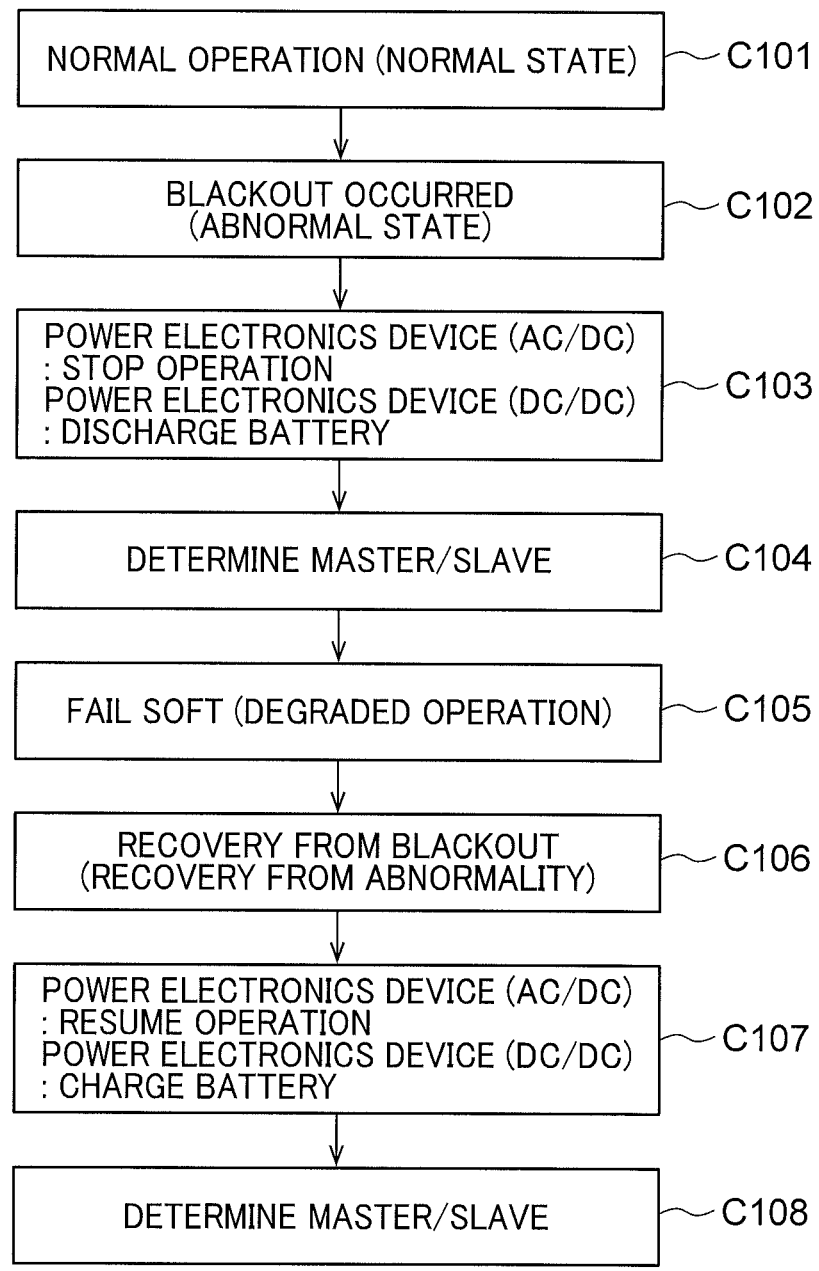
FIG. 27B is a flowchart diagram illustrating an example of configuration determination of the plurality of power electronics devices at the time of occurrence of abnormality.
Figure 31:
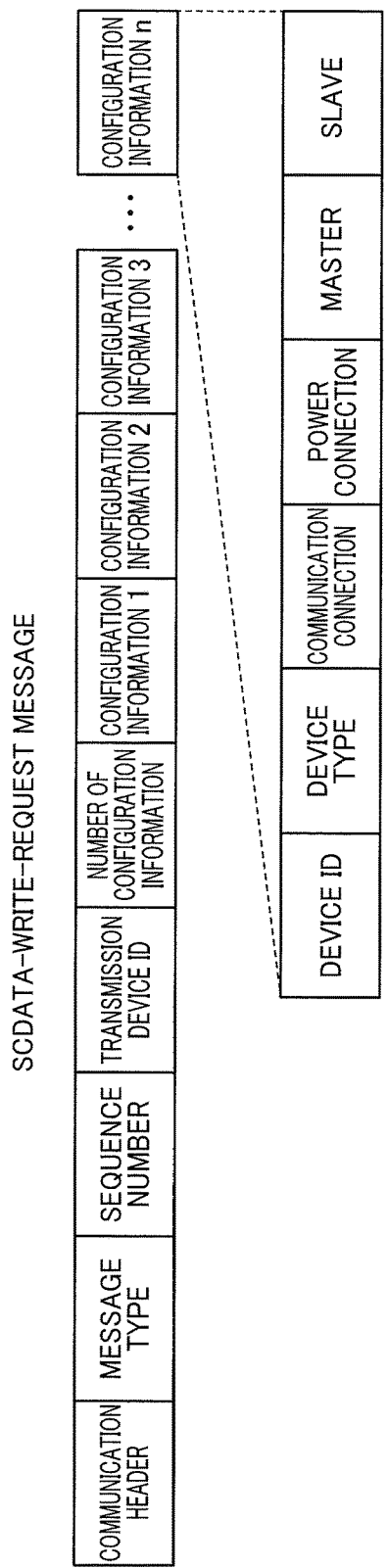
FIG. 31 is a diagram illustrating an example configuration of the communication message.

In FIG. 26, the operation from the state of starting of the power electronics device has been explained, but the embodiment of the present invention can be applied to the case of occurrence of abnormality by the same or similar scheme. Suppose that an abnormality occurs due to a single failure in a power line (power system network serving as the supply side) and the power electronics system realizes fail-soft (fallback operation). FIGS. 27A, 27B, and 27C are diagrams for explanation of the operation of each of the power electronics devices in the event of the occurrence of an abnormality. FIG. 27A illustrates a state where each of the power electronics devices are in autonomous cooperation in a normal state. FIG. 27B is an operation flowchart in the event of occurrence of an abnormality. FIG. 27C is a diagram illustrating the output status of each of the power electronics devices at each stage of the flowchart of FIG. 27B.

During the normal operation, the power electronics device (AC/DC) operates with electrical power supplied from a system power source, and each of the three power electronics devices (DC/DC) operate with electrical power supplied from a power source such as an energy storage/PV, etc. as well as electrical power supplied from the system power source via the power electronics device (AC/DC) (C101). The uppermost table of FIG. 27C indicates outputs (result values) of the respective power electronics devices during the normal operation. Also, in this figure, the rated values of the respective power electronics devices are indicated.

When a blackout occurs (C102), the power electronics device (AC/DC) stops the operation (C103). In addition, generally, the power electronics device (AC/DC) monitors the power line and performs the fail-safe (stoppage of operation) when the result values such as voltage and frequency exceeded a threshold. The power electronics device (DC/DC), as described above, operates with the electrical power supplied from the power source of the energy storage/PV, etc. in addition to the electrical power supplied from the system power source via the power electronics device (AC/DC), so that it can continue the operation at the time of the blackout, switch the driving power systems, and thus make communications. The power electronics device (DC/DC) is not directly connected to the AC side and does not execute the above-described fail-safe. The power electronics device (DC/DC) connected to the energy storage device, the power generation device, etc. perform at this point preparations for discharge. The outputs of the respective power electronics devices at the occurrence of the blackout is indicated in the second-to-the-uppermost table of FIG. 27C. Due to the blackout, the operation of the power electronics device (AC/DC) that has been operating and the operation of the power electronics device (DC/DC) connected to a load are stopped. Each power electronics device (DC/DC) can detect the occurrence of the blackout in the power electronics device (AC/DC) by, for example, shutdown of communication with the power electronics device (AC/DC). This detection may be performed by a detector of the power electronics device (DC/DC).

Next, when the power electronics device (AC/DC) has executed the fail-safe, the remaining power electronics devices determine the logical configuration (the master and the slave in this context) (C104). For the fail-soft (fallback operation), as briefly mentioned in the foregoing, a criterion for priority may be adopted according to which the power electronics device having the highest probability to survive at the time of abnormality is selected as the master. Specifically, from among the power electronics devices (DC/DC), the power electronics device connected to the power source is preferentially determined as the master over the power electronics device connected to the load. Further, among the power sources, the power electronics device (DC/DC) connected to the energy storage may have preference over the power electronics device (DC/DC) connected to a power generation device of renewable energy.

When the master and the slave are determined, these devices performs fail-soft (fallback operation) (C105). The output of each power electronics device at the time of the fallback operation is indicated in the third table from the top of FIG. 27C. Electrical power is output from the energy storage device and power generation device that have not output the power, and the load is driven by this electrical power. Incidentally, the power electronics device (AC/DC) remains stopped.

When restored from the blackout (C106), the power electronics device (AC/DC) restarts the operation (C107) and the power electronics device (DC/DC) connected to energy storage device, the power generation device, etc. performs preparation for switching from discharging to charging of the energy storage device. The outputs of the respective power electronics devices at the time of restart of the operation are as indicated in the lowermost table of FIG. 27C. Thereafter, the determination of the master and the slaves is determined with the restored power electronics device (AC/DC) included (C108), and the normal operation is resumed. The outputs of the respective power electronics devices also return to the uppermost table of FIG. 27C.

In the normal operation after the configuration determination of the master and the slave(s) has been completed, communication messages associated with real-time control/non-real-time control are exchanged between the respective power control devices, and power monitor and control is performed. For example, as information of the monitor system, a current value of active power (W), a current value of reactive power (VAR), unit voltage per phase, a current value of power factor, etc. may be mentioned. In addition, as information of the control system, permission to connect to electricity network, permission to use PV output, permission to use energy storage output, permission to use active power/reactive power control, target value of active power (W), target value of reactive power (VAR), target value of power factor, output level value of active power (%), output level value of reactive power (%), frequency value, etc. may be mentioned. Further, as information of the rated system, rated active power (W), rated apparent power (VA), rated reactive power (VAR), etc. may be mentioned. As the general possibility of the embodiment, it is envisaged that the information of the control system is readable and writable, and the information of the monitor system/rated system is only readable.

Thus, in accordance with this embodiment, the control of the power electronics devices is divided into the configuration control that configures the logical configuration (configuration information) and the power control, and these controls are performed in parallel. In the configuration control, the critical section is specified and the consistency of the logical configuration of the power electronics system is guaranteed. In the power control, the power conversion is continued with the control information given in advance (the preprogrammed control method) even during the critical section. It is thus made possible to guarantee the availability of the system. Conventionally, when one of the power electronics devices failed, stopped, etc., the operation of the currently operating power electronics devices is once stopped, the logical configuration (configuration information) is re-generated, and thereafter operation under the new logical configuration is performed. As a result, there has been a problem that the availability of the system is undermined such as the currently operating loads being forced to be stopped. If the logical configuration (configuration information) is re-generated without stopping the operation of the operating power electronics devices, then inconsistency occurs in the logical configuration such as temporary existence of two or more masters, undermining the suitable control of the power electronics systems. In this embodiment, both of these problems can be solved at the same time. Specifically, it is made possible to re-generate the logical configuration while ensuring at the same time the consistency of the logical configuration and the availability of the system.

APPLICATION EXAMPLES OF THIS EMBODIMENT

An application example of this embodiment is explained below with reference to the drawings.

Application Example 1: Micro Grid

As one application example of the power electronics system, a micro grid may be envisaged. The micro grid may be specifically a small-scale or medium-scale power system for general houses, stores, factories, buildings, stations, and commercial facilities. Units such as a section of a town, an entire town, etc. are not generally referred to as the micro grid. However, since the components of the system are the same or similar, it is envisaged here that a large-scale grid system is also included in this context.

Figure 35:
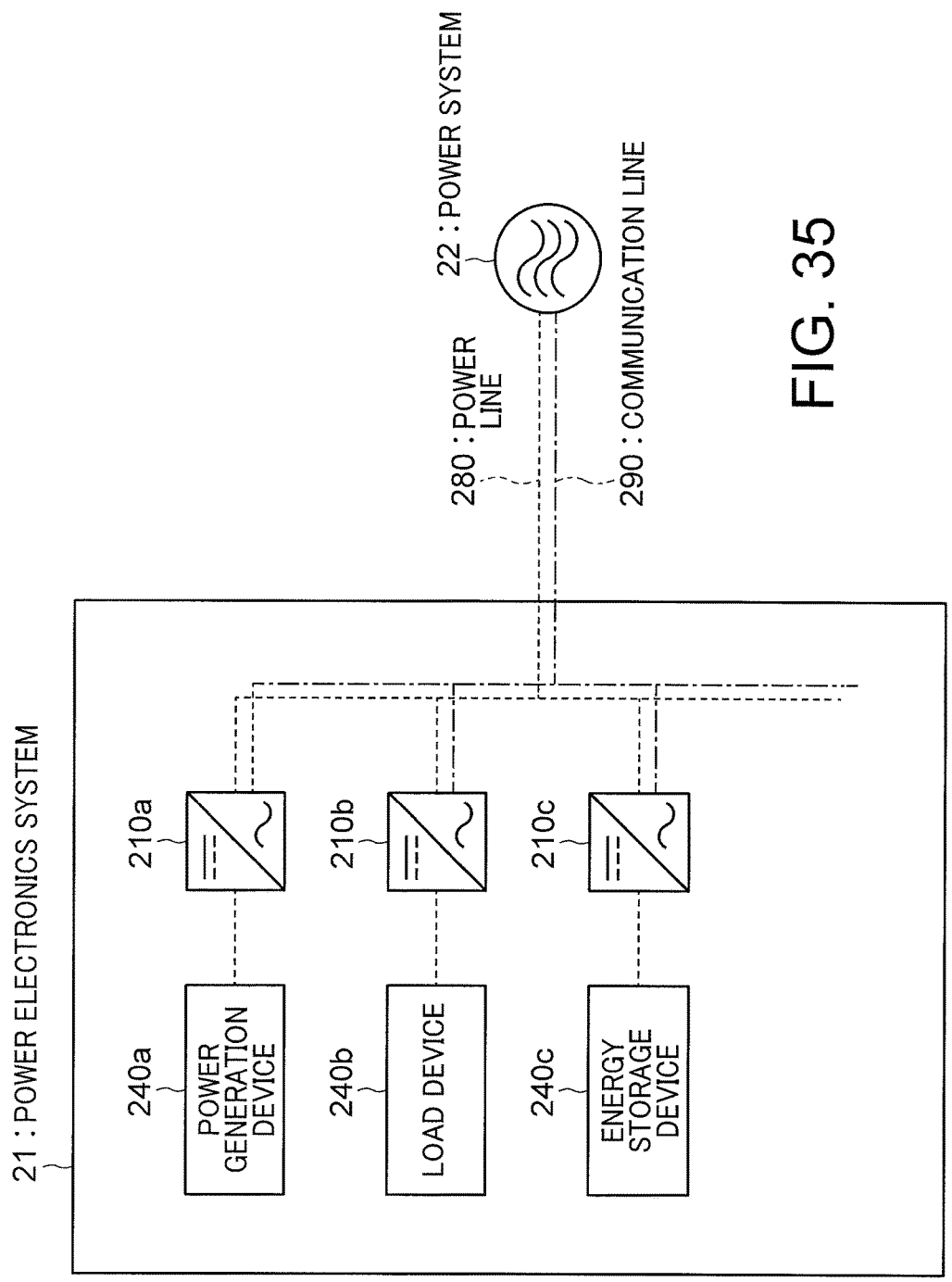
FIG. 35 is a diagram illustrating an example of a micro grid.

FIG. 35 illustrates an example of the micro grid. A power electronics system 21 (or a local system) includes, as its basic components, by way of example, a power generation device 240a, a load device 240b, an energy storage device 240c, a plurality of power electronics devices including power electronics devices 210a, 210b, 210c, and a power line 280 and a communication line 290 that connect them. The power line 280 is connected to the power system 22, and the plurality of power electronics devices are allowed to receive power supply from the power system 2 via the power line 280. Also, in the event that surplus power is created in the power electronics system 21, it can perform electrical power transmission to the power system 2 (reverse power flow), and further it can consume the electrical power produced by the power electronics system 21 and the electrical power supplied from the power system 2 at the same time. In addition, the plurality of power electronics devices are capable of making communications with each other via the communication line 290. In addition, it is also conceivable that an EMS server and other devices associated with power management exist, so that each of the power electronics devices are allowed to make communications with the EMS server, etc. via the communication line 290 or another communication line. Since each of the components such as the plurality of power electronics devices, the EMS server, etc. in the system includes the communication function, it is made possible to realize advanced control as the entire system and cooperation with external systems. In addition to this, the aforementioned various sensors may be mounted in each of the power electronics devices. Also, the power electronics system 21 may have another power electronics system (local system) as am internal component, adjacent component, or the like. The other power electronics system may be independent of the power system 22. In addition, it is also envisaged that the local system may in cooperation with a single or a plurality of power systems via two or more paths.

A wattmeter or controller having a function according to this embodiment may exist in the power electronics system (local system) 21. In addition, there may exist a conventional power electronics device, a power electronics device that does not have a communication function and accordingly does not have sufficient controllability from the controller in the power electronics system 21. Even when these components exist in the system, it is possible to obtain the effect of this embodiment.

Also, in the above described micro grid, smart grid, or the like, it is possible that integral control and management is performed including the gas and water as well as electrical power. In addition, heat, energy in general, air conditioning equipment may be target of control by this embodiment.

Application Example 2: Distributed Power Supply Plant

Figure 36:
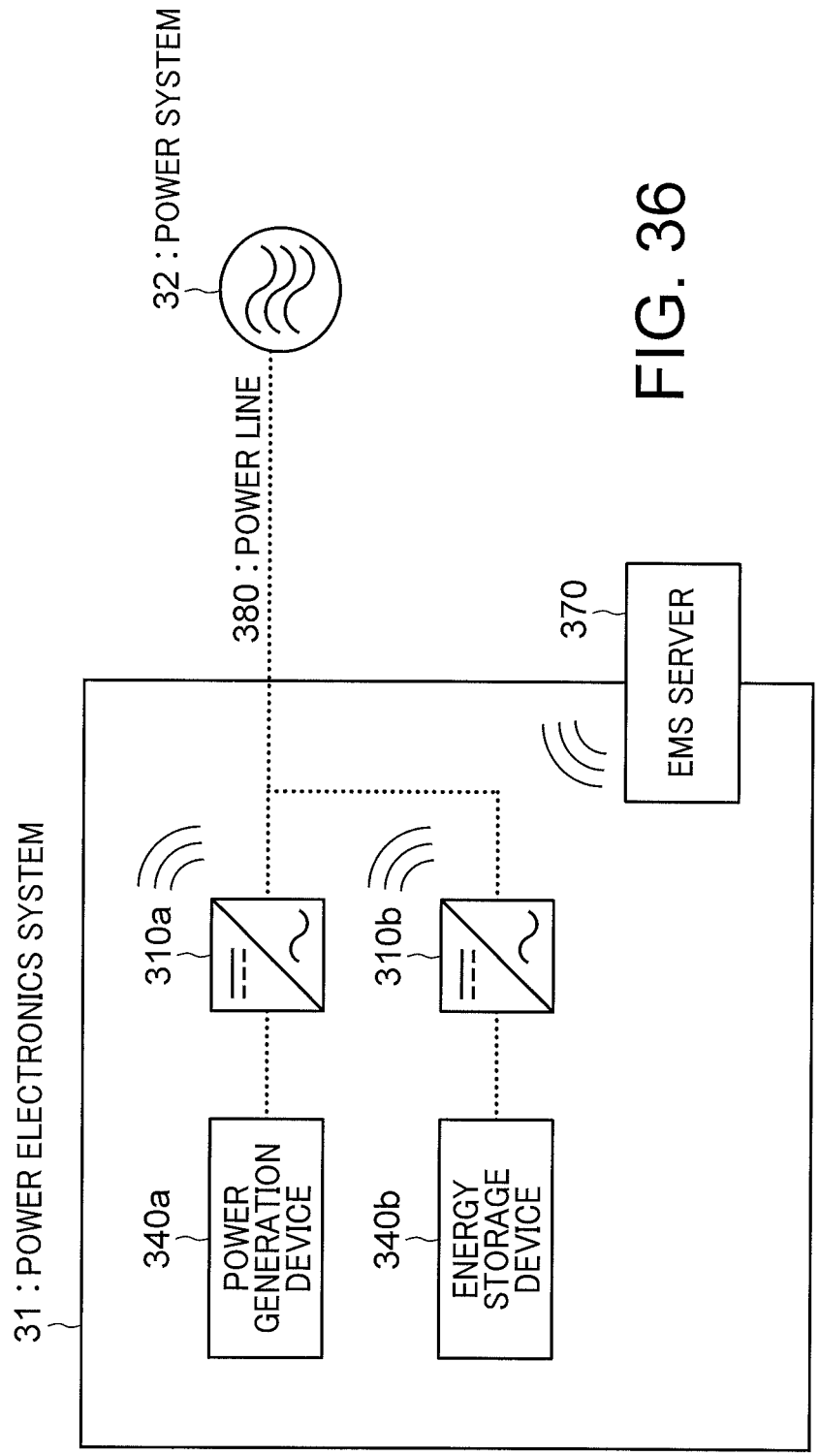
FIG. 36 is a diagram for explanation of an example application of a power electronics system.

An application example may be mentioned for a power electronics system that includes a system-interconnection inverter operated as multiple devices. FIG. 36 illustrates an example of a power electronics system according to this application example. The various power generation device 340a, energy storage device 340b and the like of small to large scales are connected via the power electronics devices 310a, 310b to the power system 32. There may be a load or any other devices connected in parallel or in series between the power electronics device 310a and the power system 32. In addition, a sensor or a smart meter such as a not-shown wattmeter may be used. A power electronics system (local system) 31 is managed by an EMS server 370 of small to large scales, an electric utility company, other aggregators, etc. The power electronics devices 310a and 310b are capable of wireless communications with each other, and capable of wireless communications with the EMS 370. The power electronics devices 310a and 310b are inverters (system-interconnection inverter) that supplies alternating-current power to the power system 32 via a power line 380. Incidentally, the power line at the portion between the power electronics system 31 and the power system 32 may particularly be referred to as a system power line. The system cooperation inverter is installed in mega-solar, small-scale, or medium-scale power generation plants or energy storage facilities, and may also be installed in facilities such as houses, buildings, and factories, and various places such as the micro grid, etc. The voltage in use may vary including single-phase 100 V and three-phase 200 V, and direct current voltage system may also be included. Also, the power electronics system 31 can respond to power flows of both forward power flow and reverse power flow. In such a system, various devices (power electronics device, EMS, wattmeter, etc.) may include a communication function and exchange various data such as power data using communications.

Application Example 3: Railroad, Elevator, Industrial Applications, and Motor Drive System The power electronics device according to this embodiment may be applied to systems such as a railroad vehicle, an elevator, and an FA. In such a system, a plurality of inverters, motors, and sensors and the like are used autonomously and cooperatively through making communications or under the control of a controller. A car or a group of cars of the railroad vehicle may be regarded as a kind of a local system (power electronics system), and this local system (power electronics system) is connected via a pantograph to the power system. In a vehicle, there exist a load such as air conditioning equipment that operates by a motor, a power electronics device connected to the loads, a load as a motor for driving wheels, and a power electronics device connected to this load. In addition, there exist loads such as illuminations. These loads are managed by a controller, and this controller has a role equivalent to that of the EMS in the previously described example.

In addition, a regeneration brake is often used in the railroad vehicle. During the regeneration, the load operates as a power generator. This regeneration energy is obtained from electrical energy that was originally obtained from a power system and converted into kinetic energy of the vehicle casing, and accordingly it is possible in a broad sense to interpret that the vehicle as such corresponds to the energy storage device, and the load of the motor for driving the vehicle corresponds to the power electronics device. Devices such as an elevator or escalator differ from the railroad device in the relationship between the stationary device and the movable device, but in terms of the power electronics system, it may be regarded as a local system (power electronics system) configured by a load, a energy storage device, a power generation device, a power electronics device, and other sensor and controller, in the similar manner as in the case of the railroad vehicle.

Application Example 4: Others

In the application examples 1 to 3, the explanations have been given based in terms of electrical power as the exemplary target of control. However, the target of control of this embodiment is not limited to the electrical power, and it may be applied to energy other than the electrical power as long as a control device or control system performs the coordinated control by multiple devices using communications. A control device for water and sewage network system or valve that controls fluid such as water and a gas supply network/valve performing similar control may be envisaged. Also, in the context of the electrical power, the embodiment may be applied not only to power conversion but also to power control for producing power through cooperation of multiple motors and power generation control performed by making multiple power generators cooperate. In this case, a processing device for performing processing associated input/output of gas or water is replaced by the power electronics device of this embodiment, and a controller that performs control associated with controls input/output of gas or water in this processing device is replaced by the power conversion controller.

The power electronics device as described above may also be realized using a general-purpose computer device as basic hardware. That is, each function block (or each section) in the power electronics device can be realized by causing a processor mounted in the above general-purpose computer device to execute a program. In this case, the power electronics device may be realized by installing the above described program in the computer device beforehand or may be realized by storing the program in a storage medium such as a CD-ROM or distributing the above described program over a network and installing this program in the computer device as appropriate. Furthermore, the storage may also be realized using a memory device or hard disk incorporated in or externally added to the above described computer device or a storage medium such as CD-R, CD-RW, DVD-RAM, DVD-R as appropriate.

The terms used in each embodiment should be interpreted broadly. For example, the term "processor" may encompass a general purpose processor, a central processor (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, one or more microprocessors in conjunction with a DSP core.

As another example, the term "storage", which is used by storage information etc. in the embodiments, may encompass any electronic component which can store electronic information. The "storage" may refer to various types of media such as random access memory (RAM), read-only memory (ROM), programmable read-only memory (PROM), erasable programmable read only memory (EPROM), electrically erasable PROM (EEPROM), non-volatile random access memory (NVRAM), flash memory, magnetic such as an HDD, an optical disc or SSD.

It can be said that the storage electronically communicates with a processor if the processor read and/or write information for the storage. The storage may be integrated to a processor and also in this case, it can be said that the storage electronically communication with the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:
1. A control device arranged in a power electronics device, comprising:
 a controller to perform control associated with power conversion in the power electronics device, in accor- dance with a first logical configuration of control between the power electronics device and other power electronics device;

a configuration determiner to perform determination processing of a second logical configuration of control between the power electronics device and the other power electronics device when a change condition of the first logical configuration is satisfied; and a manager to instruct the controller to perform the control in accordance with the second logical configuration, the manager performing management such that the controller performs the control associated with the power conversion in accordance with previously given control information for a period after the change condition of the first logical configuration is satisfied and until the manager instructs the controller to perform the control in accordance with the second logical configuration.

2. The control device according to claim 1, wherein the manager determines that the change condition of the first logical configuration is satisfied when a change of characteristic information is detected in either one of the power electronics device and the other power electronics device; when stoppage, failure or separation of one of a plurality of the other power electronics devices is detected; or when participation of a further other power electronics device different from the other power electronics device is detected.

3. The control device according to claim 2, wherein, in response to the characteristic information of the power electronics device being changed, the configuration determiner determines the second logical configuration on basis of the changed characteristic information of the power electronics device and the characteristic information of the other power electronics device; and in response to the characteristic information of the other power electronics device being changed, the configuration determiner determines the second logical configuration on basis of the changed characteristic information of the other power electronics device and the characteristic information of the power electronics device.

4. The control device according to claim 2, further comprising a communicator to communicate with the other power electronics device, wherein the communicator transmits, in response to the characteristic information of the power electronics device being changed, the changed characteristic information of the power electronics device to the other power electronics device; and the manager instructs the controller to perform the control associated with the power conversion in accordance with the second logical configuration after a response to transmission of the changed characteristic information of the power electronics device is received by the communicator.

5. The control device according to claim 2, further comprising a communicator to communicate with the other power electronics device, wherein the manager uses the communicator to detect that the characteristic information of the other power electronics device has been changed.

6. The control device according to claim 5, wherein the communicator receives the changed characteristic information of the other power electronics device, manager transmit notification information via the communicator to the other power electronics device, the notification information indicating that the manager has recognized the changed characteristic information of the other power electronics device, and the manager, after the notification information has been transmitted, instructs the controller to perform the control in accordance with the second logical configuration.

7. The control device according to claim 6, wherein the communicator transmits the notification information to one of the other power electronics devices other than the other power electronics device whose characteristic information was changed, and the manager instructs the controller to perform the control in accordance with the second logical configuration after notification information is received by the communicator from the one of the other power electronics devices, the notification information indicating that the changed characteristic information of the other power electronics device has been recognized.

8. The control device according to claim 5, wherein the manager detects that the characteristic information of the other power electronics device has been changed by receiving a characteristic information update notification from the other power electronics device via the communicator, or by comparing the characteristic information received from the other power electronics device via the communicator with already-held characteristic information of the other power electronics device.

9. The control device according to claim 5, wherein the communicator receives hash information from the other power electronics device, the hash information being based on the characteristic information of the other power electronics device; and the manager detects that the characteristic information of the other power electronics device has been changed, in accordance with comparison of the hash information received by the communicator with hash information of already-held characteristic information of the other power electronics device.

10. The control device according to claim 5, further comprising a storage storing the characteristic information of the power electronics device and the characteristic information of the first to N-th other power electronics devices, wherein the communicator receives hash information from the first other power electronics device, the hash information being based on the characteristic information of the power electronics device and the characteristic information of the first to N-th other power electronics devices; and the manager detects that the first other characteristic information of the power electronics device has been changed when the hash information received by the communicator is different from hash information computed on basis of the characteristic information of the power electronics device and the characteristic information of the first to N-th other power electronics devices in the storage.

11. The control device according to claim 10, wherein the communicator receives the changed characteristic information of the first other power electronics device, and transmits hash information to the second to N-th other power electronics devices, the hash information being computed on basis of: the changed characteristic information of the first other power electronics device; the characteristic information of the power electronics device in the storage; and the characteristic information of the second to N-th other power electronics devices in the storage.

12. The control device according to claim 11, wherein the manager instructs the controller to perform the control associated with the power conversion in accordance with the second logical configuration after the hash information has been transmitted to the second to N-th other power electronics devices.

13. The control device according to claim 2, wherein the configuration determiner, in response to stoppage, failure, or separation of one of the other power electronics devices, determines the second logical configuration of control between the power electronics device and the other power electronics devices in operation other than the power electronics device that has been stopped, failed, or separated.

14. The control device according to claim 13, wherein the manager instructs the controller to perform the control associated with the power conversion in accordance with the second logical configuration when notification information has been received from the other power electronics device in operation, the notification information indicating that stoppage, failure or separation of the one of the other power electronics devices has been detected.

15. The control device according to claim 2, wherein the configuration determiner, when the further other power electronics device has been participated, determines the second logical configuration of control among the power electronics device, the other power electronics device, and the further other power electronics device.

16. The control device according to claim 15, wherein the communicator receives the characteristic information of the further other power electronics device; and
   the manager instructs the controller to perform the control in accordance with the second logical configuration when notification information has been received from the other power electronics device, the notification information indicating that the other power electronics device has recognized the characteristic information of the further other power electronics device.

17. The control device according to claim 1, wherein the control information is:
   information instructing to keep an output of the power electronics device at a time point within a predetermined time period, wherein the time period being defined with reference to a time point at which the change condition is satisfied;
   information instructing to output in accordance with a profile defining time variation of output; or
   information instructing to keep tendency of output that were made prior to the change condition being satisfied.

18. The control device according to claim 1, wherein the first logical configuration is either one of:
   a centrally controlled configuration that there exists a central control device for the power electronics device and the other power electronics device, the central control device controls the power electronics device and the other power electronics device;
   a quasi-autonomous distributed configuration that a master selected from the power electronics device and the other power electronics device controls the power electronics devices other than the master; and
   a fully autonomous distributed configuration that the power electronics device and the other power electronics device operate autonomously in a distributed manner with respect to each other.

19. The control device according to claim 18, wherein the second logical configuration is a configuration different from the first logical configuration and is any one of the centrally controlled configuration, the quasi-autonomous distributed configuration, and the fully autonomous distributed configuration.

20. The control device according to claim 1, wherein the configuration determiner determines a lower-layer logical configuration and determines an upper-layer logical configuration as the second logical configuration on basis of the lower-layer logical configuration;
   the lower-layer logical configuration is either one of the centrally controlled configuration, the quasi-autonomous distributed configuration, and the fully autonomous distributed configuration; and
   the upper-layer logical configuration is either one of the centrally controlled configuration, the quasi-autonomous distributed configuration, and the fully autonomous distributed configuration.

21. The control device according to claim 20, wherein the lower-layer logical configuration is a configuration different from the upper-layer logical configuration.

22. The control device according to claim 20, wherein the lower-layer logical configuration and the upper-layer logical configuration are the same configuration.

23. The control device according to claim 18, wherein the first logical configuration and the second logical configuration are same configuration of any one of the centrally controlled configuration, the quasi-autonomous distributed configuration, and the fully autonomous distributed configuration.

24. The control device according to claim 18, wherein, in the quasi-autonomous distributed configuration, the master is determined from a plurality of power electronics devices including the power electronics device and the other power electronics device.

25. The control device according to claim 18, wherein, in the quasi-autonomous distributed configuration, the master is determined per type of control between the power electronics device and the other power electronics device.

26. The control device according to claim 18, wherein, in the capacity of the quasi-autonomous distributed configuration, for each set of two power electronics devices from the plurality of power electronics devices including the power electronics device and the other power electronics device, either one of the two power electronics devices is determined as the master of the other of the two power electronics devices.

27. The control device according to claim 2, wherein a failure of the other power electronics device includes a failure of a communicator provided in the other power electronics device.

28. The control device according to claim 1, wherein the control device is provided in a processing device performing processing associated with input and output of gas or water, instead of being provided in the power electronics device; and the controller performs control associated with the input and output of gas or water in the processing device.

29. A control method performed in a power electronics device, comprising:
   performing control associated with power conversion in the power electronics device, in accordance with a first logical configuration of control between the power electronics device and other power electronics device;
   performing determination processing of a second logical configuration of control between the power electronics device and the other power electronics device when a change condition of the first logical configuration is satisfied;
   performing the control associated with the power conversion in accordance with the second logical configuration determined; and performing the control associated with the power conversion in accordance with previously given control information for a period after the change condition of the first logical configuration is satisfied and until performing the control associated with the power conversion in accordance with the second logical configuration.

30. A non-transitory computer readable medium having a program stored therein which causes a processor performed in a power electronics device to execute processing of steps comprising:

performing control associated with power conversion in the power electronics device, in accordance with a first logical configuration of control between the power electronics device and other power electronics device;

performing determination processing of a second logical configuration of control between the power electronics device and the other power electronics device when a change condition of the first logical configuration is satisfied;

performing the control associated with the power conversion in accordance with the second logical configuration determined; and performing the control associated with the power conversion in accordance with previously given control information for a period after the change condition of the first logical configuration is satisfied and until performing the control associated with the power conversion in accordance with the second logical configuration.

* * * * *